US012321372B2

(12) United States Patent
James et al.

(10) Patent No.: US 12,321,372 B2
(45) Date of Patent: Jun. 3, 2025

(54) SYSTEM AND METHOD FOR DYNAMICALLY-GENERATED GUIDED DIALOGUE USING ARTIFICIAL INTELLIGENCE

(71) Applicant: Ignite Sales, Inc., Dallas, TX (US)

(72) Inventors: Jarmell James, Desoto, TX (US); Jake Clark, Saginaw, TX (US); Thom Suhy, Flower Mound, TX (US); Julie Hamrick, Dallas, TX (US); Barbie Boe, Dallas, TX (US); George Noga, Dallas, TX (US)

(73) Assignee: Ignite Sales, Inc., Dallas, TX (US)

( * ) Notice: Subject to any disclaimer, the term of this patent is extended or adjusted under 35 U.S.C. 154(b) by 0 days.

(21) Appl. No.: 18/889,954

(22) Filed: Sep. 19, 2024

(65) Prior Publication Data

US 2025/0013677 A1    Jan. 9, 2025

Related U.S. Application Data

(60) Provisional application No. 63/584,572, filed on Sep. 22, 2023.

(51) Int. Cl.
*G06F 16/3329* (2025.01)
(52) U.S. Cl.
CPC .............. *G06F 16/3329* (2019.01)
(58) Field of Classification Search
CPC .................................. G06F 16/3329
See application file for complete search history.

(56) References Cited

U.S. PATENT DOCUMENTS

| | | | |
|---|---|---|---|
| RE42,869 E | 10/2011 | Boe et al. | |
| 2003/0171929 A1* | 9/2003 | Falcon | G10L 15/30 704/E15.047 |
| 2007/0239458 A1* | 10/2007 | Odell | G10L 15/26 704/E15.045 |
| 2014/0006319 A1* | 1/2014 | Anand | G06N 5/02 706/46 |
| 2019/0138600 A1* | 5/2019 | Krishnan | G10L 15/22 |
| 2024/0037128 A1* | 2/2024 | Koneru | G06F 16/3329 |

\* cited by examiner

*Primary Examiner* — Eric Yen

(57) ABSTRACT

A method includes creating, by at least one processor of at least one electronic device, a guided dialogue, wherein the guided dialogue includes programming blocks corresponding to queries and associated rules, and wherein the programming blocks are structured to include one or more query base blocks having associated rule blocks. The method also includes deploying, by the at least one processor, the guided dialogue at an online-accessible location, wherein a request from another electronic device to access the deployed guided dialogue causes execution of the deployed guided dialogue in response to the request. The method also includes using one or more machine learning models to enable creation of the guided dialogue based on learned patterns and outputs from other dialogues, and to continually recommend or provide refinements to the dialogue to enhance the dialogue and optimize recommendations provided by the dialogue.

30 Claims, 47 Drawing Sheets

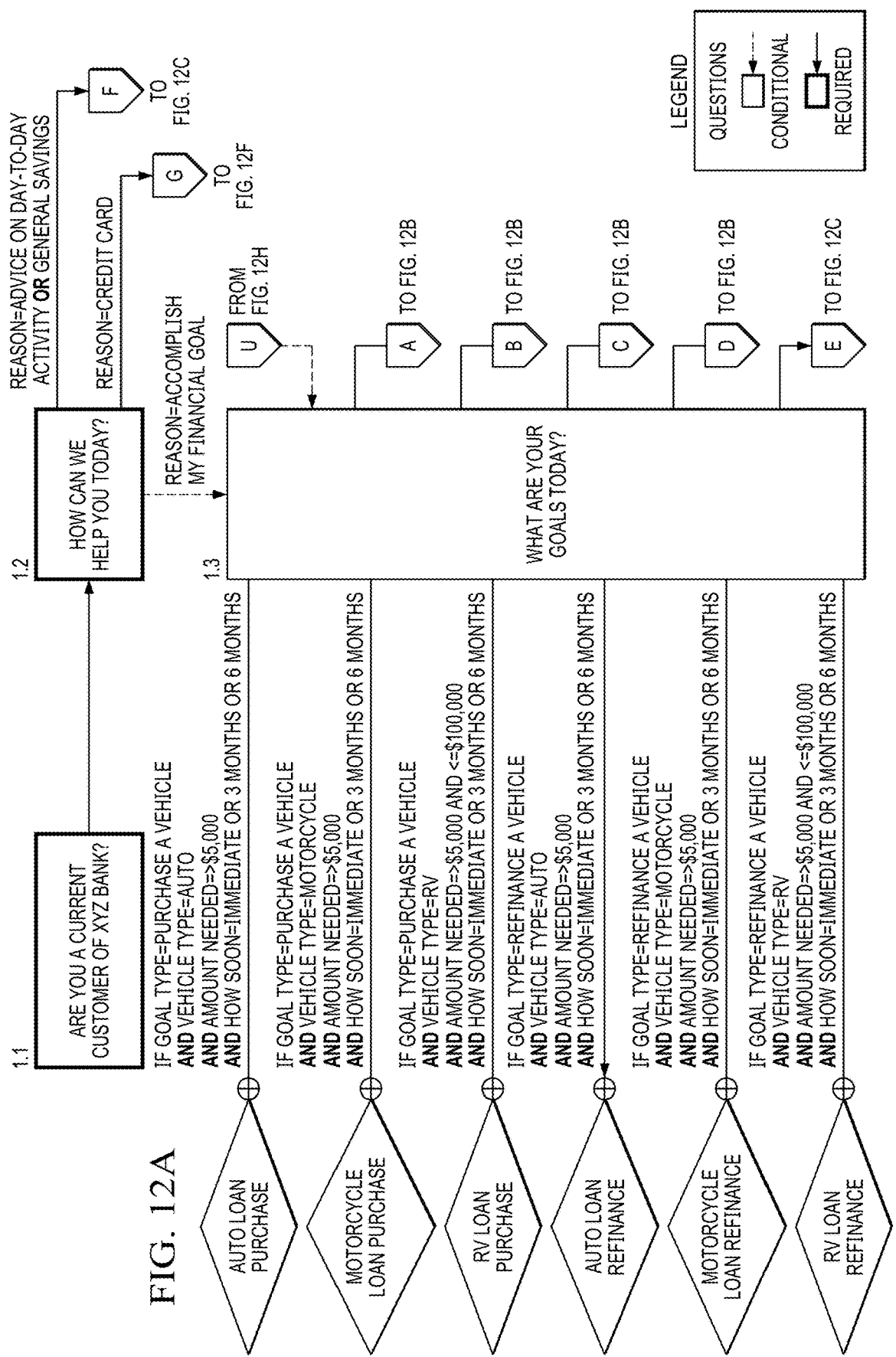

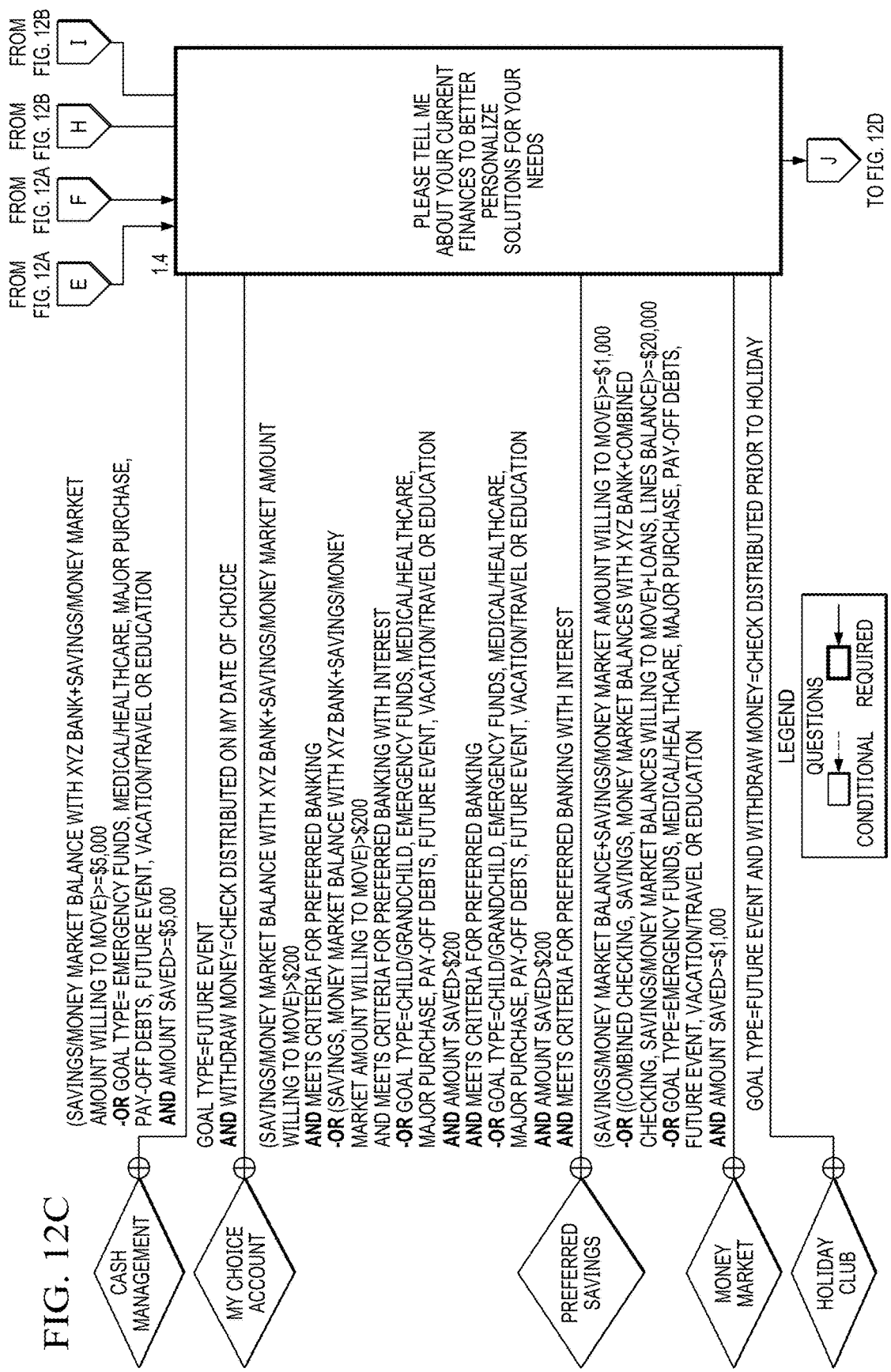

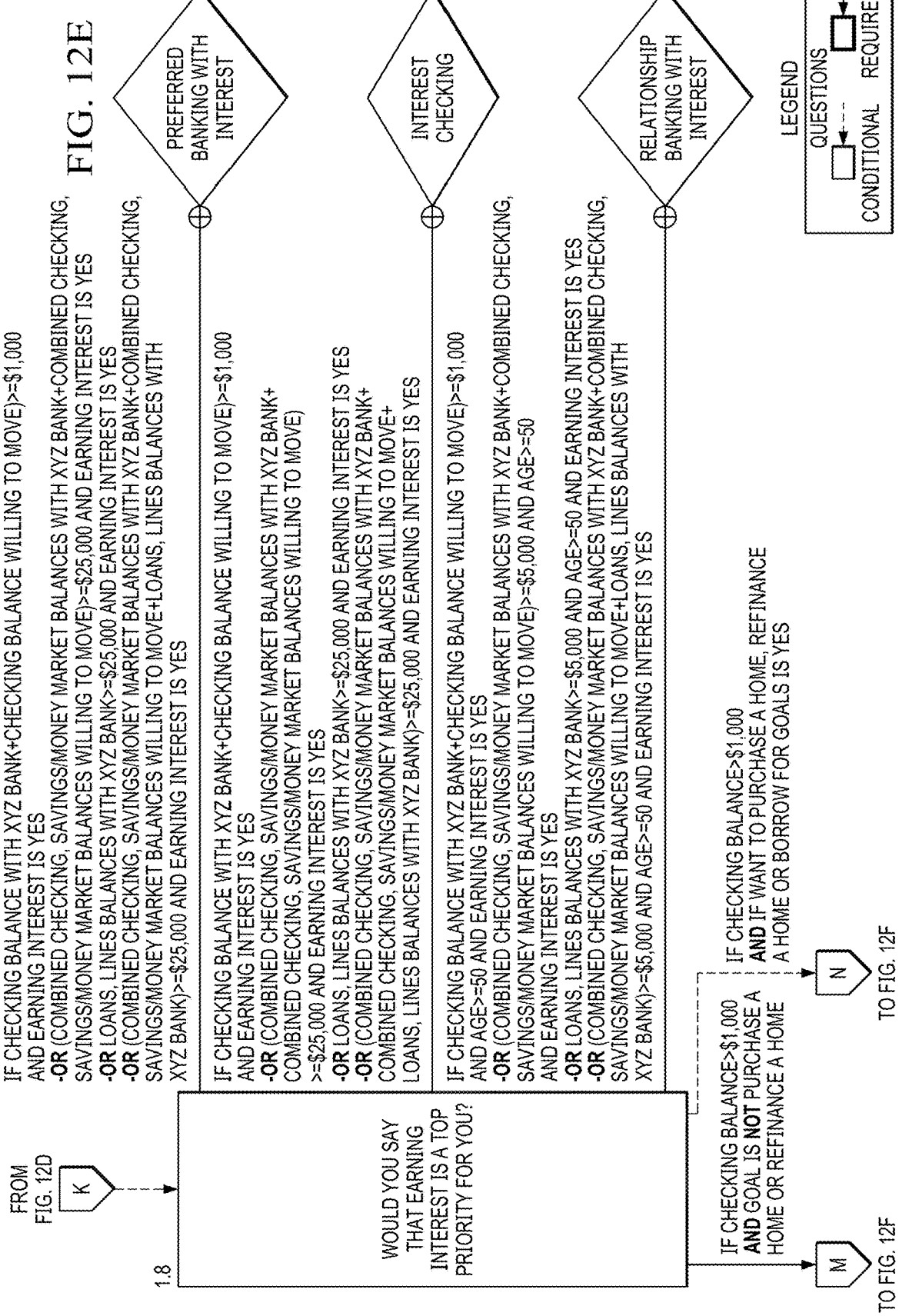

FIG. 13A

- Dashboard
- Guides
- Products
- Messages
- Settings
- Publish

Guides ⓘ

Manage Templates    Create New Guide

Ignite Credit Union
Guide ID: 50527
Last published: N/A
Delivery Type: Online

1300

- Dashboard
- Guides
- Products
- Messages
- Settings
- Publish

Guides ⓘ　　　　　　　　　　　　　　　　　Manage Templates　Create New Guide

Ignite Credit Union ...
Guide ID: 50502
Last published: N/A
Delivery Type: Online

Helping Hand Resource Guide ...
Guide ID: 50510
Last published: N/A
Delivery Type: Online

Marketing Demo Guide ...
Guide ID: 50511
Last published: N/A
Delivery Type: Online

Edit Question Page

Page Details | Question #1

Question Setup
Answers
Attributes
Validation
Rules
Custom Code

Question Overview

Select a tab on the left to edit / configure this question

- Appkey: purpose
- Question Text: Why are you here today? (Select all that apply)

[Delete Page] [Cancel / Revert Changes] [Save Page]

Edit Question Page

Page Details | Question #1

+ Add Question

Question Setup
Answers
Attributes
Validation
Rules
Custom Code

Attribute Options

Toggle None
Choose an option that will remove all checked answers when selected
Select an option:
[ Explore financial goals > ]

Toggle All
Choose an answer that will select all options when chosen
Select an option:
[ None Selected > ]

Delete Page | Cancel / Revert Changes | Save Page

Edit Question Page

Page Details | Question #2

Question Setup

Question Configuration

Answers

App Key:
payments

Attributes

Question Text:
What form of payment do you generally use when making a purchase? (Select all that apply)

Validation

Question Type:
Checkbox

Rules

App Key:
payments

Custom Code

Question Text:
What form of payment do you generally use when making a purchase? (Select all that apply)

+ Add Question

Delete Question!

Delete Page    Cancel / Revert Changes    Save Page

Add Question

Add Question

Add Question

Edit Question Page

Page Details | Question #3

Question Setup
Answers
Attributes
Validation
Rules
Custom Code

Question Configuration

App Key:
debitusage

Question Text:
How many times do you, or are you willing to, use your debit card?

Question Type:
Radio

App Key:
debitusage

Question Text:
How many times do you, or are you willing to, use your debit card?

+ Add Question

Delete Question!

Delete Page | Cancel / Revert Changes | Save Page

Edit Question Page

Page Details | Question #3

Question Setup
Answers
Attributes
Validation
Rules
Custom Code

Question Rules

*EDIT MODE: Group 0*
Which one or more best describes your financial needs today? (Select all that apply)

Select Rule Type:
Has not answered specific options ∨

Configure Rule:
☐ Need more purchasing power   ☑ Searching for great ways to build my savings
☐ Seeking a loan                ☐ Need long-term saving options What type of purchasing power are you seeking? (Select all that apply)

Select Rule Type:
Did not answer question ∨

Add Question Rule:
For your loan needs, did you have something in mind? (Select all that apply) ∨

⊕ Add Rule Set                                    ⊕ Add Rule

Close Editor

Delete Page        Cancel / Revert Changes        Save Page

+ Add Question

FIG. 13U (rotated UI mockup showing:)

Dashboard
Guides
Products
Messages
Settings
Publish

Guides ⓘ  Settings Questions Calculations [Products] Theme  (Ignite Credit Union)

Available Products

Ignite Platinum Checking  ...

Product Groups  + Add Group

Savings
Display: All
 ...
Prime Savings
IRA
Premium Money Market
Health Savings Account Checking
Display: 1
 ...
Cash Back Checking
Ignite Rewards Checking Borrowing
Display: All
 ...
Home Equity Line of Credit
Mortgage Loan
Auto Loan
Personal Loan Credit Cards

1300

Products ⓘ

| | Auto Loan | Add Product |
|---|---|---|
| 🔍 Search | Product ID: 1050486 | Edit Product |
| Home Equity Line of Credit | Description: In the market for a new or used vehicle? Whether you are purchasing from a car dealership or pre-owned vehicle from a private party, Ignite can give you a car loan that fits your finances. | |
| Ignite Rewards Credit Card | | |
| Mortgage Loan | Status: ⊙ Active | |
| Auto Loan | | |
| Personal Loan | | |
| IRA | | |
| Prime Savings | | |
| Premium Money Market | | |
| Cash Back Checking | | |
| Ignite Rewards Checking | | |
| Health Savings Account | | |
| Ignite Platinum Checking | | |

Sidebar: Dashboard, Guides, Products, Messages, Settings, Publish

SYSTEM AND METHOD FOR DYNAMICALLY-GENERATED GUIDED DIALOGUE USING ARTIFICIAL INTELLIGENCE

CROSS-REFERENCE TO RELATED APPLICATION AND PRIORITY CLAIM

This application claims priority under 35 U.S.C. § 119 (e) to U.S. Provisional Patent Application No. 63/584,572 filed on Sep. 22, 2023, which is hereby incorporated by reference in its entirety.

BACKGROUND

Organizations lack methods to engage customers or potential customers in ways that feel natural, engaging, and rewarding to the customers or potential customers. Particularly, organizations in various industries encounter difficulties in educating customers and prospective customers on the various services and products the organizations can provide or how to better assist customers with their particular needs. For example, some customers may be indirect customers that receive a product that is serviced by the organization, but do not understand how the organization can further assist with the customer's future needs or wellness. Some customers may be "one product" customers that have received a product or service, but are complacent or unengaged with the organization, often because they are not aware of other products or services available from the organization that would benefit them. Additionally, organizations often find difficulty in onboarding new customers as traditional tactics such as cold calls, sending emails, sending direct mailers, etc. can fail to capture the potential customer's attention. Further, existing approaches to communicating with customers and prospective customers, and offering products and services to customers and prospective customers, lack any means to optimize such conversations and product offerings, as well as means to optimize product performance.

SUMMARY

This disclosure relates to a system and method for guided dialogue using artificial intelligence.

Determining which products to recommend to customers or potential customers as described in this disclosure can comprise a complex product selection process which can comprise trillions of permutations to determine the right set of products for a customer or potential customer. This is further exacerbated by the complexities inherent in simultaneously handling customer eligibility for each product and customer preferences (when they may conflict). Front line employees tend to not be fully knowledgeable about products and cannot grasp all of the features, thresholds, qualification criteria and business rules of the full product portfolio, which can reach the millions to septillions of permutations. As a result, front line employees cannot and do not ask relevant and complete questions of customers/prospects. The systems and methods of this disclosure efficiently address these problems by providing conversational dialogues that can be constructed using various functional programming blocks that define the rules and associations between dialogue questions, follow up dialogue questions, and organizational products and services, and that can adapt based on behaviors of similar customers and prospects, such as based on actions or non-action through predictive analysis and machine learning models.

In one example, a method includes receiving, by at least one processor of an electronic device, a request to access a dialog builder application. The method also includes retrieving and loading, by the at least one processor, content related to a user that initiated the request. The method also includes detecting, by the at least one processor, an intent to create a new dialogue. The method also includes creating, by the at least one processor, a graphical representation of an initial dialogue structure for display in a user interface. The method also includes receiving, by the at least one processor, inputs via the user interface relating to queries products and associated rules for the new dialogue. The method also includes creating or updating, by the at least one processor, programming blocks corresponding to the queries and associated rules, wherein the programming blocks include one or more query base blocks having associated rule blocks. The method also includes receiving, by the at least one processor, an input indicating that creation of the new dialogue is complete. The method also includes deploying, by the at least one processor, the new dialogue at an online-accessible location.

In another example, a method includes creating, by at least one processor of at least one electronic device, a guided dialogue, wherein the guided dialogue includes programming blocks corresponding to queries and associated rules, and wherein the programming blocks are structured to include one or more query base blocks having associated rule blocks. The method also includes deploying, by the at least one processor, the guided dialogue at an online-accessible location, wherein a request from another electronic device to access the deployed guided dialogue causes execution of the deployed guided dialogue in response to the request.

In one or more of the above examples, during the execution of the deployed guided dialogue, the deployed guided dialogue is programmed to access, via a backend dialogue application, one or more dialogue guide bundles stored in an object storage location.

In one or more of the above examples, the one or more dialogue guide bundles include user interface theme element artifacts embedded in the one or more dialogue guide bundles.

In one or more of the above examples, the method further includes providing a dashboard in a user interface that includes one or more user interface elements displaying analytics associated with execution of the guided dialogue.

In one or more of the above examples, the method further includes adjusting the guided dialogue based on one or more parameters of the analytics being below a threshold.

In one or more of the above examples, creating the guided dialogue includes receiving, by the at least one processor, a request to access a dialog builder application, creating, by the at least one processor, a graphical representation of an initial dialogue structure for display in a user interface of the dialog builder application, receiving, by the at least one processor, inputs via the user interface relating to queries and associated rules for the guided dialogue, creating or updating, by the at least one processor, the programming blocks corresponding to the queries and the associated rules, receiving, by the at least one processor, an input indicating that creation of the guided dialogue is complete, and outputting, by the at least one processor, the guided dialogue.

In one or more of the above examples, the method further includes displaying, via the user interface, categories of queries associated with the query base blocks in a window of the user interface and displaying, via the user interface in response to a user input, a sub-window of the user interface for adding a rule in association with a query.

In one or more of the above examples, the method further includes displaying a plurality of query categories in the user interface each in association with a user interface element for toggling the query category on or off.

In one or more of the above examples, creating the guided dialogue includes receiving, by the at least one processor, a request to access a dialog builder application, retrieving and loading, by the at least one processor, content related to a user that initiated the request, detecting, by the at least one processor, an intent to create a new dialogue, creating, by the at least one processor, the new dialogue based on at least the content related to the user and the detected intent, and outputting, by the at least one processor, the new dialogue as the guided dialogue.

In one or more of the above examples, creating the new dialogue includes determining, by the at least one processor and using one or more machine learning models, to automatically generate the new dialogue, generating, by the at least one processor and using the one or more machine learning models, the new dialogue, including the programming blocks, the one or more query base blocks, and the associated rule blocks, based on at least the content related to the user, the detected intent and learned parameters of the one or more machine learning models, and populating, by the at least one processor, a graphical structure for a user interface of the dialog builder application as each programming block, each query base block, and each associated rule block is added by the one or more machine learning models.

In one or more of the above examples, the method further includes training the one or more machine learning models using training data, based on the outputs of the one or more machine learning models, using an error or loss determined using a loss function, including determining the outputs of the one or more machine learning models differ from training data ground truths and updating the one or more machine learning models based on the error or loss, wherein the loss function is a cross-entropy loss or a mean-squared error.

In one or more of the above examples, creating the new dialogue further includes receiving, by the at least one processor and using the one or more machine learning models, additional user inputs for use as additional parameters for the new dialogue, and updating, by the at least one processor, the programming blocks of the generated new dialogue according to the additional user inputs.

In one or more of the above examples, the method further includes detecting, by the at least one processor and using at least one machine learning model of the one or more machine learning models, at least one issue with the guided dialogue, determining, by the at least one processor and using the at least one machine learning model, at least one recommendation for at least one remedial action to correct the detected issue with the guided dialogue, and implementing, by the at least one processor and using the at least one machine learning model, the at least one remedial action and updating the guided dialogue.

In one or more of the above examples, implementing the at least one remedial action is performed automatically.

In one or more of the above examples, implementing the at least one remedial action is performed in response to receiving an input via the user interface in which the at least one recommendation is displayed.

In one or more of the above examples, the detected at least one issue includes one or more of a gap in a dialogue flow of the guided dialogue, a dead-end in the dialogue flow of the guided dialogue, a lack of recommendations based on the queries and the associated rules in the guided dialogue, or a lack of content in the guided dialogue related to services of the user.

In yet another example, a system includes at least one electronic device. The at least one electronic device includes a communication interface, at least one processor, and memory storing instructions. The instructions, when executed by the at least one processor, cause the at least one electronic device to create a guided dialogue, wherein the guided dialogue includes programming blocks corresponding to queries and associated rules, and wherein the programming blocks are structured to include one or more query base blocks having associated rule blocks, and deploy the guided dialogue at an online-accessible location, wherein a request from another electronic device to access the deployed guided dialogue causes execution of the deployed guided dialogue in response to the request.

In one or more of the above examples, during the execution of the deployed guided dialogue, the deployed guided dialogue is programmed to access, via a backend dialogue application, one or more dialogue guide bundles stored in an object storage location.

In one or more of the above examples, the one or more dialogue guide bundles include user interface theme element artifacts embedded in the one or more dialogue guide bundles.

In one or more of the above examples, the instructions, when executed by the at least one processor, further cause the at least one electronic device to provide a dashboard in a user interface that includes one or more user interface elements displaying analytics associated with execution of the guided dialogue.

In one or more of the above examples, the instructions, when executed by the at least one processor, further cause the at least one electronic device to adjust the guided dialogue based on one or more parameters of the analytics being below a threshold.

In one or more of the above examples, to create the guided dialogue, the instructions, when executed by the at least one processor, further cause the at least one electronic device to receive a request to access a dialog builder application, create a graphical representation of an initial dialogue structure for display in a user interface of the dialog builder application, receive inputs via the user interface relating to queries and associated rules for the guided dialogue, create or update the programming blocks corresponding to the queries and the associated rules, receive an input indicating that creation of the guided dialogue is complete, and output the guided dialogue.

In one or more of the above examples, the instructions, when executed by the at least one processor, further cause the at least one electronic device to display, via the user interface, categories of queries associated with the query base blocks in a window of the user interface and display, via the user interface in response to a user input, a sub-window of the user interface for adding a rule in association with a query.

In one or more of the above examples, the instructions, when executed by the at least one processor, further cause the at least one electronic device to display a plurality of query categories in the user interface each in association with a user interface element for toggling the query category on or off.

In one or more of the above examples, to create the guided dialogue, the instructions, when executed by the at least one processor, further cause the at least one electronic device to receive a request to access a dialog builder application, retrieve and load content related to a user that initiated the request, detect an intent to create a new dialogue, create the new dialogue based on at least the content related to the user and the detected intent, and output the new dialogue as the guided dialogue.

In one or more of the above examples, to create the new dialogue, the instructions, when executed by the at least one processor, further cause the at least one electronic device to determine, using one or more machine learning models, to automatically generate the new dialogue, generate, using the one or more machine learning models, the new dialogue, including the programming blocks, the one or more query base blocks, and the associated rule blocks, based on at least the content related to the user, the detected intent and learned parameters of the one or more machine learning models, and populate a graphical structure for a user interface of the dialog builder application as each programming block, each query base block, and each associated rule block is added by the one or more machine learning models.

In one or more of the above examples, the instructions, when executed by the at least one processor, further cause the at least one electronic device to train the one or more machine learning models using training data, based on the outputs of the one or more machine learning models, using an error or loss determined using a loss function, including determining the outputs of the one or more machine learning models differ from training data ground truths and updating the one or more machine learning models based on the error or loss, wherein the loss function is a cross-entropy loss or a mean-squared error.

In one or more of the above examples, to create the new dialogue, the instructions, when executed by the at least one processor, further cause the at least one electronic device to receive, using the one or more machine learning models, additional user inputs for use as additional parameters for the new dialogue and update the programming blocks of the generated new dialogue according to the additional user inputs.

In one or more of the above examples, the instructions, when executed by the at least one processor, further cause the at least one electronic device to detect, using at least one machine learning model of the one or more machine learning models, at least one issue with the guided dialogue, determine, using the at least one machine learning model, at least one recommendation for at least one remedial action to correct the detected issue with the guided dialogue, and implement, using the at least one machine learning model, the at least one remedial action and updating the guided dialogue.

In one or more of the above examples, implementation of the at least one remedial action is performed automatically.

In one or more of the above examples, implementation of the at least one remedial action is performed in response to receiving an input via the user interface in which the at least one recommendation is displayed.

In one or more of the above examples, the detected at least one issue includes one or more of a gap in a dialogue flow of the guided dialogue, a dead-end in the dialogue flow of the guided dialogue, a lack of recommendations based on the queries and the associated rules in the guided dialogue, or a lack of content in the guided dialogue related to services of the user.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), cloud storage components, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as APPLETV or GOOGLE TV), a smart speaker or speaker with an integrated digital assistant (such as APPLE HOMEPOD or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 12A-12H illustrate an example graphical representation of a dialogue constructed in accordance with this disclosure;

DETAILED DESCRIPTION

Figure 1:
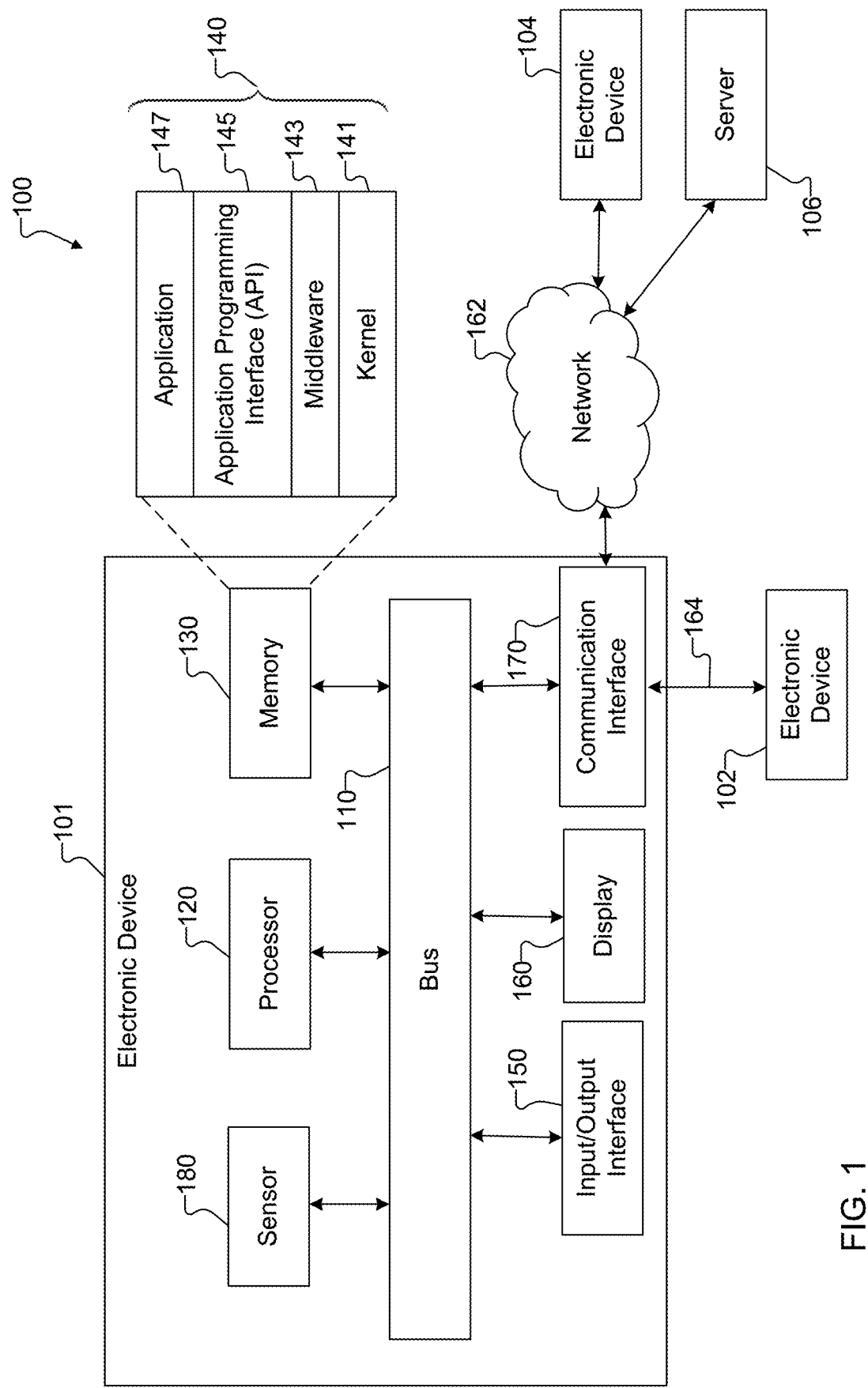
FIG. 1 illustrates an example network configuration including an electronic device in accordance this disclosure.

FIGS. 1 through 14B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, Overall, organizations lack methods to engage customers or potential customers in ways that feel natural, engaging, and rewarding to the customers or potential customers. Particularly, organizations in various industries encounter difficulties in educating customers and potential customers on the various services and products the organizations can provide or how to better assist customers with their particular needs. For example, some customers may be "one product" customers that have received a product or service, but are complacent or unengaged with the organization, often because they are not aware of other products or services available from the organization that would benefit them, or they received a product that is serviced by the organization, but do not understand how the organization can further assist with the customer's future needs or wellness. Additionally, organizations often find difficulty in onboarding new customers as traditional tactics such as cold calls, sending emails, sending direct mailers, etc. can fail to capture the potential customer's attention. Further, existing approaches to communicating with customers and prospective, and offering products and services to customers and prospective customers, lack any means to optimize such conversations and product offerings, as well as means to optimize product performance.

This disclosure provides systems and methods for building, executing, and continually refining conversational/dialogue models that interact with users to engage them in one or more educational or decision-making processes. Among other benefits provided to organizations such as significantly reduced resources for creation and dynamic generation of dialogues, the dialogue models can alleviate the above-described issues by engaging customers in a digital conversation. For instance, "one product" customers, such as a customer that receives a car loan or credit card initially via a third party institution, but that is now serviced by the organization, can engage a dialogue model of this disclosure to educate them on the many services the organization offers in a natural way, and direct them to other products and services provided by the organization. These customers can thus engage with a dialogue model of this disclosure to undergo a digital conversation with the model to better understand the further value the institution can add to their financial needs. Additionally, potential customers can interact with a dialogue model of this disclosure to educate them on products and services, as well as onboard them in a natural way that can skip filling out traditional forms, or even to opt out of using products or services in an efficient manner.

Some online dialogue systems have been created previously, such as that described in U.S. Pat. No. RE42,869, which is incorporated by reference herein in its entirety. While such online dialogue systems provided a way for organizations to ask customers questions in an online manner (e.g., in a browser), gather answers, and perform certain analytics based on the answers (e.g., customer demographic analytics, etc.), these prior systems were constructed using traditional static website building techniques, and did not provide ways to efficiently and dynamically build new guided dialogues, nor ways to continually refine and update dialogue models. This disclosure further provides dialogue model builders, and associated user interfaces, that enable organizations to efficiently and dynamically build new guided dialogues based on the organization's needs, products, and services for instant deployment, built from the ground up or based on templates and/or themes.

The dialogue building tools of this disclosure and resulting dialogue models can be constructed using various functional programming blocks that define the rules and associations between dialogue questions, follow up dialogue questions, and organizational products and services, and can adapt based on behaviors of similar customers and prospects (i.e., actions or non-action through predictive analysis and machine learning models). Additionally, the dialogue models can incorporate machine learning techniques during the building and/or execution of the dialogue models to intelligently generate and train new models and/or update and continually refine existing models based on information obtained over time. The dialogue models of this disclosure can be applied in numerous industries and used by various types of organizations, including in financial institutions and financial industries, insurance industries, utilities industries such as energy providers and internet service providers, wealth management, retail, and healthcare.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or in addition to other functions or services. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
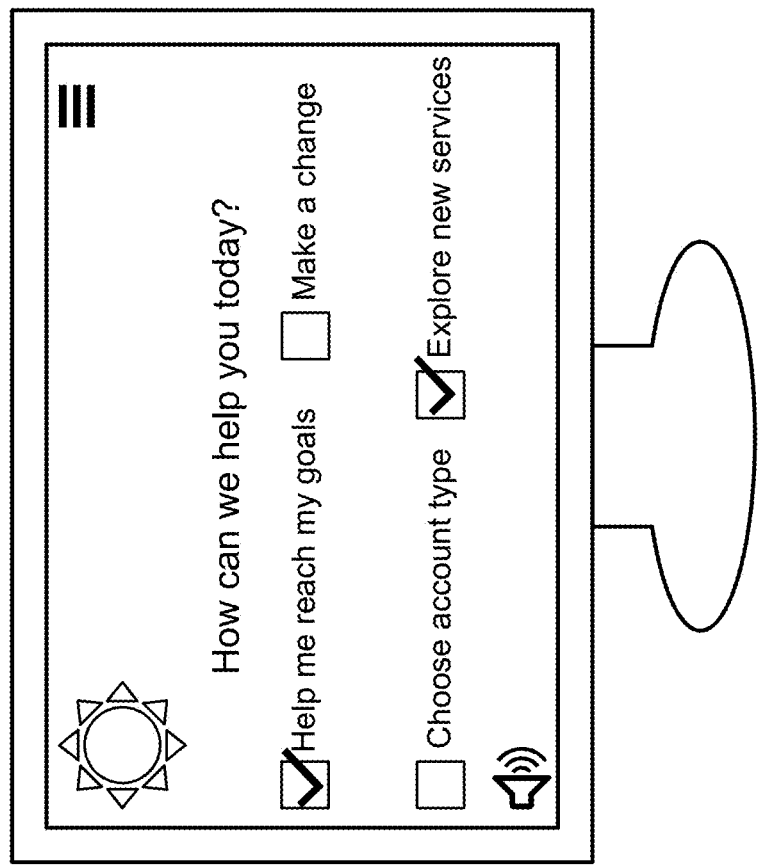
FIGS. 2A-2C illustrate an example execution of a guided dialogue as experienced by a user in accordance with this disclosure.
Figure 2A:
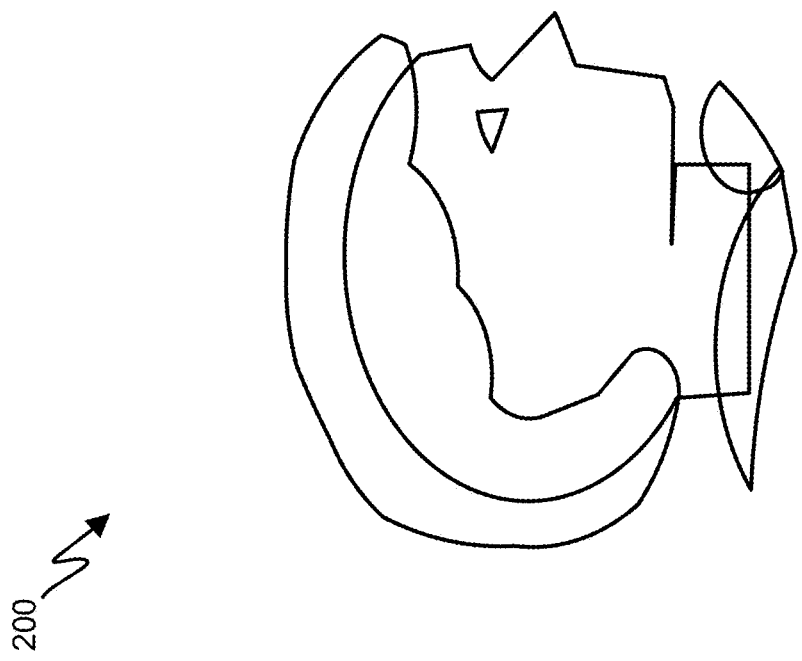
Figure 2B:
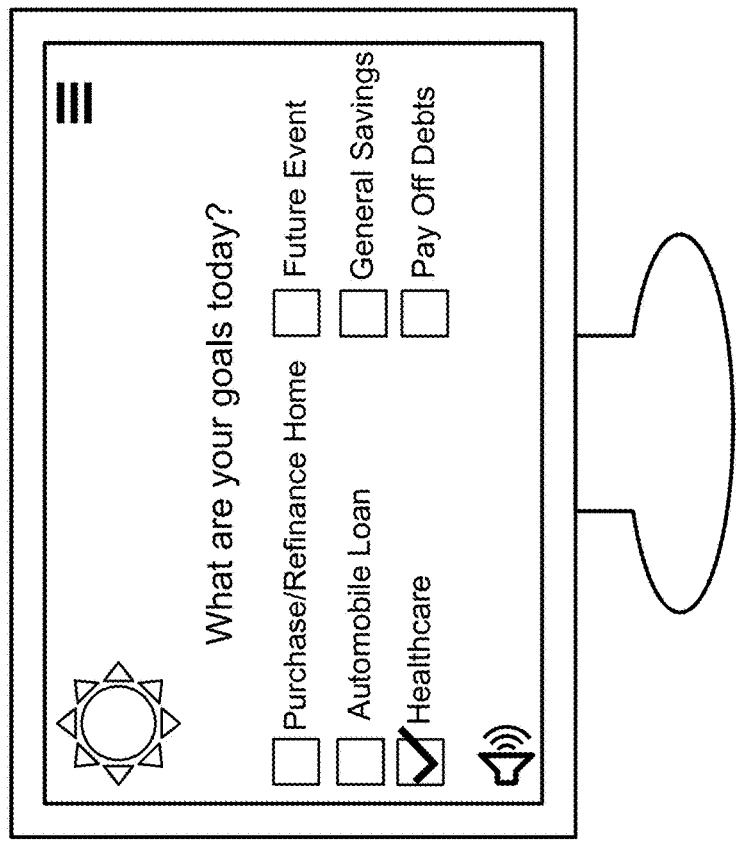
Figure 2B:
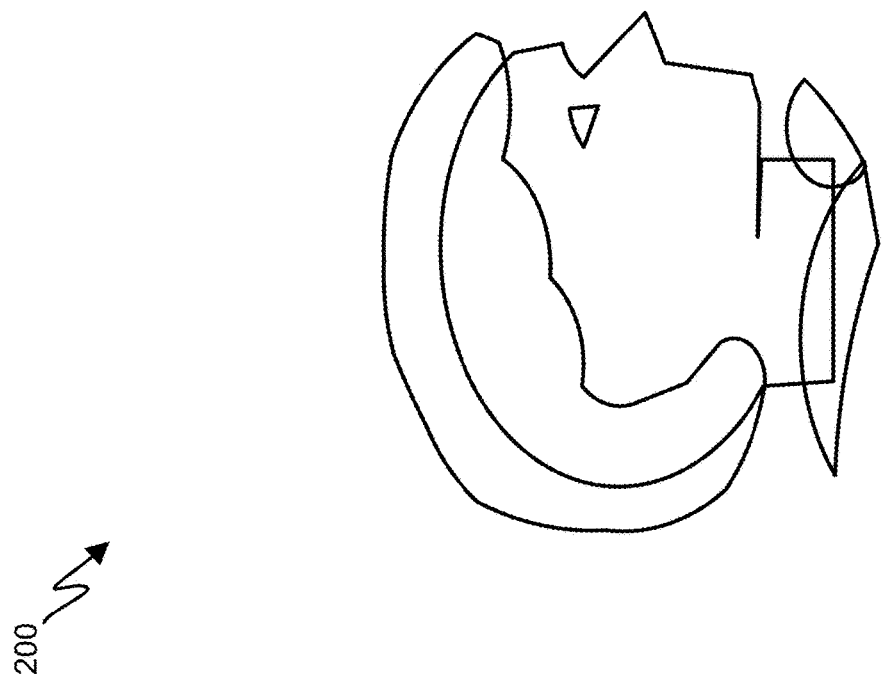
Figure 2C:
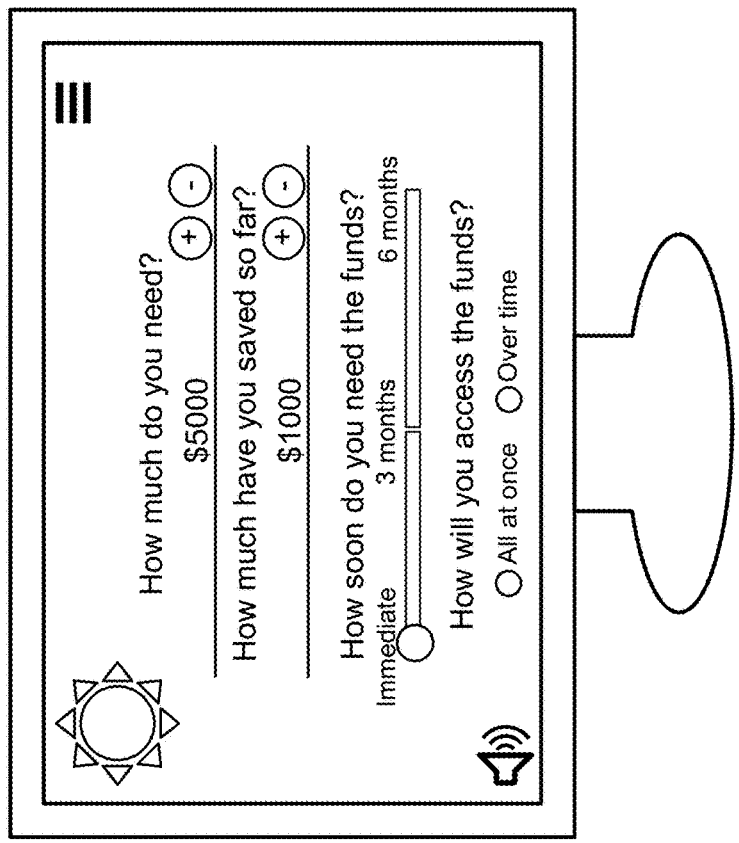

FIGS. 2A-2C illustrate an example execution 200 of a guided dialogue as experienced by a user in accordance with this disclosure. For ease of explanation, the execution 200 shown in FIG. 2 is described as being implemented on or supported by the electronic device 101 in the network configuration 100 of FIG. 1. However, the execution 200 shown in FIG. 2 could be used with any other suitable device(s) and in any other suitable system(s).

As shown in FIG. 2A, during the execution 200, a user can be presented by the dialogue model with a starting query that performs the role of gathering information from the user to determine in which services and/or products the user is interested. This can inform the dialogue model as to whether the user is a new or existing user, and what particular actions or information would be most beneficial to the user. In some cases, some of this information may be prefilled from other systems so it does not have to be gathered from the user. For example, if the user is an existing customer, and/or has existing products, and balances, etc., this information can be retrieved from other associated systems to assist with selecting what questions are asked, where the dialogue initiates, etc. As shown in FIG. 2B, depending on how the user responds, the dialogue model can present one or more follow up queries. In some embodiments, the follow up query can be determined based on rules associated with a query and the selected answer(s) to that query. Additionally or alternatively, follow up queries can be determined dynamically using machine learning, where the dialogue model is trained to recognize associations between answers and related queries and products/services provided by the organization.

For example, as shown in FIGS. 2A and 2B, if the user (e.g., an end customer or business representative), in response to an initial query of "How can we help you today?", selects both "help me reach my goals" and "explore new services," the dialogue model determines to present the user with a follow-up query shown as "What are your goals today?" with selectable responses according to various products or services offered by the organization. In some embodiments, the process can also start on a system that takes data and initiates an interface with a user. These queries may be displayed via text on a screen of the electronic device 101, output audibly to the user, or both. For instance, as shown in FIG. 2B, this particular example displays various financial services to the user. Upon selection of one of the options, the dialogue model can perform a variety of action such as again determining a follow up query based on the selected option, or extending or pruning the dialogue based on answers or information received up to that point. In some cases, further follow up queries may gather additional information in a way that could supersede at least a portion of filling out an application form. For example, as shown in FIG. 2C, in response to selecting a "healthcare" option, the user is presented with a screen that then inquires as to various parameters for funding a healthcare loan. In this manner, the user can be taken through a process of discovering what services and products organizations offer, and securing those services and products, in an interactive, engaging, and natural manner.

Although FIGS. 2A-2C illustrate one example of an execution 200 of a guided dialogue, various changes may be made to FIGS. 2A-2C. For example, various components and functions shown in FIGS. 2A-2C may be combined, further subdivided, replicated, or rearranged according to particular needs. It will be understood that the questions and answers shown in FIGS. 2A-2C are merely examples, and any other types of questions or answers pertaining to any other type of industry, organization, product, and/or service could be executed by the dialogue model. Additionally, although a particular type of electronic device is depicted in FIGS. 2A-2C, it will be understood that any type of electronic device can be used to display the guided dialogue.

Figure 3:
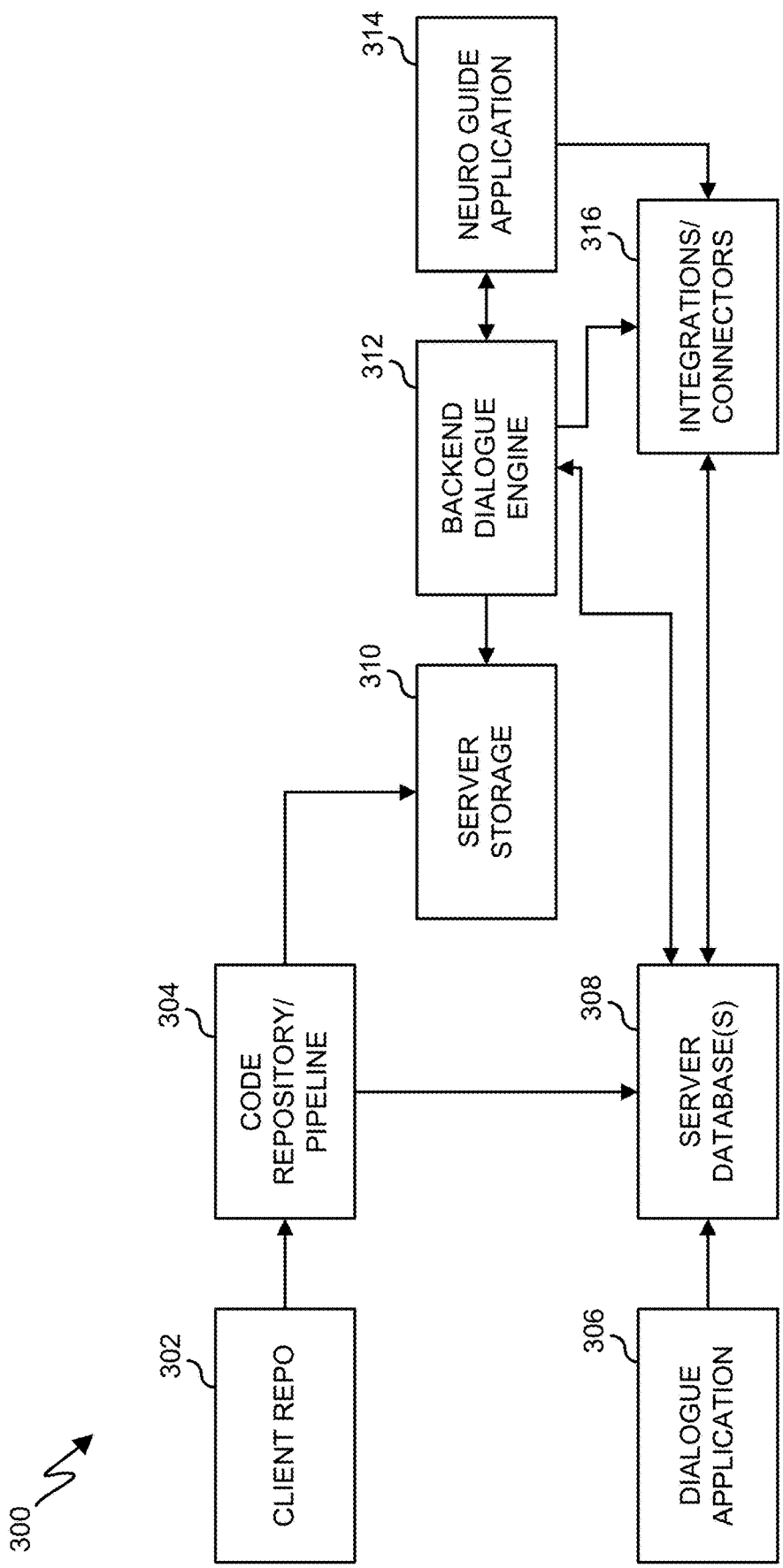
FIG. 3 illustrates an example dialogue model system in accordance with this disclosure.

FIG. 3 illustrates an example dialogue model system 300 in accordance with this disclosure. For ease of explanation, the system 300 is described as involving the use of server 106 in the network configuration 100 of FIG. 1. However, the system 300 may be used with any other suitable electronic device(s) and in any other suitable system(s).

As described herein, this disclosure provides building guided conversations by or for clients/organization to help them understand customer needs and provide them the best recommendations based on the conversation, business rules, thresholds, and other qualification criteria. Additionally, value can be provided to clients by showing the client what products they were able to sell based on the guided recommendation results and output. In some cases, a dialogue model or guide can be created using a custom implementation specific to an organization, such as if the organization is very sophisticated and needs some custom behavior or functionality. As shown in FIG. 3, the system 300 includes a client repository 302 that stores configurations and code for custom dialogue guides built for clients/organizations. The configurations and code can include client themes, client products, guide messages/queries, guide query flows, custom integrations, and user interfaces (UI) and user experience designs (UX). The client repository 302 is communicatively coupled to a code repository or pipeline 304 that runs a pipeline to server resources when client code is committed. The pipeline 304 can connect to server databases 308 (storing database tables for client information and for dialogue guide configurations, dialogue settings, aggregated data from across organizations and across industries such as including various product and/or customer analytics, etc.) and server storage 310 (which stores various files pertaining to themes, integrations, etc.).

The system 300 also includes a dialogue application 306 that allows for the creation of dialogue models and guides by or for clients/organizations. The dialogue application 306 can create client accounts, build dialogue models or guides associated with client accounts, configure products associated with client accounts, and publish/deploy built guides online for customer interaction. The dialogue application 306 allows for quickly configuring guides using a user-friendly platform, which alleviates the complexities of historically having to manually create dialogue configurations. The dialogue application 306 allows for quick and efficient configuration of dialogue guides without having to newly code the question flow, product rules, and messages. Particularly, the dialogue application 306 supports selecting question flows that can be pre-created and reused, selecting from various UI design themes, selecting from various products/services, and providing dialogue messages to fill in the conversation. When a created dialogue guide is published by the dialogue application 306, a publish operation retrieves settings from a default dialogue table in server databases 308, writes new configurations for the newly created dialogue guide to respective databases within the server databases 308, and stores portions of the configurations in server storage 310.

As shown in FIG. 3, the system 300 further includes a backend dialogue engine 312 that stores logic for executing a dialogue guide. The backend dialogue engine 312 evaluates dialogue query logic and product rules, and also hosts backend services that the front-end uses, as well as some of the services clients/organizations call to send and/or retrieve data to the server system. When a guide is accessed, the backend dialogue engine 312 retrieves the associated configurations from the server databases 308, based on guide domain, from the respective database table and server storage 310. The backend dialogue engine 312 also loads up the guide theme code from server storage 310 and presents the guide to users, such as via an HTML page on a browser. The backend dialogue engine 312 further executes the dialogue guide based on the user selected responses to queries to present follow up queries and/or other information to the user. The backend dialogue engine 312 can also execute some Representational State Transfer (REST) services that receive data from client devices.

The system 300 also includes a neuro guide application 314 that acts as a frontend application or framework for dialogue guides. The neuro guide application 314 communicates with the backend dialogue engine 312 to save and fetch data during a conversation, such as an online conversation a face-to-face conversation, an over-the-phone or over-video-call conversation, etc. In various embodiments, dialogue guide themes can be built on the neuro guide application 314. The neuro guide application 314 allows for custom implementation themes to be built, where themes created in client repository 302 typically have business logic in them that is specific to the client UX, while the UI can be styled to reflect the client's style guide. The neuro guide application 314 also allows dialogue themes used for dialogues to be built without business logic included in the code. Themes can have their own dedicated components and also use shared components from the neuro guide application 314.

The system 300 also includes integrations/connectors. Dialogue guides can have connectors associated with them. For example, dialogue guides may use server services as an integration or they may also have a custom connectors developed to integrate with other servers/systems (in-house or third party. These integrations can include lead processors (used to send end user contact information data to the client organization at the end of a conversation), dialogue services (which can allow clients to pull guide data using REST endpoints), single sign-on services (allows dialogue guides to authenticate a user from a client's user pool before the accessing the guide), and other custom client connectors such as integrations to CRM and account opening systems. In general, these integrations/connectors can serve to receive and send data, further personalize the experience, make the rules and logic smarter (in both the conversation and the product matching/presentment), and feed machine learning algorithms for additional learning.

Although FIG. 3 illustrates one example of a dialogue model system 300, various changes may be made to FIG. 3. For example, various components and functions in FIG. 3 may be combined, further subdivided, replicated, or rearranged according to particular needs. Also, one or more additional components and functions may be included if needed or desired. For instance, a reporting portal may also be included in the system 300 that is used to display data to clients to show them the analytics and performance from their associated guides. In general, computing and server systems come in a wide variety of configurations, and FIG. 3 does not limit the scope of this disclosure to any particular configuration. Also, while FIG. 3 illustrates one operational environment in which various features disclosed in this patent document can be used, these features could be used in any other suitable system.

Figure 4:
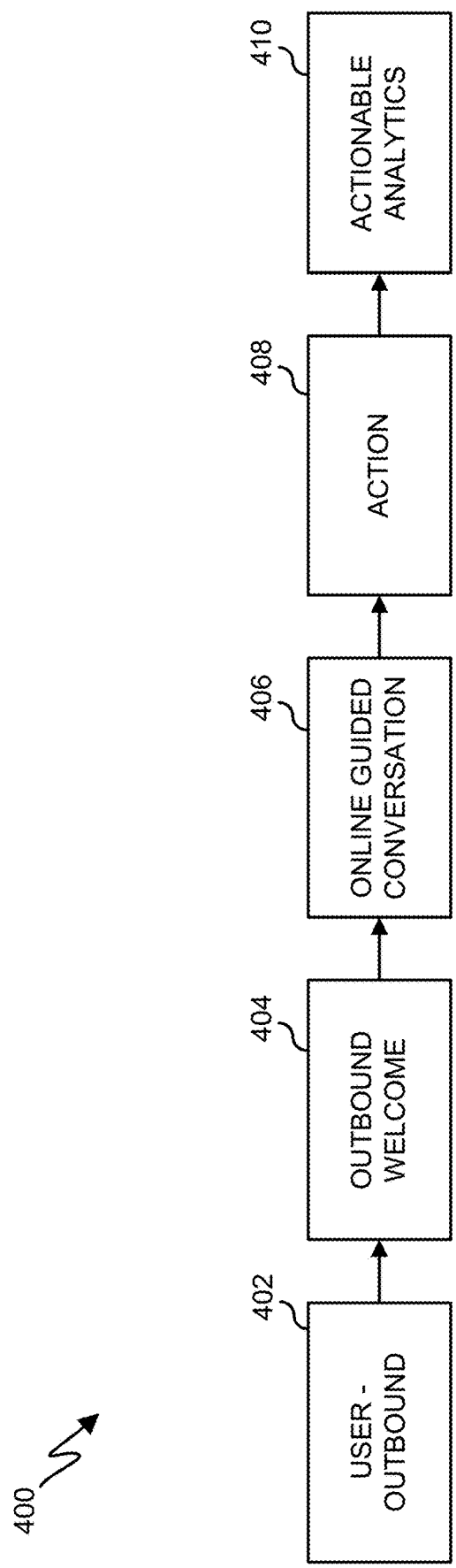
FIG. 4 illustrates an example outbound interaction process in accordance with this disclosure.

FIG. 4 illustrates an example outbound interaction process 400 in accordance with this disclosure. For ease of explanation, the process 400 is described as involving the use of one or more electronic devices 101 in the network configuration 100 of FIG. 1. However, the process 400 may be used with any other suitable electronic device or a combination of devices and in any other suitable system(s).

One practical advantage for organizations utilizing the dialogue models and building tools of this disclosure includes that outbound customer service can be substantially improved by engaging users (such as "one product" customers or potential customers, as described above) with the dialogue models to better engage them with the organization. This can include performing outbound and outreach marketing to direct users to dialogue guides, which can lead to converting the users to continuing or new customers, increasing organization growth, all as part of a single closed marketing loop.

For example, as shown in FIG. 4, at block 402, a user is targeted for outbound service. At block 404, an outbound welcome is sent to the user, such as via an email, letter, or call center representative directing the user to engage with an online dialogue model (such as via a URL link). In some cases, the outbound welcome can include a quick response (QR) code that directs the user to an online dialogue guide. At block 406, the user interacts with the online dialogue guide to reveal and learn about organization products and services that may meet additional user needs. At block 408, as part of the guided conversation, the user can perform various actions, such as applying for a new service or product, scheduling an appointment, sending an email to an client, immediately contacting or being contacted by an organizational representative, such as via a telephone number or email address provided, be directed to visit an organizational location, text results of the conversation to a user's device, print recommendations provided by the dialogue guide, and/or share results with others such as via email or text. At block 410, based on the user's dialogue guide responses and actions performed, actionable analytics can be provided to the user. For example, organizations can access an analytics dashboard that provides dialogue campaign results, actionable data, dialogue traffic information, product needs matched, and other analytics. In various embodiments, the analytics obtained from user interactions with dialogue guides can be used to train or further refine dialogue models using machine learning.

Although FIG. 4 illustrates one example of an outbound interaction process 400, various changes may be made to FIG. 4. For example, while shown as a series of steps, various steps in FIG. 4 could overlap, occur in parallel, occur in a different order, or occur any number of times.

Figure 5:
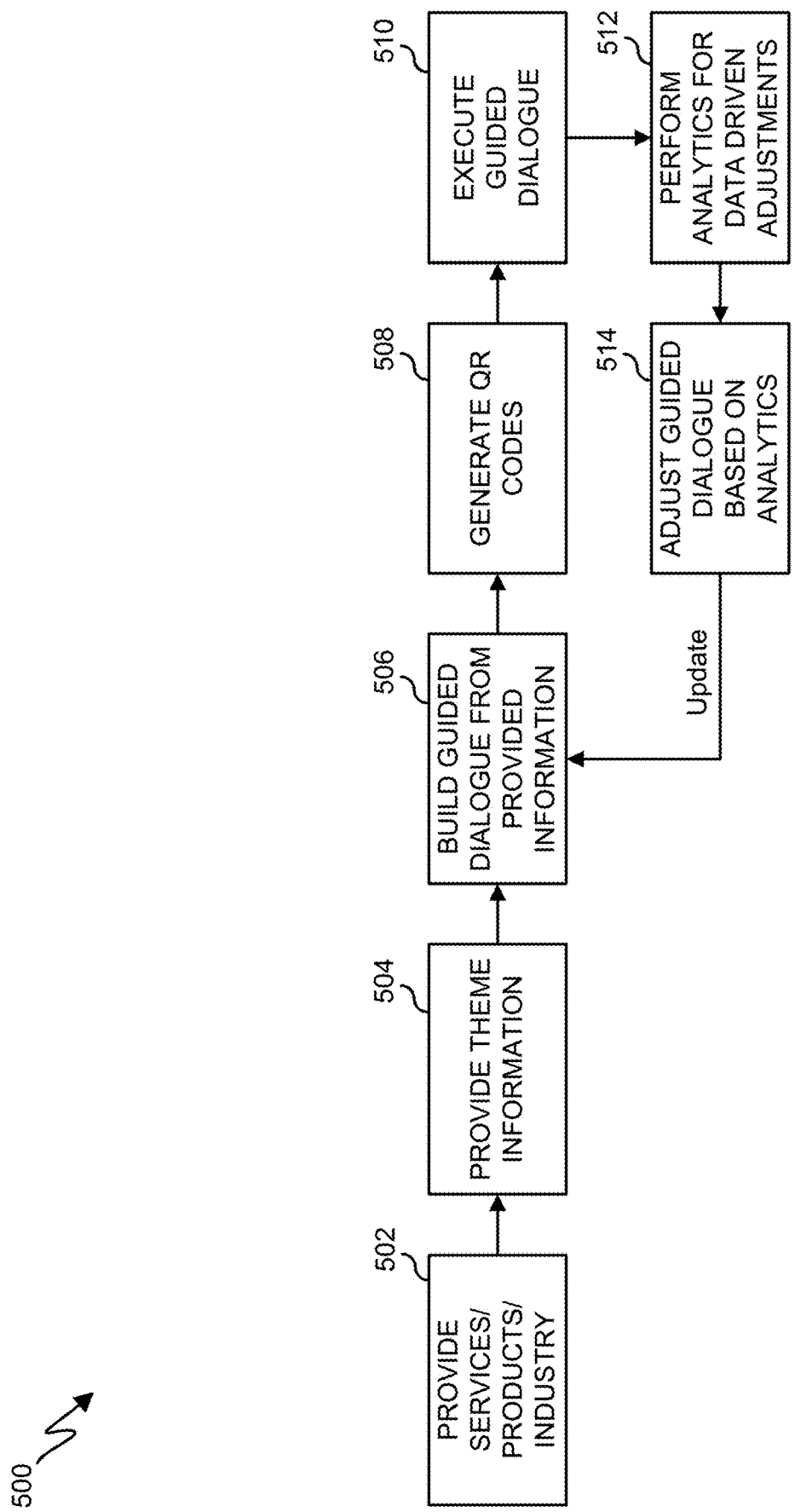
FIG. 5 illustrates an example guided dialogue model building process in accordance with this disclosure.

FIG. 5 illustrates an example guided dialogue model building process 500 in accordance with this disclosure. For ease of explanation, the process 500 is described as involving the use of the server 106 in the network configuration 100 of FIG. 1. However, the process 500 may be used with any other suitable electronic device or a combination of devices and in any other suitable system(s).

At block 502, information is gathered for building a new guide, such as gathering information on services, products, the associated industry, institutional branding and marketing styles, organization structure(s), etc. In some embodiments, the data gathering at block 502 can be a manual process in which organizational representatives are consulted concerning their needs, current outbound processes, customer volumes such as number customers or data on potential customers, current marketing automation processes already enacted, and the services and products (and any priorities therein) offered by the organization. In some embodiments, this data gathering can be performed automatically by a dialogue model building tool configured to prompt organizations for the information, and then store the information for building a guided dialogue model, or, in some embodiments, automatically building a guide using machine learning based on the informational inputs.

At block 504, theme information also can be provided such as in one of the manners described above, such as to provide organizational logos, themes, colors, tones, etc. At block 506, a guided dialogue model is built from the provided information. As indicated above, the guided dialogue model can be built by, or for, the organization using a building tool and interface as described in this disclosure, or automatically using a trained machine learning model. In some embodiments, the trained machine learning model can be part of the guided dialogue model, or can be a separate model that builds and manages guided dialogue models. Depending on the organization, associated products/services, and rules governing the created guided dialogue model, dialogues will have hundreds of thousands of permutations, and recommendations including billions to septillions of permutations, based on how a user interacts with the dialogue model and based on the decisioning logic. At block 508, once the guided dialogue model is built and deployed online, the server system can generate QR codes that can be provided to users to direct the users to the guided dialogue model. At block 510, the built guided dialogue model is executed one or more times, engaging one or more users in a conversational exchange.

At block 512, based on the one or more executions of the guided dialogue model, the server performs analytics to be used for data driven adjustments to the guided dialogue model. For example, the conversation portion of a dialogue can be adjusted, such as adjusting the conversation flow (i.e., if Question1, AnswerC, is X, therefore the ML model predicts the answer to Question2 to be Y within the pre-selected confidence level threshold (i.e., >95%), then Question2 is "skipped" and Question19 is "added" to the conversation), or the tone, wording, or images can be adjusted (depending on how the user is responding to the dialogue, visual adaptations can be made to improve the performance and experience for each user).

As another example, if one organizational product or service is shown by the gathered analytics to be recommended more often or less often, part of the guided dialogue model pertaining to a product or service is rarely accessed (below a threshold access number or percentage), or otherwise based on established rules or predictive analysis, it may be determined that the guided dialogue model should be adjusted. For example, a threshold for when a product is recommended could be adjust such that, for instance, the product is recommended more often. As another example, the product or service could be eliminated from the guide, or portions of the guide pertaining to the product or service could be reprioritized, such as to appear earlier or later in the guide, or more frequently or less frequently. This determination can be performed manually (such as via organization or other entity reviewing analytics provided via analytics dashboard), or automatically (such as via a server process periodically reviewing gathering analytics).

As yet another example, adjustments can also be made to the presentment portion. For instance, the order of presenting recommendations can be rules-based or ML model prediction-based, the actions (calls-to-action) associated with the recommendations or the user's profile can be rules-based or ML model prediction-based, and/or the promotions and/or pricing associated with the recommendations or the user's profile can be rules-based or ML model prediction-based.

In some embodiments, the machine learning model can periodically receive analytical data and performance results of previous guides stored in database and/or provided by analytics gathered from execution of the guided dialogue model and determine whether to make adjustments to the machine learning model. For example, in addition to the example adjustments noted above, the machine learning model can be trained to recognize when products or services interest has fallen below a threshold. Based on the nature of the product or service, the industry, and so on, the machine learning models can adjust the guided dialogue model accordingly. At block 514, the guided dialogue model is adjusted based on the gathering analytics. The process 500 moves back to block 506 to then update or rebuild, if necessary, the guided dialogue model, generate new QR codes, if necessary, and again execute the guided dialogue model.

Although FIG. 5 illustrates one example of an outbound interaction process 400, various changes may be made to FIG. 5. For example, while shown as a series of steps, various steps in FIG. 5 could overlap, occur in parallel, occur in a different order, or occur any number of times. As a particular example, block 508 may be skipped after performing block 514, such as if QR codes generated upon first building the guided dialogue model are still valid for the updated guided dialogue model.

Figure 6:
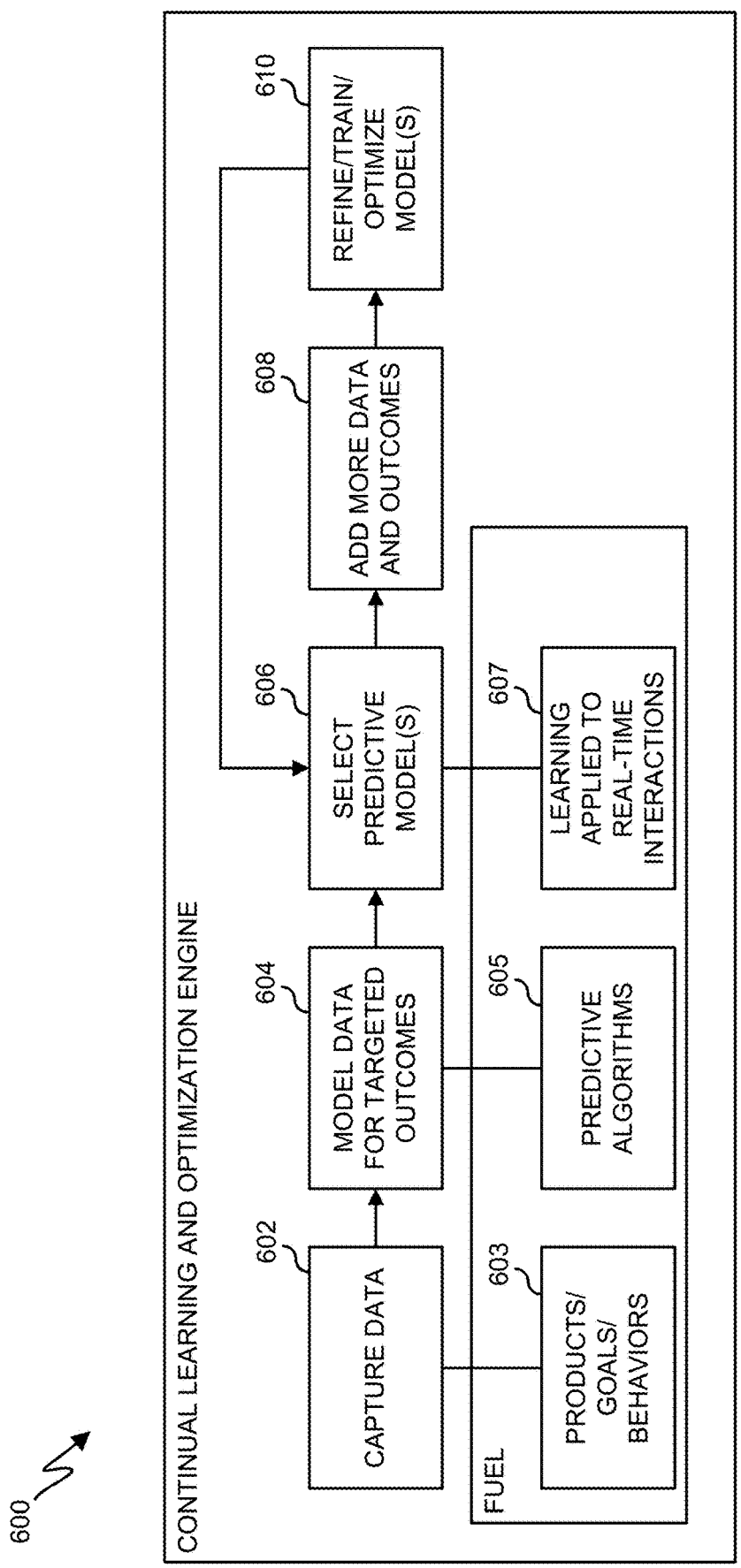
FIG. 6 illustrates an example machine learning dialogue model building process in accordance with this disclosure.

FIG. 6 illustrates an example machine learning dialogue model building process 600 in accordance with this disclosure. For ease of explanation, the process 600 is described as involving the use of the server 106 in the network configuration 100 of FIG. 1. However, the process 600 may be used with any other suitable electronic device or a combination of devices and in any other suitable system(s).

As shown in FIG. 6, a continual learning and optimization engine is executed to both construct and continually refine/optimize predictive machine learning models. At block 602, data is captured for use in defining the machine learning models, including data such as organizational products, goals, recommendations and qualification criteria, calls-to-action, and desired dialogue behaviors. At block 604, data is modeled for targeted outcomes using predictive algorithms 605. This modeling can also be performed offline in a regulated environment to provide more control over the models and decision making.

Based on the data modeling, at block 606, one or more predictive models are selected, such as the models that exhibit the most accuracy. Making this selection can include, at block 607, performing learning applied to real-time interactions, such as customer-facing interactions to provide realtime benefits at scale. At block 608, more data and outcomes are added based on how the predictive machine learning model(s) performs in the real-time interactions, based on how users interact with predictive machine learning model(s), or based on desired additional functionalities of the predictive machine learning model(s). At block 610, the predictive machine learning model(s) are refined, retrained, and/or optimized based on the added data and outcomes.

Although FIG. 6 illustrates one example of a machine learning dialogue model building process 600, various changes may be made to FIG. 6. For example, while shown as a series of steps, various steps in FIG. 6 could overlap, occur in parallel, occur in a different order, or occur any number of times.

Figure 7:
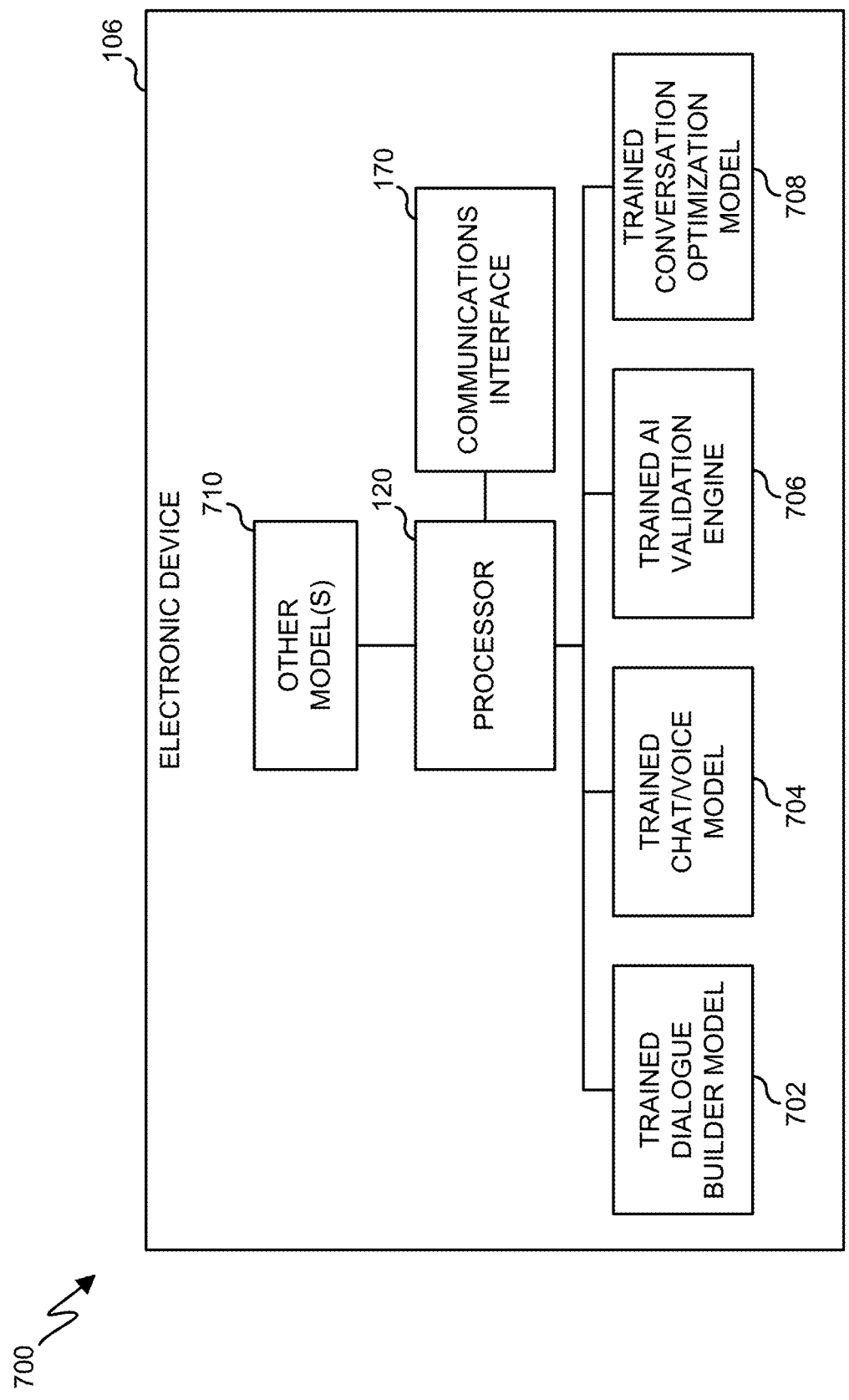
FIG. 7 illustrates an example AI guided dialogue building system in accordance with this disclosure.

FIG. 7 illustrates an example AI guided dialogue building system 700 in accordance with this disclosure. For ease of explanation, the system 700 is described as involving the use of server 106 in the network configuration 100 of FIG. 1. However, the system 700 may be used with any other suitable electronic device(s) and in any other suitable system(s).

The system 700 includes the server 106, having at least one processor 120 and at least one communications interface 170. It will be understood that the server 106 can be one or more servers making up a server system architecture, such as part of the system 300, or as otherwise described in aspects of this disclosure. The processor 120 is operatively coupled to, or otherwise has access to, one or more machine learning models such as a trained dialogue builder model 702, a trained chat/voice model 704, a trained AI validation engine 706, a trained conversation optimization model 708, and/or one or more other models 710. The machine learning models can act as optimization model to provide/recommend different questions to be asked of the user, different images to be displayed, different calls-to-action to be initiated, different promotions/advertisements/pricing to be offered, and messages (text verbiage) to be determined and displayed in real-time or offline.

The dialogue builder model 702 is trained to assist clients with building guided dialogues, importing products and creating product rules, generating conversation flows based on known client products, marketing campaigns, creating optimal conversation flows based on prior knowledge, products, and queries, and adjusting tones and rephrasing questions based on settings or preferences. The AI validation engine 706 is trained to review dialogue guides, during and/or after creation, to review queries and product rules to determine if a particular guide has any problems, and to recommend solutions to those problems. For example, the AI validation engine 706 can review queries and product rules to determine if gaps or dead-ends in the dialogue or product recommendations exist, and can recommend fixes, adjustments, and/or optimizations with additional conversation queries, product changes, or rule/criteria changes in product matching logic. The conversation optimization model 708 can be executed during a running guided dialogue session to, in realtime, present optimal questions, question flow, and/or optimal recommendations and actions for each conversation with each end user based on the current situation, such as by recognizing certain questions or recommendations would be appropriate and temporarily deviating from a previously-created guided dialogue.

The chat/voice model 704 can be a large language model that provides a chat-based interface using text and/or voice to converse with organizational representatives on building and adjusting guided dialogues. In some embodiments, the chat/voice model 704 can also enable organizational representatives to ask questions concerning their data, insights learned from their data, receive suggestions on potential analyses for forecasting, etc. In some embodiments, the chat/voice model 704 can also provide a chat-based interface with end user (e.g., customers) to interact via chat with the guided dialogues instead of, or in addition to, click/touch interaction. The other models 710 can include, for example, models that support the models 702-708, such as automated speech recognition (ASR) or natural language processing (NLP) models. The other machine learning models 710 can also include machines learning models used to optimize outcomes such as end user actions and behaviors or product purchases, to discover and present insights about organizations such as information on people, products, customer segments, etc., and/or to suggest changes to product recommendations in an organization's product portfolios or sales workflows. Further, the machine learning models can be refined/optimized over time based on realtime results and analytics and/or based on simulations informing potential optimizations/changes and their impact.

Each of the machine learning models can be trained on training data appropriate for their respective tasks. For example, the dialogue builder model 702 can be trained using previously created guides that are labeled with parameters such as industry type, product types, guide results, performance data, and/or overall quality, in addition to a plurality of other parameters. The chat/voice model 704 can be trained using text or audio samples with labels pertaining to content, industries, products, queries, etc. The AI validation engine 706 can be trained using previously created guides labeled with respect to issues (or non-issues) found within the guides. The conversation optimization model 708 can be trained using previously created guides and labeled as to which queries, products, or recommendations would improve the guide.

During training of each of the models using the training data, based on the output of the respective model, an error or loss can be determined using a loss function. The loss function calculates the error or loss associated with the respective model's predictions. For example, when the outputs of the respective model differ from the training data ground truths, the differences can be used to calculate a loss as defined by the loss function. The loss function may use any suitable measure of loss associated with outputs generated by the respective model, such as a cross-entropy loss or a mean-squared error. The respective model can be modified based on the error or loss.

This process can repeat for multiple training sessions, until the processor determines the initial training of the respective model is complete, meaning whether the respective model is predicting its respective outputs using the input training data at an acceptable accuracy level. When the loss calculated by the loss function is larger than desired, the parameters of the respective model can be adjusted. Once adjusted, the same or additional training data can be provided to the adjusted model, and additional outputs from the model can be compared to the ground truths so that additional losses can be determined using the loss function. Ideally, over time, the respective model produces more accurate outputs that more closely match the ground truths, and the measured loss becomes less. At some point, the measured loss can drop below a specified threshold, and the initial training of the model can be completed.

Although FIG. 7 illustrates one example of an AI guided dialogue building system 700, various changes may be made to FIG. 7. For example, various components and functions in FIG. 7 may be combined, further subdivided, replicated, or rearranged according to particular needs. Also, one or more additional components and functions may be included if needed or desired. For instance, the chat/voice model 704 could be multiple models, such as one model to chat with organizational representatives when building guides, and a separate model to chat with end users during execution of a guide. In general, computing and server systems come in a wide variety of configurations, and FIG. 7 does not limit the scope of this disclosure to any particular configuration. Also, while FIG. 7 illustrates one operational environment in which various features disclosed in this patent document can be used, these features could be used in any other suitable system.

Figure 8A:
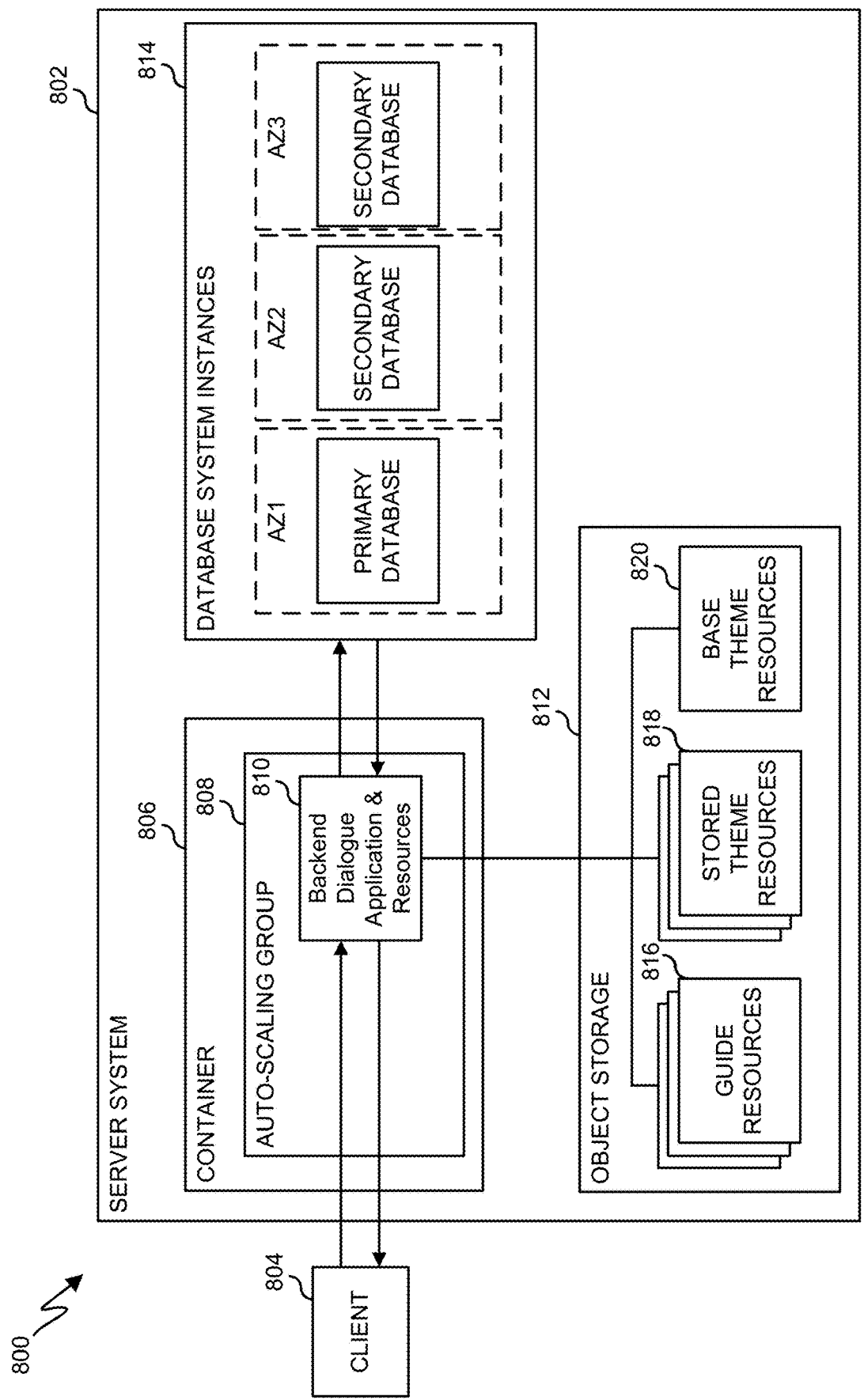
FIGS. 8A and 8B illustrate an example guided dialogue system architecture in accordance with this disclosure.
Figure 8B:
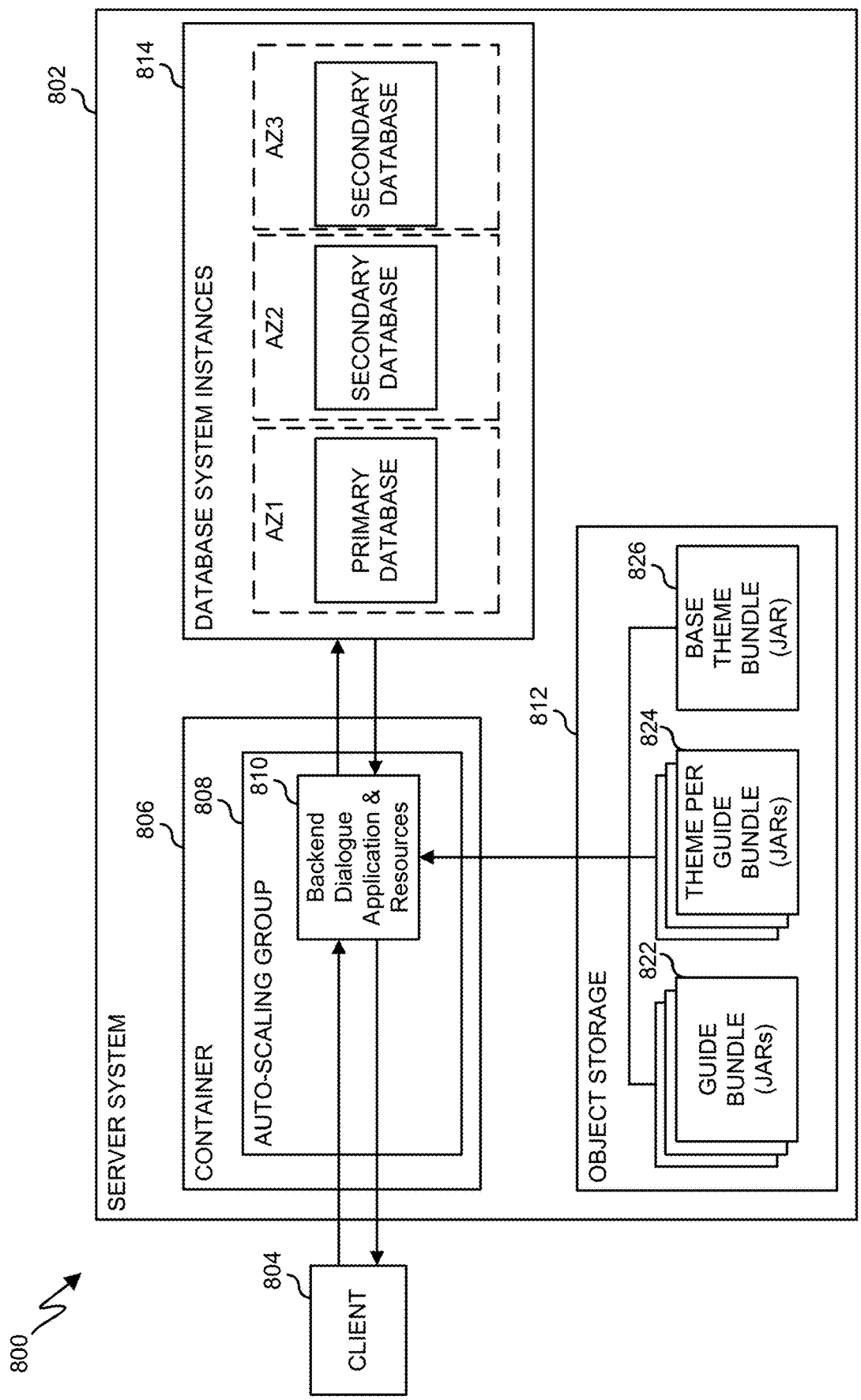

FIGS. 8A and 8B illustrate an example guided dialogue system architecture 800 in accordance with this disclosure. For ease of explanation, the architecture 800 shown in FIGS. 8A and 8B is described as being implemented on or supported by the server 106 in the network configuration 100 of FIG. 1. However, the architecture 800 shown in FIGS. 8A and 8B could be used with any other suitable device(s) and in any other suitable system(s).

As shown in FIGS. 8A and 8B, the architecture 800 includes a cloud server system 802 that communicates with one or more client devices 804. A container service 806 executes an autoscaling application group 808 that can include a backend dialogue application 810 and associated resources. In some aspects, the backend dialogue application 810 can be the backend dialogue engine 312 described with respect to FIG. 3. The backend dialogue application 810 provides core functionality in communicating with the client devices 804 to execute dialogue guides, and is the engine that consumes, drives, and supports the guided dialogues that are built. The backend dialogue application 810 loads guides and theme resources from an object storage 812, and provides various logical calls and interaction for the guides using a backend database system 814.

The database system 814 can include database instances pertaining to different availability zones (AZ), such as first, second, and third availability zones as shown in FIG. 8. In this example, a primary database is provided in the first availability zone, a secondary database is provided in the second availability zone, and another secondary database is provided in the third availability zone. The different availability zones can each be associated with a geographical region, and can provide for application isolation and failover. For example, if there is a power loss in one of the availability zones, services can continue to run in the other availability zones. The use of availability zones can therefore significantly help with resiliency with respect to providing real-time data communications between server system resources and client devices. In various embodiments, the databases can store various data pertaining to dialogues.

In various embodiments, a platform instance exists separately for each client. A copy of the backend dialogue application 810 is deployed to the client's platform instance, and guides are built and deployed as resource libraries to the client's platform instance. In the example of FIG. 8A, the object storage 812 stores guide resources 816, stored theme resources 818, and base theme resources 820. The base theme resources 820 can provide base themes or templates used to create guides, and the guide themes are dependent upon the base themes. As shown in FIG. 8B, for the guide resources 816 and the stored theme resources 818, in this example, these are built and deployed as separate resources, such as one per guide, provided as a guide bundle 822, a theme per guide bundle 824, and a base theme bundle 826. In some embodiments, the guide resources 816, stored theme resources 818, and base theme resources 820, as well as the guide bundle 822, the theme per guide bundle 824, and the base theme bundle 826, can be stored as JAVA ARCHIVE (JAR) files, although other formats can be used. During dialogue execution, the backend dialogue application 810 consumes the guide bundle 822, the theme per guide bundle 824, and the base theme bundle 826, and drives the guides during conversational dialogues with users.

Guides are a collection of web, UI, and lightweight logic objects that are all compiled together to provide the functionality that organizations rely upon from the server system 802. Guides are the primary avenue for organizations to understand their customers prospective customers and provide products and solutions that better fit the user needs. In various embodiments of this disclosure, guides can be classified by their delivery type as well as their guide type, as shown in Tables 1 and 2 below:

TABLE 1

Guides as classified by Delivery Type

| Delivery Type | End User | Code Base Specifics |
| --- | --- | --- |
| Branch or Employee-Assisted | Organization Branch Employee | Code base is different from Online Guides and often contains login, authentication, and SSO related code along with other differences. Branch can also include the institution's organizational hierarchy, and can be related to person-to-person conversations. |
| Online or Self-Serve | Organization customer | Code base is different from Branch Guides and does not contain the same user access and authentication related code as Branch Guides. Online can also include digital self-service conversations, and may connect to person-to-person or person-to-system conversations. |

TABLE 2

Guides as classified by Guide Type

| Guide Type | Purpose | Code Base Specifics |
| --- | --- | --- |
| Business | Organization uses this Guide type to provide business products to small business clients and other business clients | Business Guide type is similar to Consumer Guide type, except different questions and products can be used for a Business Guide type than for a Consumer Guide type. |
| Consumer | Organizations use this Guide type to provide personal products to everyday individuals, customers, and/or consumers | Consumer Guide type is similar to Business Guide type, except different questions and products can be used for a Consumer Guide type than for a Business Guide type. |
| Other (Hybrid, Demo, Wealth, Outbound, Cash Flow Optimizer, Treasury Management, Helping Hand, etc.) | The purposes of these other Guide types is specific to their reason for being created. | The code differences for these other Guide types is specific to their reason for being created. |

Although FIGS. 8A and 8B illustrate one example of a guided dialogue system architecture 800, various changes may be made to FIGS. 8A and 8B. For example, various components and functions in FIGS. 8A and 8B may be combined, further subdivided, replicated, or rearranged according to particular needs. Also, one or more additional components and functions may be included if needed or desired.

Figure 9:
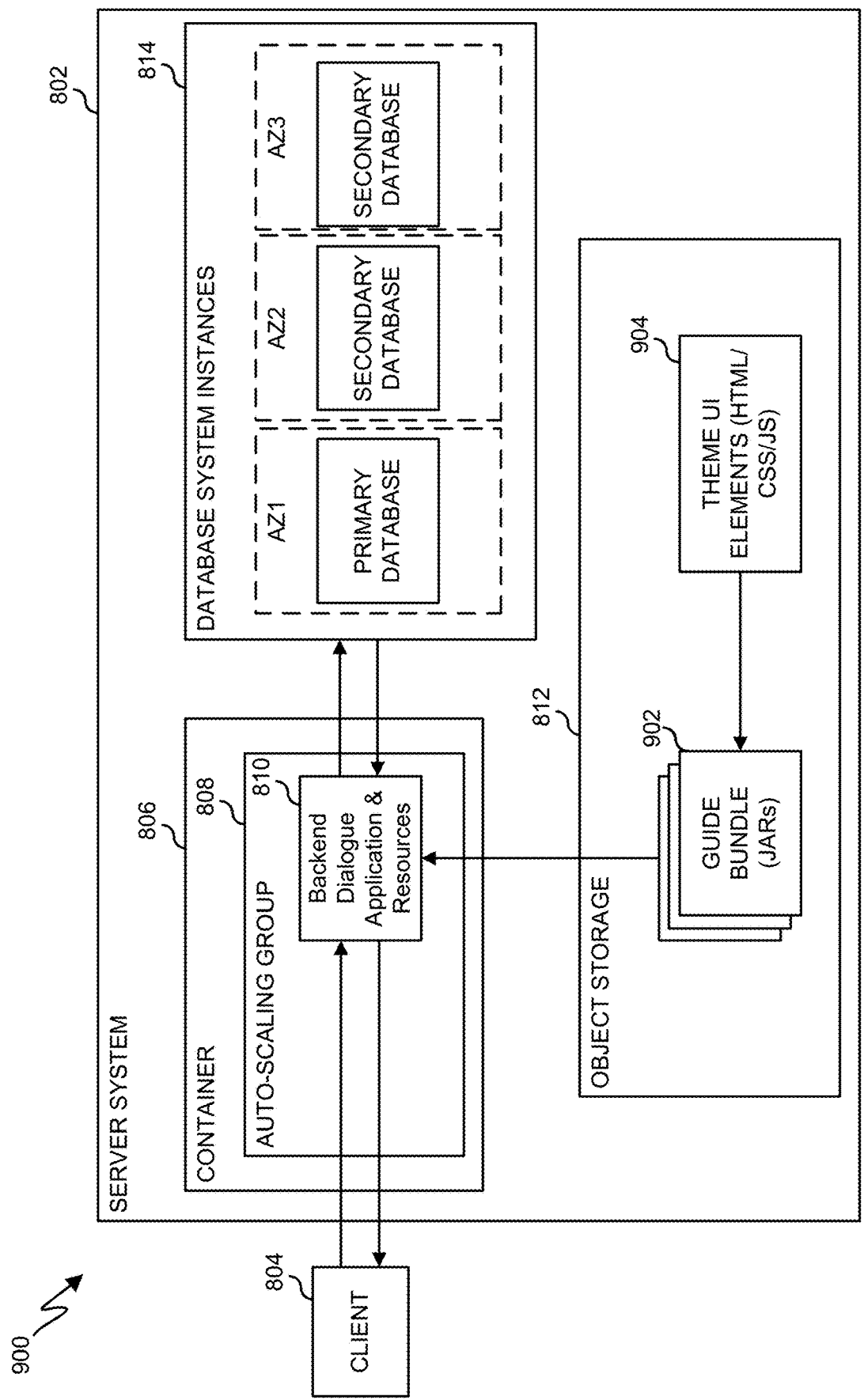
FIG. 9 illustrates an example guided dialogue system architecture in accordance with this disclosure.

FIG. 9 illustrates an example guided dialogue system architecture 900 in accordance with this disclosure. For ease of explanation, the architecture 900 shown in FIG. 9 is described as being implemented on or supported by the server 106 in the network configuration 100 of FIG. 1. However, the architecture 900 shown in FIG. 9 could be used with any other suitable device(s) and in any other suitable system(s).

The architecture 900 includes similar components as the architecture 800 described with respect to FIGS. 8A and 8B, except the architecture 800 utilizes separately developed and deployed theme resources, e.g., one theme per guide plus the base theme. In the architecture 800 of FIGS. 8A and 8B, the base theme is built and deployed to the same machine, and, to avoid UI display issues, guide theme or base themes must be available. Additionally, in some cases, the architecture 800 may not use the neuro guide application 314 described with respect to FIG. 3, because the architecture 800 uses custom or forked code logic rather than utilizing a library for the logic, meaning logic cannot easily scale and must be updated on a client by client, guide by guide basis.

In the example alternative architecture 900, however, theme UI pieces are baked into the code, and the code imports the neuro application library to provide logical support in a modular manner using this reusable library, which avoids separate theme UI dependencies that could cause display complications. In the architecture 900, in various embodiments, a platform instance exists separately for each client. A copy of the backend dialogue application 810 is deployed to the client's platform instance, and guides with included theme UIs are developed, built, and deployed as resource libraries to the client's platform instance as guide bundles 902. In some embodiments, each guide bundle 902 can be stored as JAR file, although other formats can be used. During dialogue execution, the backend dialogue application 810 consumes the guide bundle 902 and drives the guides during conversational dialogues with users.

As described above, the guide bundles 902 have themes built into them, such that separate guide and theme resources are not necessary for guide deployment. For example, as shown in FIG. 9, theme UI elements 904 can be provided as HTML5, CSS3, and/or JAVASCRIPT technology artifacts included in the guide bundles 902. This allows for the theme UI elements 904 to be consumed by the backend dialogue application 810 as part of the guide bundles 902 to avoid display complications.

Although FIG. 9 illustrates one example of a guided dialogue system architecture 900, various changes may be made to FIG. 9. For example, various components and functions in FIG. 9 may be combined, further subdivided, replicated, or rearranged according to particular needs. Also, one or more additional components and functions may be included if needed or desired. For example, the architecture 900 can additionally include an IQ Analytics portal that displays report data, dashboards, benchmarking, peer analysis, trends, etc., based on the activities and performance of a client's users, product selection, etc. Aggregated reports and drill down reports are meant to help the clients better understand their operations, sales, products, employees, channel performance, customer engagement, etc. so they can continuously improve to generate more revenue and provide improved products and services. Therefore, institutions can also make informed changes to their conversations, products, calls-to-action, and decision logic in the system.

Figure 10:
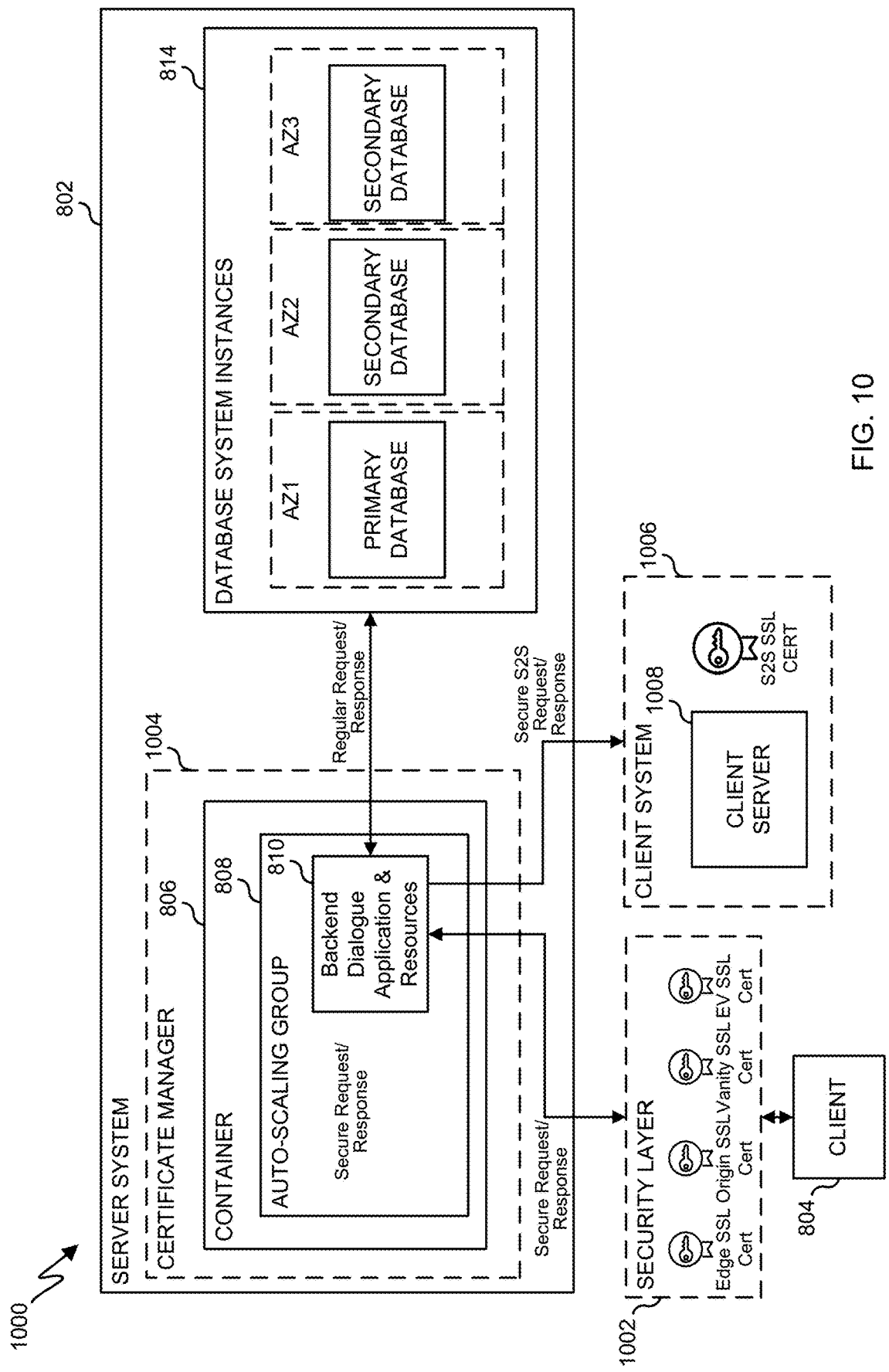
FIG. 10 illustrates an example dialogue system security architecture in accordance with this disclosure.

FIG. 10 illustrates an example dialogue system security architecture 1000 in accordance with this disclosure. For ease of explanation, the architecture 1000 shown in FIG. 10 is described as being implemented on or supported by the server 106 in the network configuration 100 of FIG. 1. However, the architecture 1000 shown in FIG. 10 could be used with any other suitable device(s) and in any other suitable system(s).

As shown in FIG. 10, the architecture 1000 includes the server system 802, the container service 806, the autoscaling application group 808, and the backend dialogue application 810. The architecture 1000 can utilize a number of highly secured tools, technologies, and practices to provide a highly secure platform. A security layer service 1002 generates SSL certificates (Certs) to manage, secure, and encrypt communications between the server system 802 and outside devices, such as communications to/from client device(s) 804. These Certs generated by the security layer service 1002 can include a plurality of different Certs such as an Edge SSL Cert, an Origin SSL Cert, a Vanity SSL Cert, an EV SSL Cert, or others. In some embodiments, Certs can also be generated by third parties and loaded by the security layer server 1002.

For example, the Origin SSL Cert is generated by the security layer service 1002 and used by both the security layer service 1002 and the cloud server system 802 to ensure secure and encrypted communication from the server system 802 to outside devices. A platform instance in the server system 802 for guides is created for each client in setup in the server system 802. The cloud server system 802 uses a server-side certificate manager 1004 and the Origin SSL Cert to ensure only secure and encrypted communication can occur between the security layer service 1002 and any server system target resources. When an organization representative, for example, makes a request for dialogue guides or other server services such as IQ analytics or dialogue builders, the web browser executed on the client device 804 is assured by the security layer service 1002 and its Certs that secure and encrypted communications will occur. The request then moves through the security layer service 1002 to the server system 802, and the communication is assured to be secure and encrypted between the two via the Origin SSL Cert in the security layer service 1002 and a corresponding Origin SSL Cert in the server certificate manager 1004.

Once within the backend dialogue application 810, communications within the cloud network 804 are safe, and so secure communications such as via SSL, TLS, etc., can be terminated for performance reasons and the guides can communicate with the database system 814 using regular request/response communications without incurring any overhead. Then, container instance 806 running the guides begins secure and encrypted SSL communication back out via the response to the security layer service 1002, resulting in a secure request/response communication and assuring, based on the Origin SSL Cert, the security layer service 1002 and the application (browser) on the client device 804 of the secure nature of the response.

In some embodiments, as shown in FIG. 10, an organization's direct client system 1006 can securely communicate with the server system 802 using a secure system to system (S2S) communications. Although not shown in FIG. 10, both trust and identity SSL requirements exist and the implementation of both trust and identity mechanisms occur. A platform instance for guides exists for each client in the server system 802. One way or two way communication can be established between the instance of the server instance and the client's system 1006. S2S SSL Certs are generated by both the client system 1006 and the server instance and provided to one another for two way communication purposes. The certs are installed into the security provider of the client system as well as the server system 802, such as a via a JAVA keystore, utilized by the backend dialogue application 810 running on the server instance. Now, when one system requests communication to the other, they perform an SSL handshake and confirm that secure and encrypted communication can occur via the certificates presented in the handshake. Only communication between the client system 1006 applications and the backend dialogue application 810 that present the SSL certs will be acknowledged.

Although FIG. 10 illustrates one example of a dialogue system security architecture 1000, various changes may be made to FIG. 10. For example, various components and functions in FIG. 10 may be combined, further subdivided, replicated, or rearranged according to particular needs. Also, one or more additional components and functions may be included if needed or desired.

Figure 11:
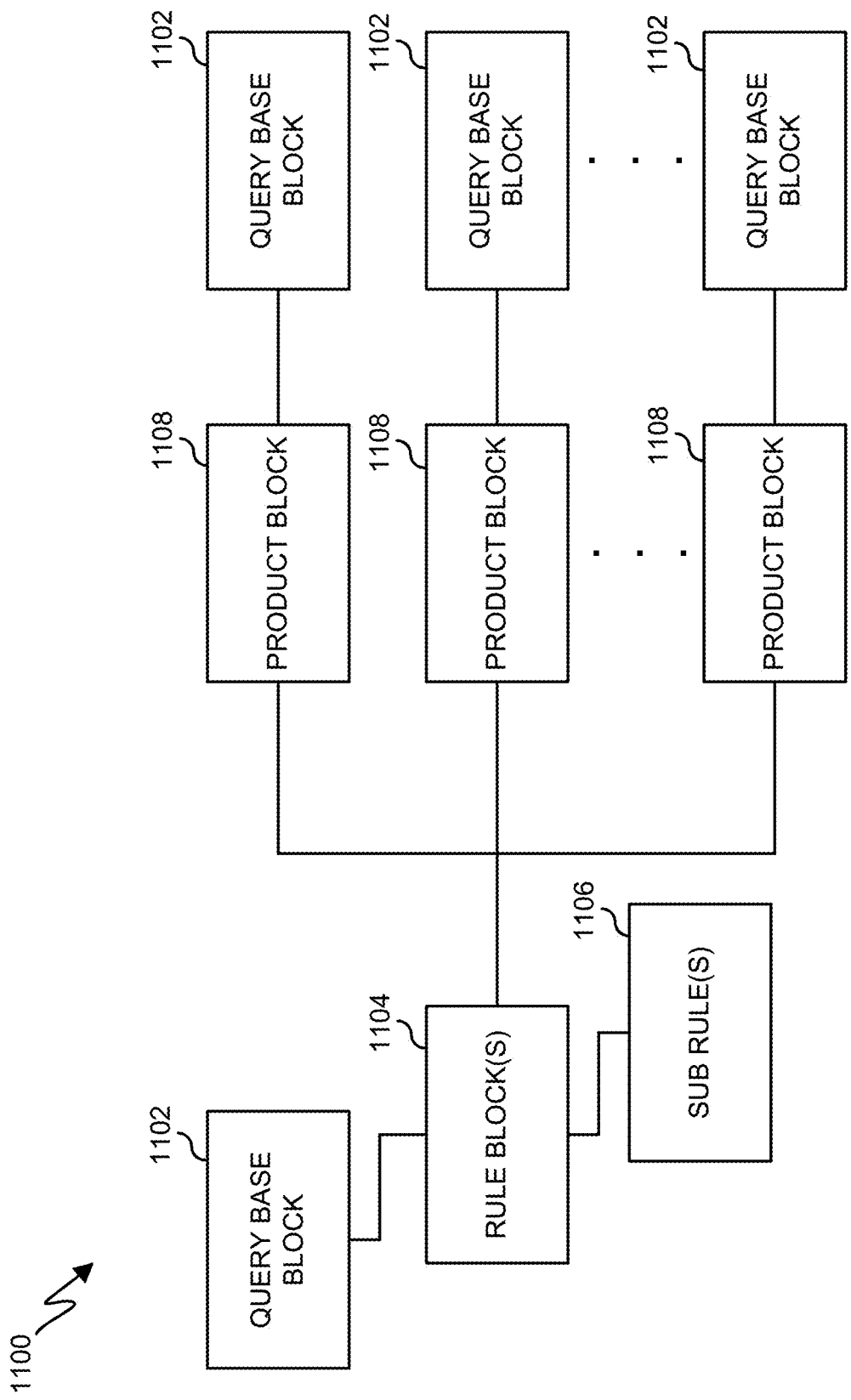
FIG. 11 illustrates an example dialogue programming architecture in accordance with this disclosure.

FIG. 11 illustrates an example dialogue programming architecture 1100 in accordance with this disclosure. For ease of explanation, the architecture 1100 shown in FIG. 11 is described as being implemented on or supported by the server 106 in the network configuration 100 of FIG. 1. However, the architecture 1100 shown in FIG. 11 could be used with any other suitable device(s) and in any other suitable system(s).

As shown in FIG. 11, the architecture 1100 includes a query base block 1102. The query base block 1102 comprises various aspects of a query to be presented during a guided dialogue, including the query text, an Appkey parameter defining a query category (greeting, member, affiliation, checking, etc.), a query type defining the UI element pertaining to how answers are submitted (checkbox, radio button, text field input, slider, etc.), a list of possible answers defined by an answer key (e.g., related product type or other given keyname) and a text string, query/answer attributes (such as allowing selection of multiple answers, restricting answer to one option, etc.), a validation parameter defining whether a query is a required query, and any related custom code for the query block.

As also shown in FIG. 11, the architecture 1100 includes rule blocks 1104. One or more rule blocks 1104 can be associated with each query base block 1102. The rule blocks define the rules for how and when a query is presented to a user, and can include sub rules 1106. For example, a rule block 1104 can define when a query base block is triggered for presentation to a user based on a prior answer to a prior query. A rule block 1104 may include a rule or sub rules pertaining to triggering its associated query base block 1102 when a user has answered a previously presented query in a particular way, or an answer for the user has been provided directly by the organization on behalf of the user. For instance, if a user, in response to a prior query presented during the dialogue, indicates the user is interested in becoming a member of an organization, a rule block 1104 that includes a rule for triggering its associated query when the user has selected the answer related to becoming a member, can cause its associated query comprised in the associated query base block 1102 to be presented to the user. Sub rules 1106 can further provide more granular triggered actions or conditions, such as requiring a user to answer multiple questions in a particular way, or such as limiting questions to only members or non-members, etc.

As further shown in FIG. 11, rule blocks can also associate query base blocks 1102 with product blocks 1108. Product blocks 1108 define the products and/or services provided by an organization. Dialogues can be constructed such that, depending on how users answer queries, as defined by rule blocks 1104, the dialogue may move to different query blocks or product blocks 1108, leading to new paths in the dialogue defined by additional query base blocks 1102 associated with the product blocks 1108, the additional query base blocks 1102 having their own associated rule blocks 1104 and sub rules 1106. This programming architecture 1100 can result in highly customized dialogues with a large number of different permutations for queries and recommendations, as described elsewhere in this disclosure.

Figure 12B:
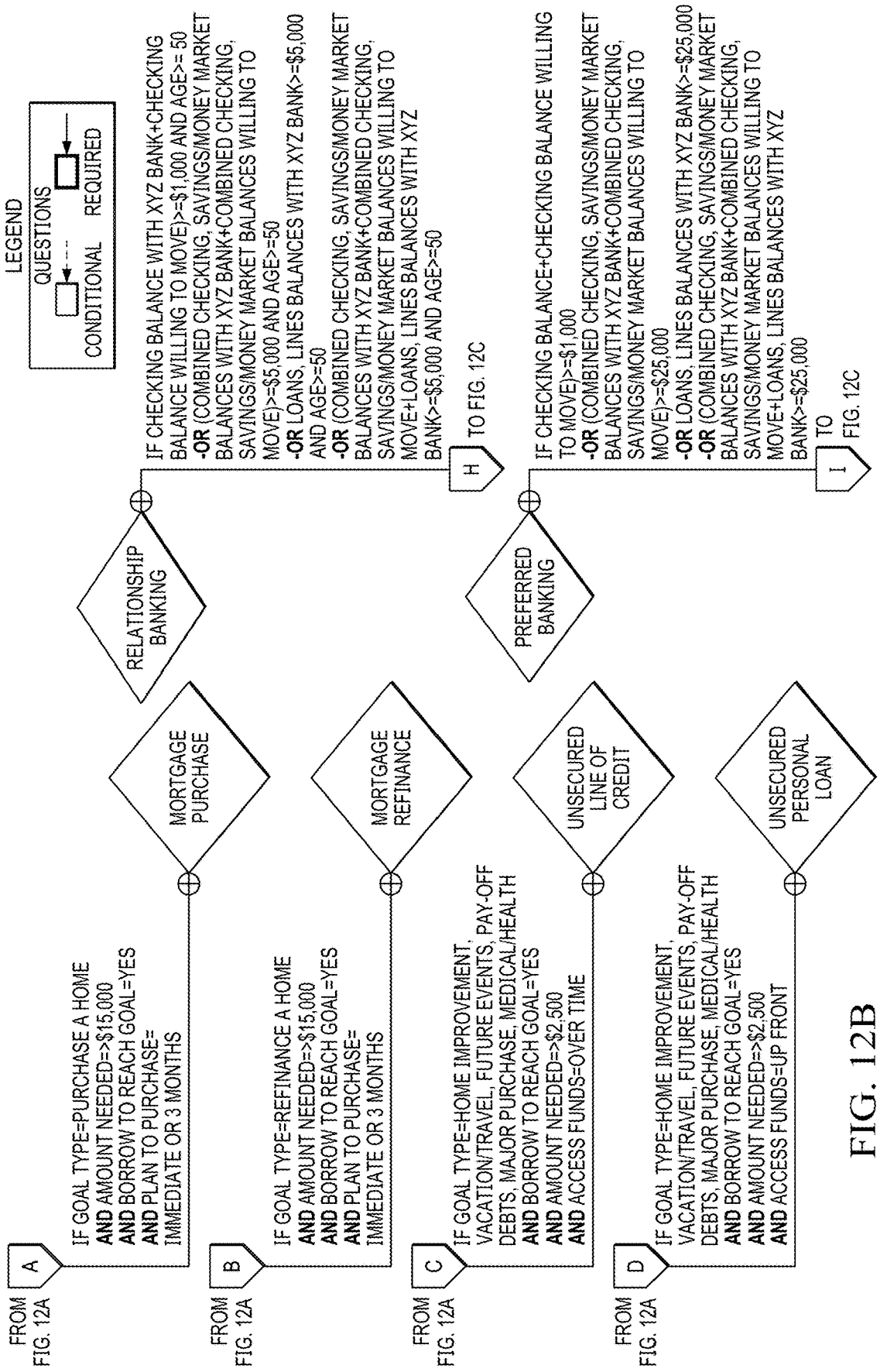

For example, FIGS. 12A-12H illustrate an example graphical representation of a dialogue constructed in accordance with this disclosure. As illustrated in this example dialogue representation, an extremely large number of different dialogue permutations and recommendations are possible based on the associations between queries, their rules, and other queries and products/services. In some embodiments, the programmed associations between queries, answers and rules, products/services, etc. can be formally constructed using dynamic decision trees. As shown in FIGS. 12A-12H, various paths or questions in the guided dialogue can be required or conditional in some embodiments. For example, as shown in FIG. 12A, a user can be greeting with some initial questions such as if they are an existing customer, and then ask what they need help with, such as what the user's goals are. As shown with respect to the various diamond shaped boxes in FIGS. 12A-12H, a plurality of parameters can be related to various product types, such as loan purchases or loan refinances, indicating a user's goal type and information associated with that goal. As shown in FIGS. 12A-12H, depending on the goal type and the related information, the guide dialogue can then branch off in various ways, such as to provide loan purchase or refinance options as shown in FIG. 12B.

Figure 12D:
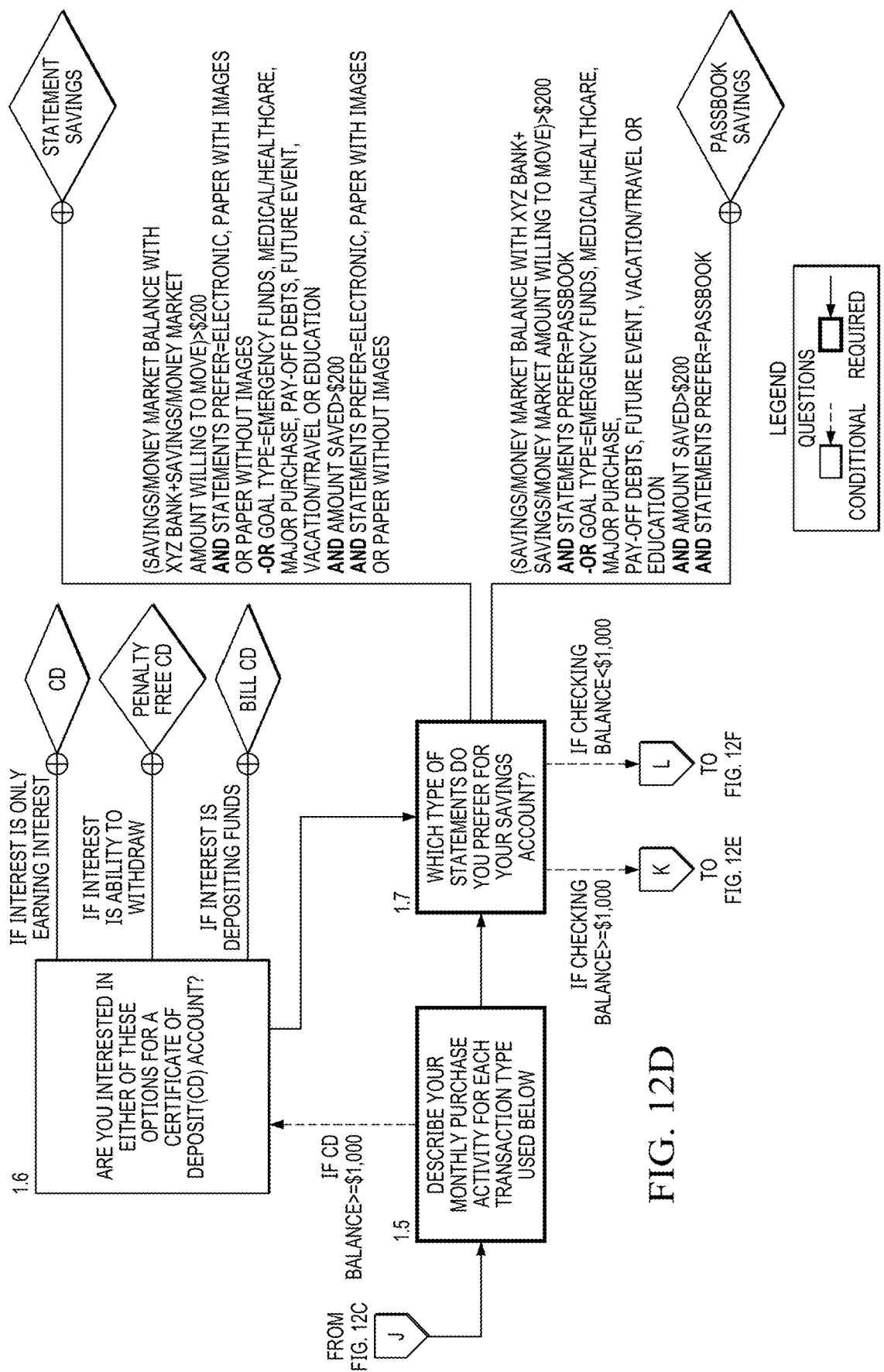
Figure 12F:
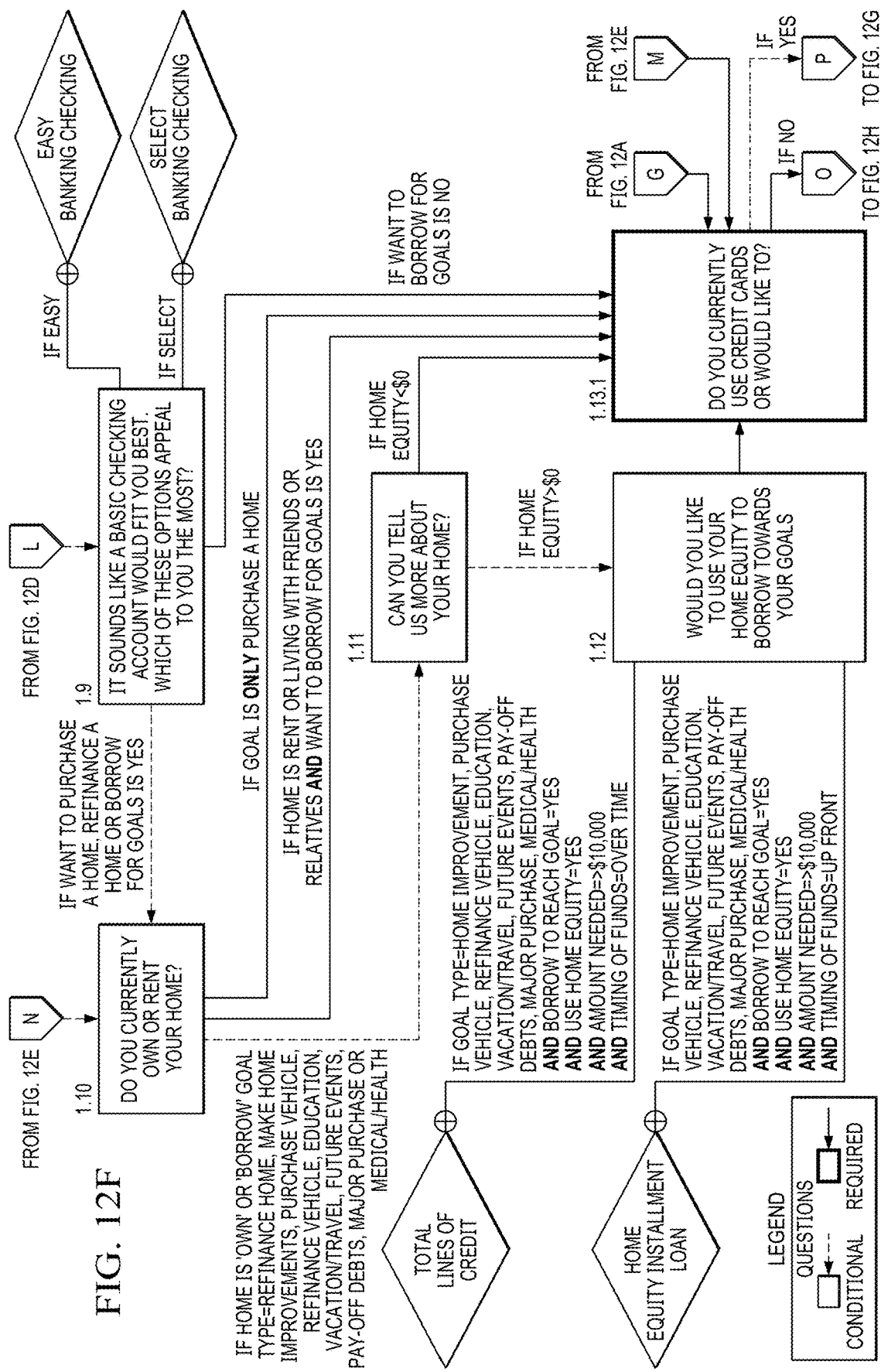
Figure 12G:
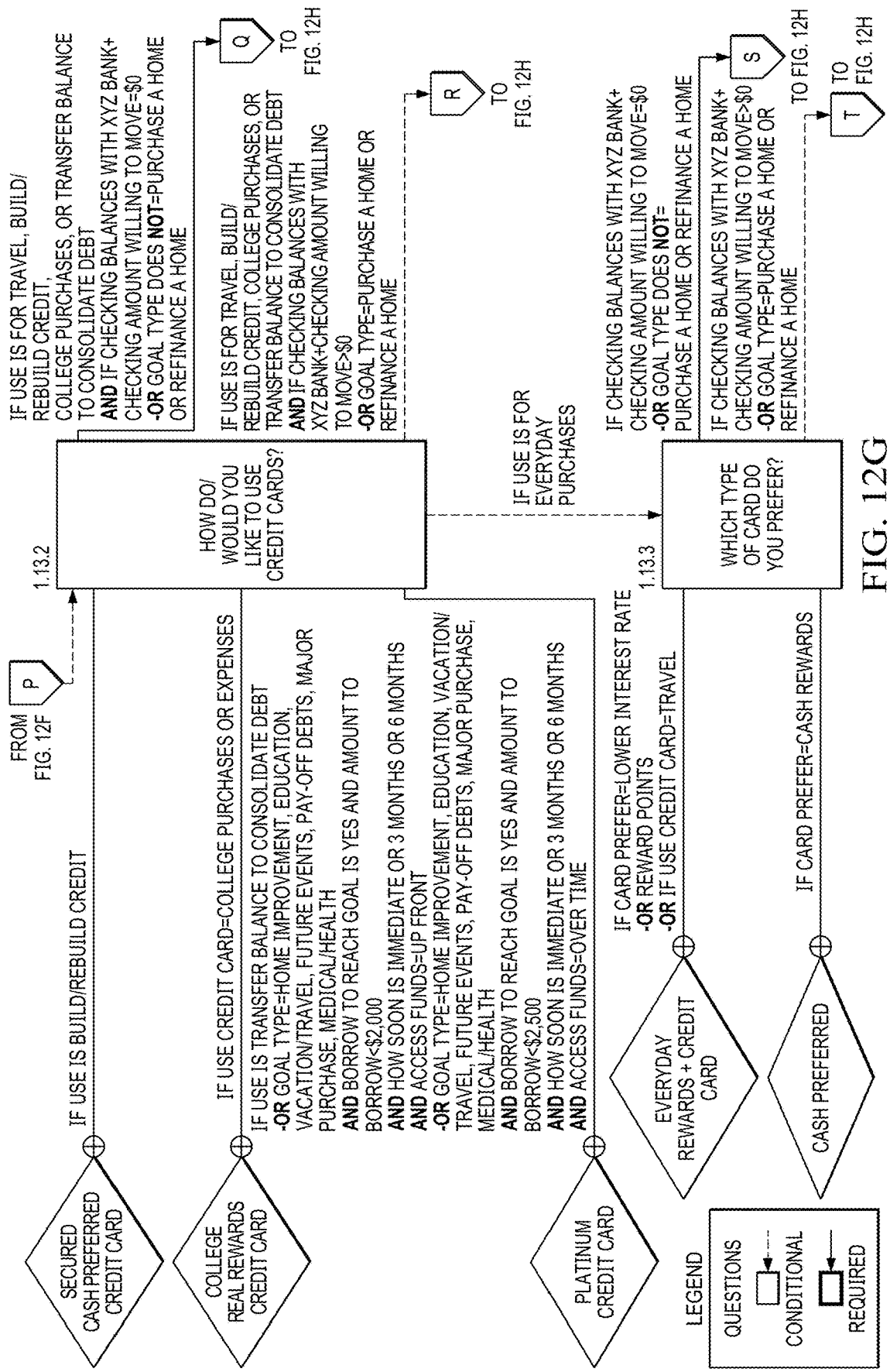
Figure 12H:
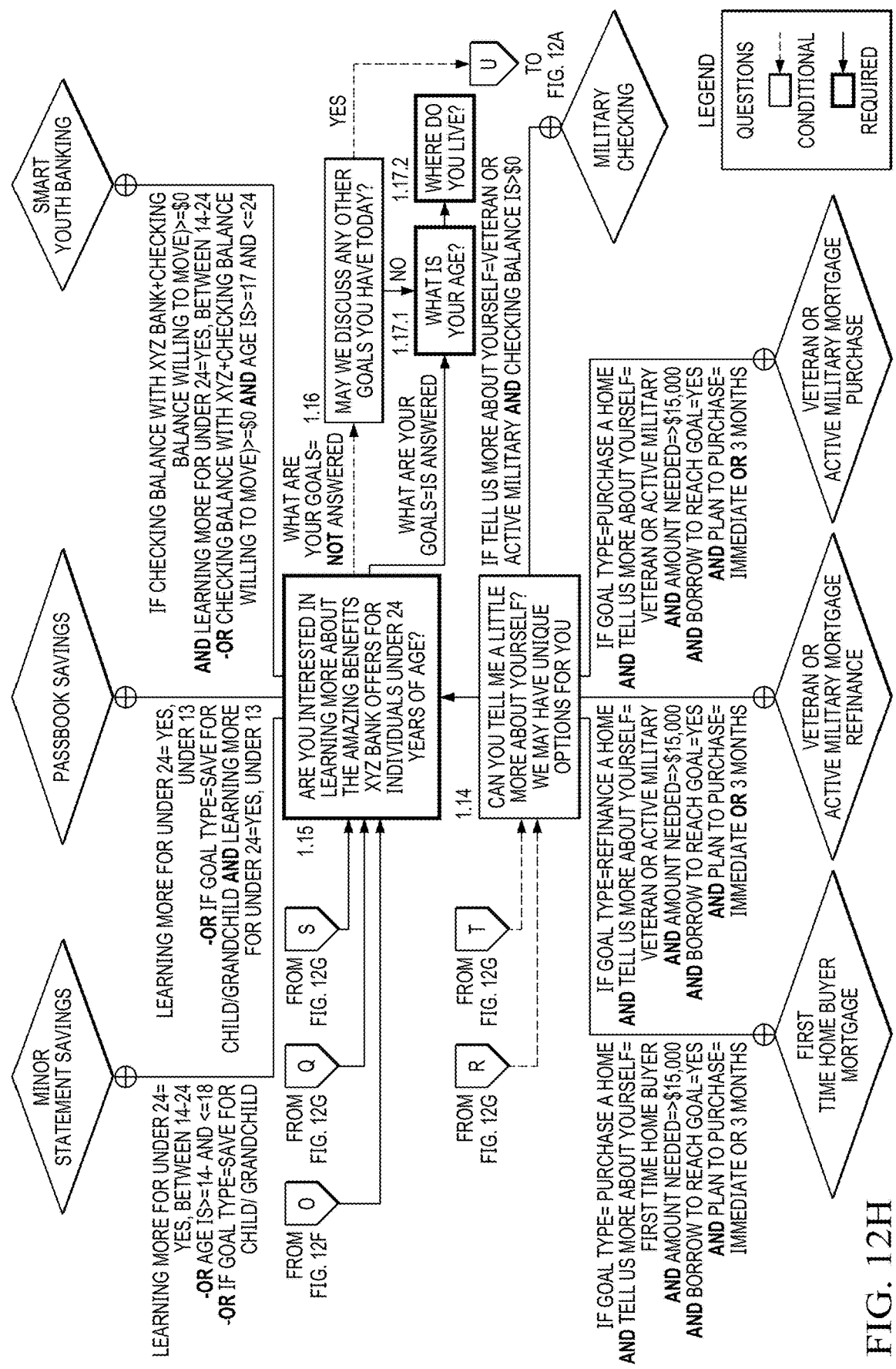

As shown in FIG. 12A, depending on the answer the user provides for why the user is participating in the guided dialogue, the dialogue can branch into other directions, such as to ask about a user's current finances to determine what type of financial services the user needs, which can each be associated with various parameters (FIGS. 12C-12E). Follow up questions can be asked by the dialogue based on previous user answers to further tailor user recommendations, such as shown in FIG. 12F in which a user, in this example, is asked to provide further information regarding their assets, the products that are most appealing, or their financial behaviors. As shown in the various diamond shaped boxes in FIGS. 12A-12H, products can be recommended by the guided dialogue based on the user's answers and other parameters or conditions of the guided dialogue. As shown in FIG. 12H at question 1.16, it is possible for the guided dialogue to ask the user if other services are required for today (e.g., other goals the user has) and the guided dialogue can loop back to other portions of the dialogue, such as how the answer to question 1.16 in FIG. 12H can cause the guided dialogue to loop back to question 1.3 in FIG. 12A.

The programming blocks illustrated in FIG. 11 provide an efficient means of creating dialogues that reduces the processing and storage requirements for dialogues, since a dialogue (or multiple dialogues) can share programming blocks and thus storing redundant data for a dialogue or multiple dialogues can be avoided.

Although FIG. 11 illustrates one example of a dialogue programming architecture 1100, various changes may be made to FIG. 11. For example, various components and functions in FIG. 11 may be combined, further subdivided, replicated, or rearranged according to particular needs. Also, one or more additional components and functions may be included if needed or desired.

Figure 13C:
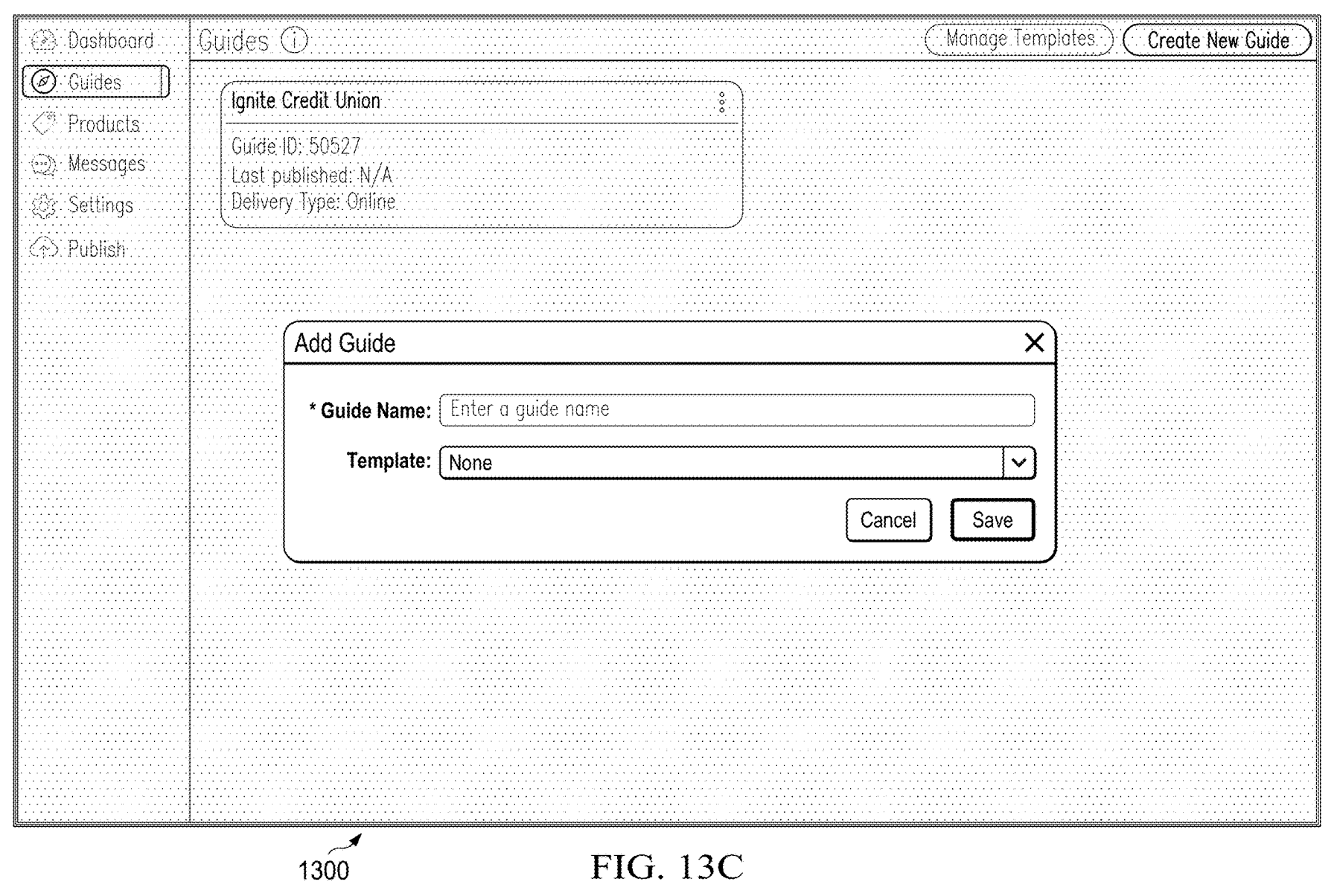
Figure 13D:
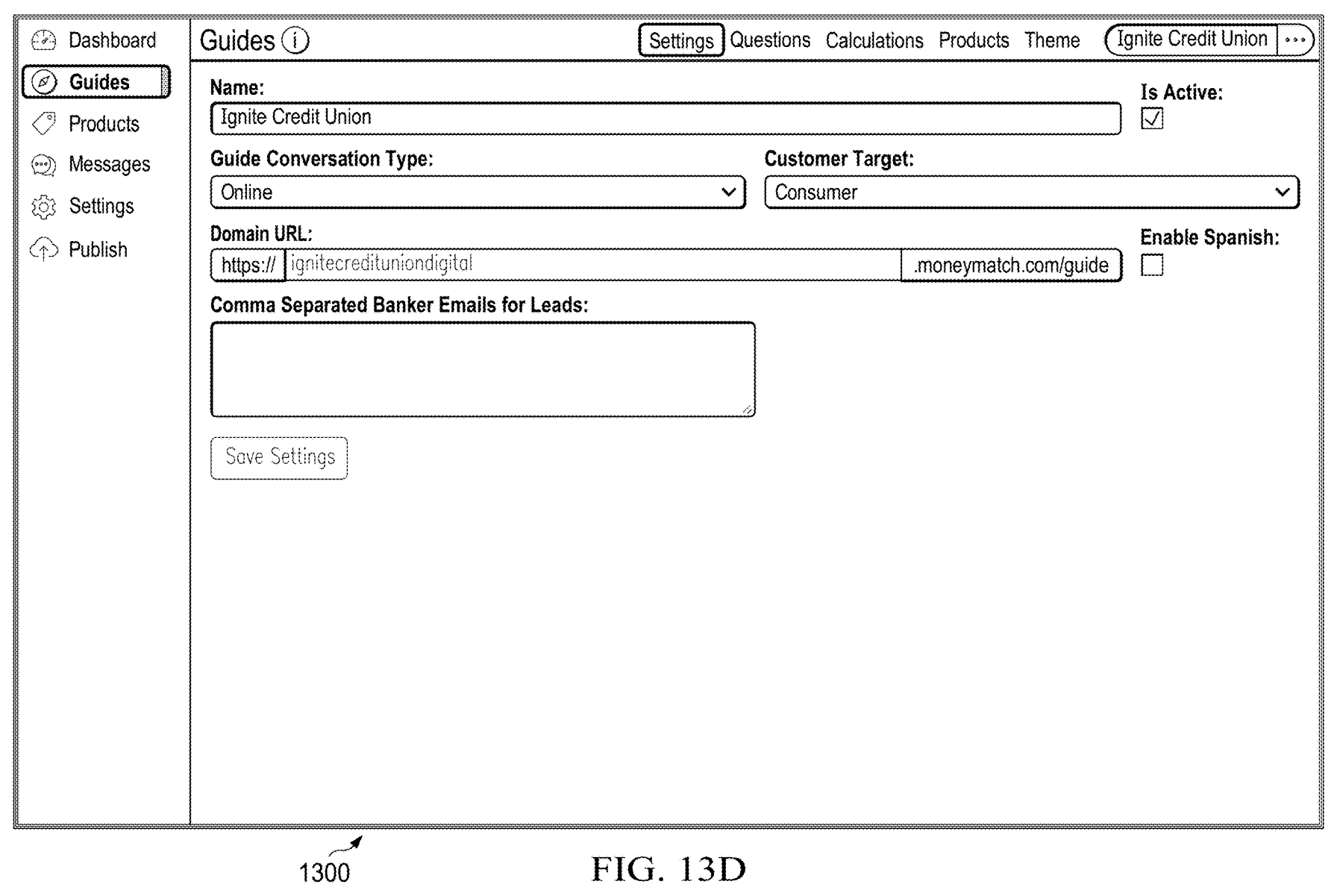

FIGS. 13A-13W illustrate various example portions of a dialogue builder user interface 1300 in accordance with this disclosure. For ease of explanation, the interface 1300 is described as involving the use of the electronic device 101 in the network configuration 100 of FIG. 1. However, the interface 1300 may be used with any other suitable electronic device (such as the server 106) or a combination of devices (such as the electronic device 101 and the server 106) and in any other suitable system(s). For example, the interface 1300 may be displayed on a client device (e.g., electronic device 101), but the content can be stored on a served to the client device as a web-based interface by a server system (e.g., server 106).

The interface 1300 illustrated in FIGS. 13A-13W provides organizations with an efficient and highly customizable method of building guided dialogues. The examples of the interface 1300 shown in FIGS. 13A-13W demonstrate how the programming architecture such as described with respect to FIG. 11 is organized and presented to organizational users when building a guided dialogue. As also described in this disclosure, and as will be discuss below, guided dialogues can include any number of queries associated with products and services, linked via rules constructed around the queries, and having associated visual themes, and can include artificial intelligence integrations that assist with building and presenting dialogues, such as constructing dialogues for organizations based on inputs like industry, products, services, etc., or advising organizations on how to improve dialogues construction using the interface 1300, such as recognizing if a dialogue includes gaps or dead-ends, or recognizing that a dialogue may perform better with a different question order, different questions, different wording, additional or fewer images, additional or fewer charts, etc., and recommending remedial actions based on learned aspects such as industry, products, services, analytics such as from prior dialogue and their results, combinations of queries, answers, and rules that are learned to be compatible, etc. The artificial intelligence integrations can also be used to import products, e.g., from the bank's website, and create the initial set of products for the dialogue guide with descriptions, disclosures and rules based on learned aspects, and then use that data to create an initial question flow.

Turning to FIGS. 13A-13W, FIG. 13A illustrates a user interface screen that displays a list of guides that have been created for a particular organization. On the right-hand side of the interface, buttons pertaining to other portions of the user interface can appear, such as a "dashboard" button that navigates to an interface displaying a list of organizations or suborganizations, a "guides" button, which navigates to the interface shown in FIG. 13A, a "products" button that navigates to a list of organizational products or services and their associated parameters and information, a "messages" button that navigates to a screen related to elated to guide dialogue text or wording, an "insights" button that navigates to a screen where inter-organizational messages can be displayed allowing users to communicate regarding dialogues that are being built, or that can include other system messages such as system notifications on dialogue analytics, machine learning model-initiated dialogue building recommendations, etc., a "settings" button that navigates to an interface that allows various settings to be changed such as adding users, setting lead processors, etc., and a "publish" button that allows a user to publish or deploy a created guide online.

As also shown in FIG. 13A, the interface includes a "manage templates" button that allows for dialogue templates to be stored, deleted, modified, etc., allowing for quick construction of new guided dialogues. The interface also includes a "create new guide" button that allows a user to create a new guide. As shown in FIG. 13B, as new guided dialogues are created, they will appear in the list of guides in the interface 1300. As shown in FIG. 13C, when the "create new guide" button is selected, interface displays a pop-up window that allows for a guide name to be added and a template to be selected (if any) for the guide.

As shown in FIG. 13D, guided dialogues can be built using the interface 1300 in a way that organizes various aspects of the guide. In some embodiments, upon selecting the option to build a new guide, and possibly providing some inputs regarding which industry, products, tone preferences (e.g., professional, casual, chat, etc.), and/or services, the guide should pertain to, or prepopulating at least some inputs from the organization's website or other linked data source to prefill information for automatically building at least part of the dialogue guide, a machine learning model, such as the dialogue builder model 702, can automatically construct a guided dialogue for a user based on its trained parameters. From there, the constructed dialogue can be deployed, or further customized by a user.

As further shown in FIG. 13D, the guides can be visually organized in the interface 1300 via various tabs such as a "settings" tab, a "questions" tab, a "calculations" tab (allowing a user to add a calculated question created based on various factors such as whether users are a current member, whether a question path is a preferred path, etc.), a "products" tab, and a "theme" tab. For example, a complex calculated question can be constructed as follows:

Do you want to use the equity in your home to borrow for any of the following?
ask this question only if:
Own home
AND Estimated equity in Home=>$10,000
AND (Borrow Goal=Home improvement, Pay off debts, Purchase vehicle OR Other/Event and if Want to Borrow for Other/Event=Yes)
AND (Amount to Borrow for Home Improvement+Pay off debts+Purchase vehicle+Other borrowing+Event if want to borrow for it=>$10,000).
Appkey calc:
wantsToUseEquity
Has answered with (Refi/HomeImprovement)=Home Improvement, Cash Out OR Debt Consolidation
OR Goal=Pay off debts, Purchase vehicle, or Other/Event
AND current accounts=HomeOwnership/Mortgage [BS3]
AND estimated equity=>10 k
AND Amount to Borrow for Home Improvement+Pay off debts+Purchase vehicle+Other borrowing+Event if want to borrow for it=>$10,000

In the example shown in FIG. 13D, the settings tab includes various parameters and information pertaining to the guide, such as the name of the guide, a setting regarding whether the guide is active or not, a guide type or category, a target customer type, a domain URL where the guide is to be deployed, language settings, and email list setting to assign organization email addresses to which alerts such as potential leads, analytics, or AI recommendations should be sent. In addition, leads, data, analytics, and/or AI recommendations can also be sent via dialogue integration connectors to other systems, such as described elsewhere in this disclosure. For instance, integrations can be setup and configured, including end points, security, data/API, mapping, etc., for various actions defined in the guide, such as opening an account, making an appointment, sending information to a salesforce, etc.

Figure 13E:
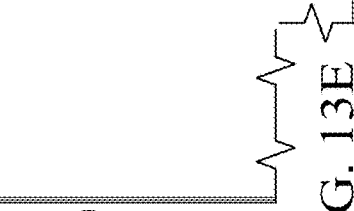
FIGS. 13A-13W illustrate various example portions of a dialogue builder user interface in accordance with this disclosure.
Figure 13F:
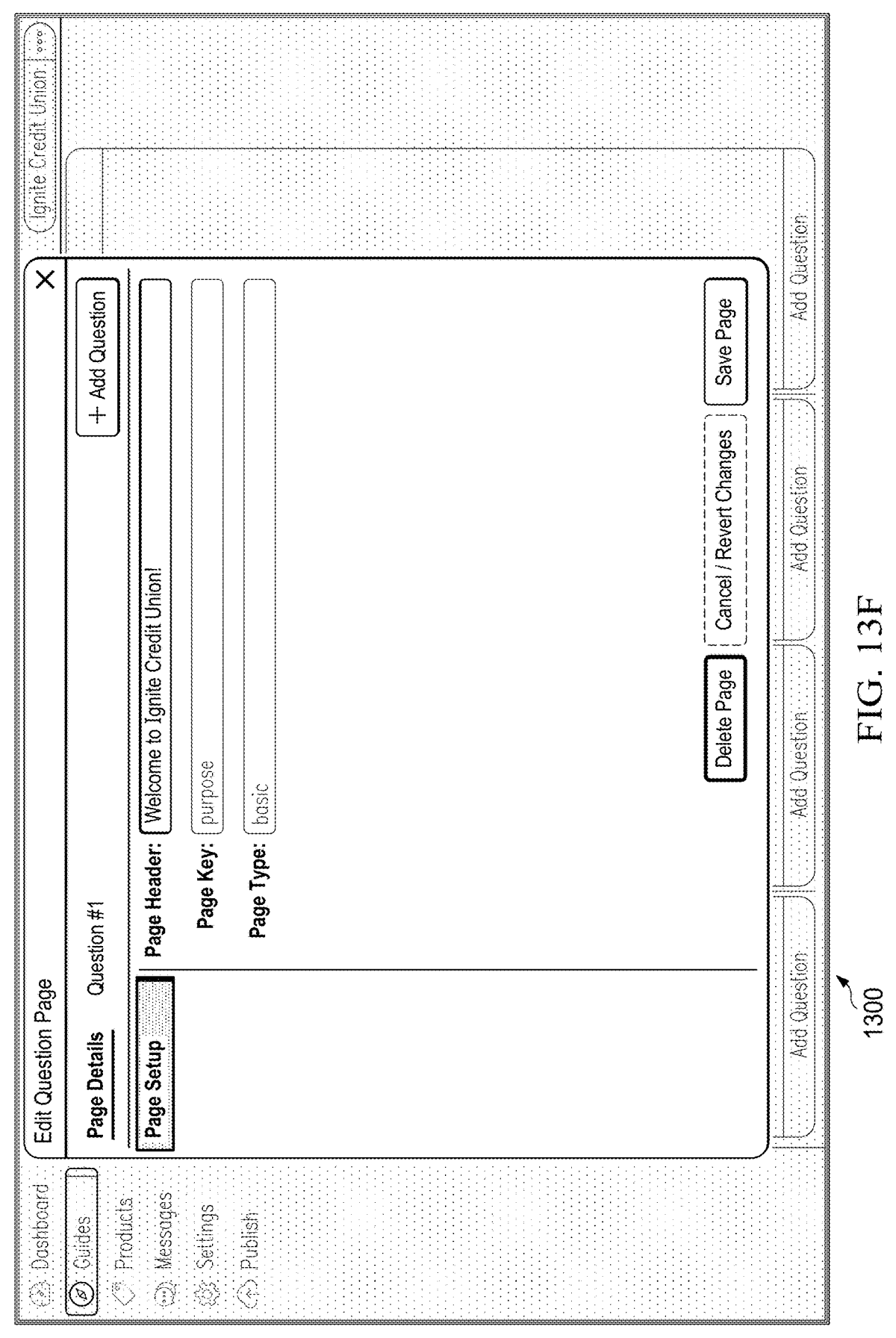
Figure 13H:
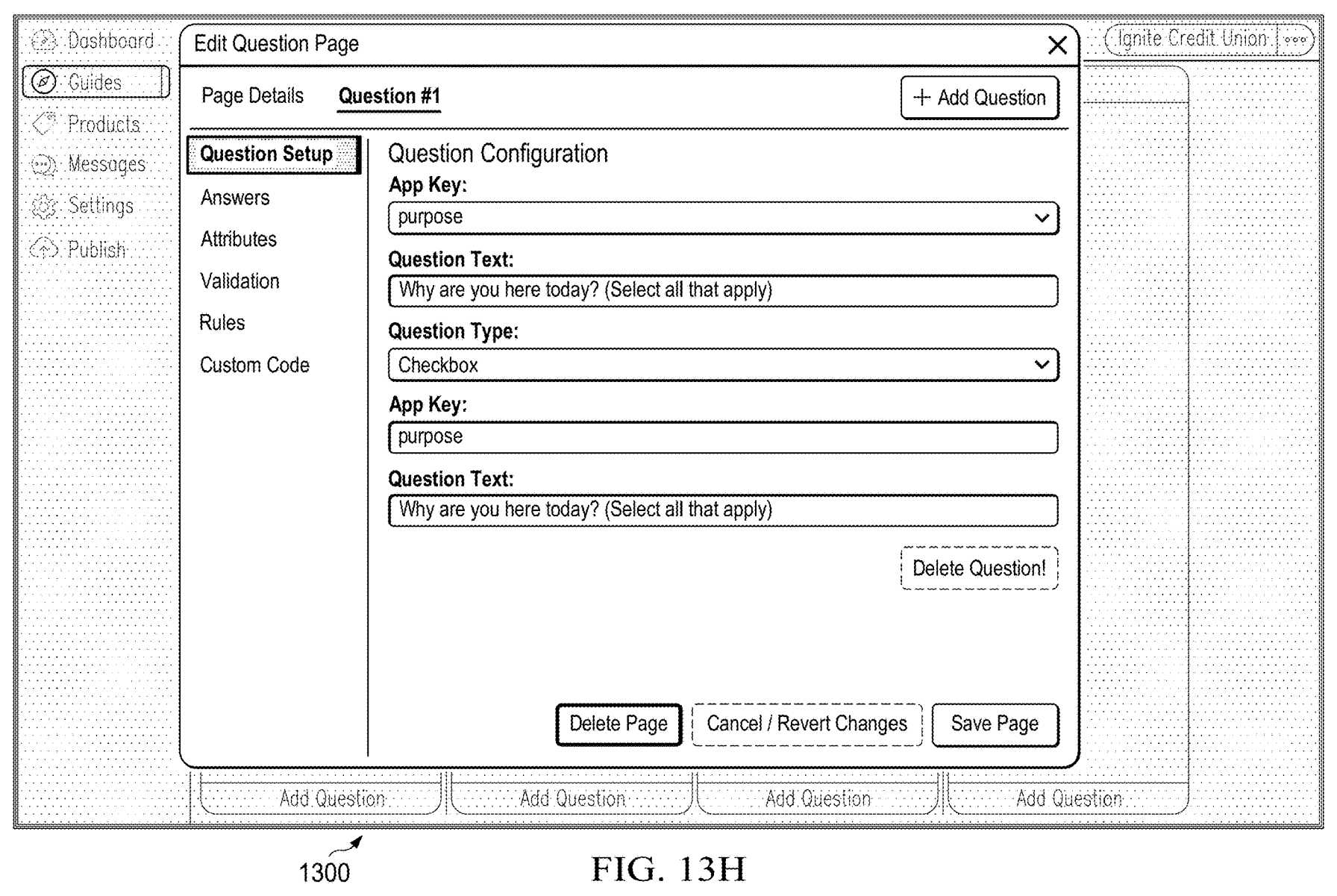
Figure 13I:
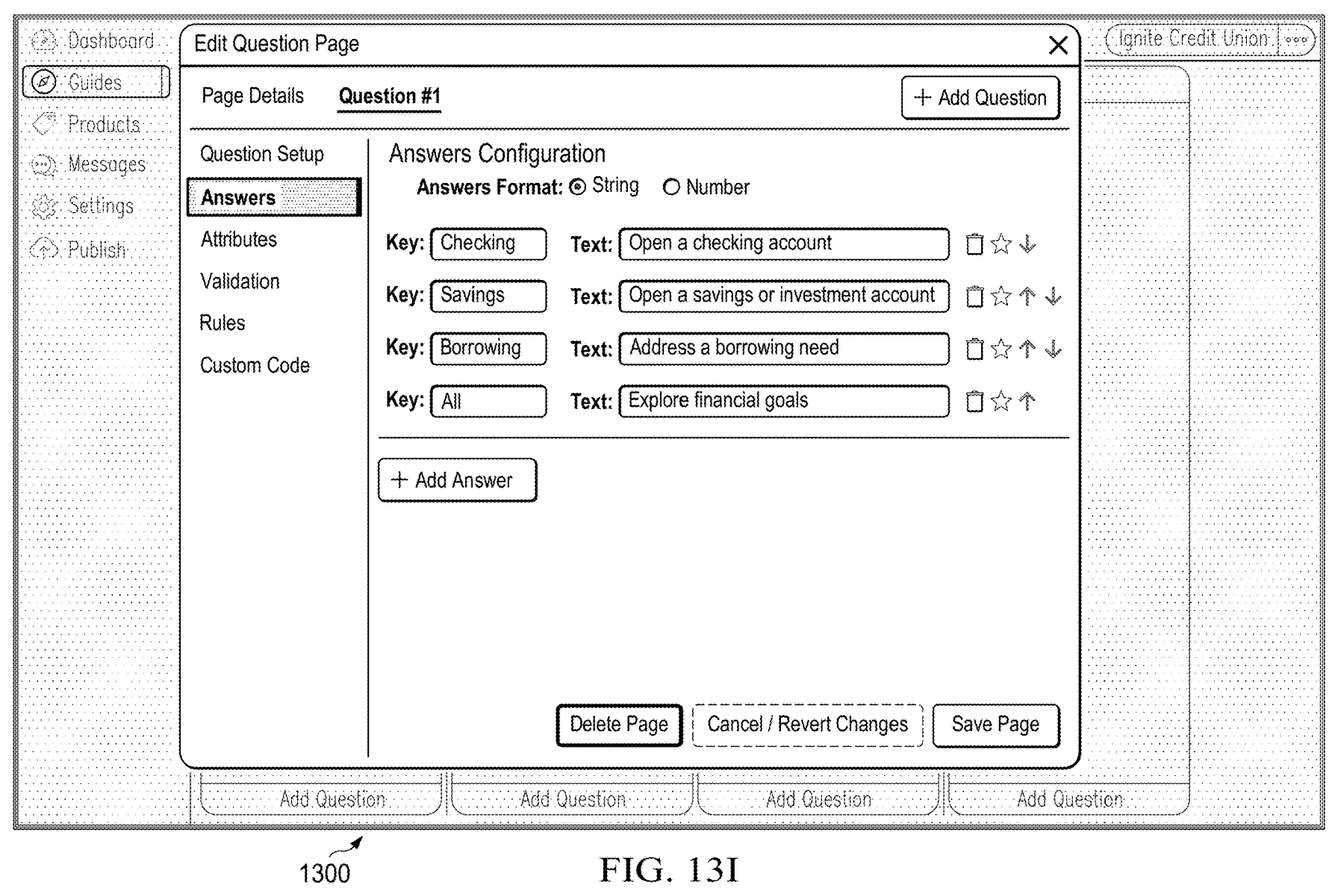
Figure 13K:
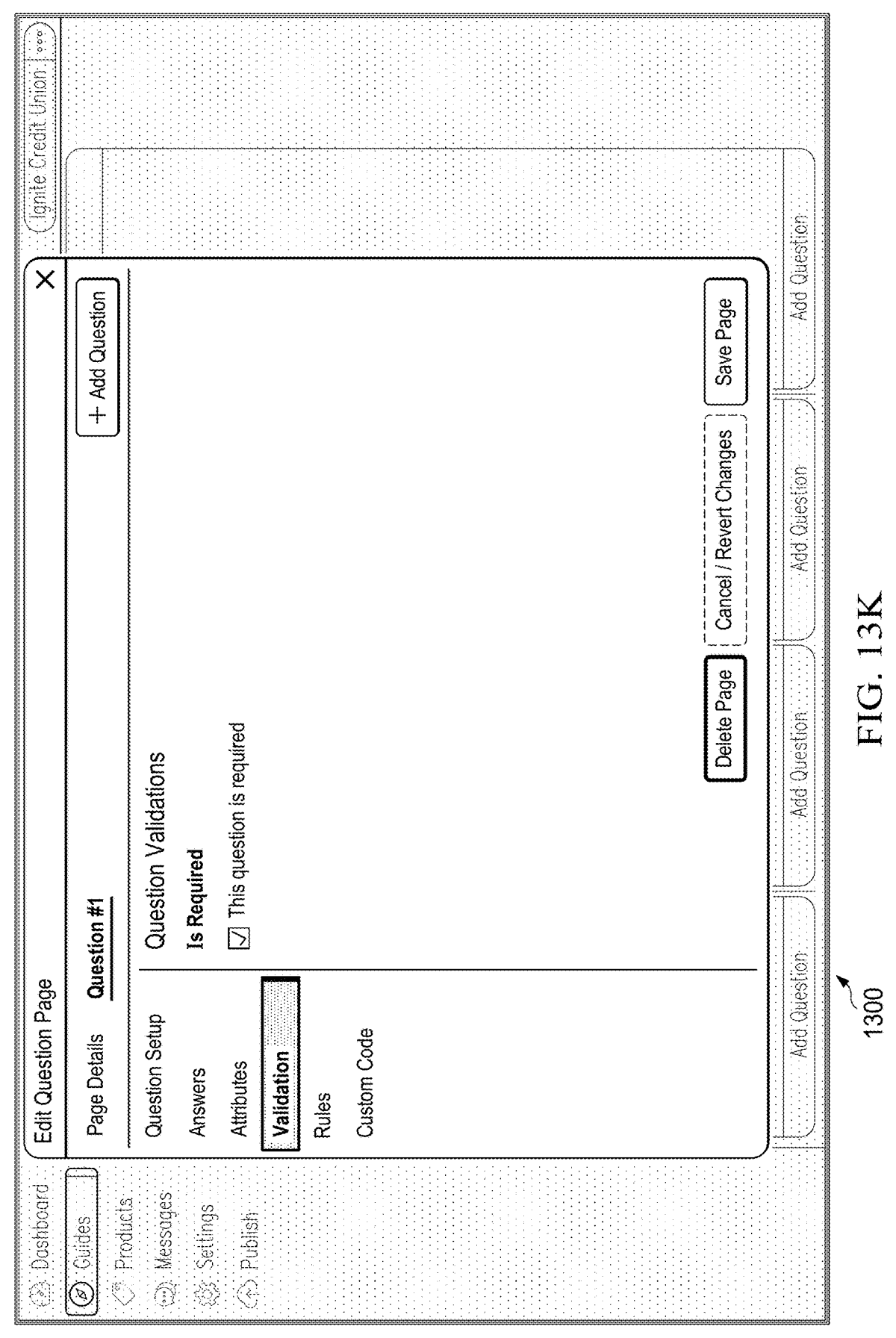
Figure 13L:
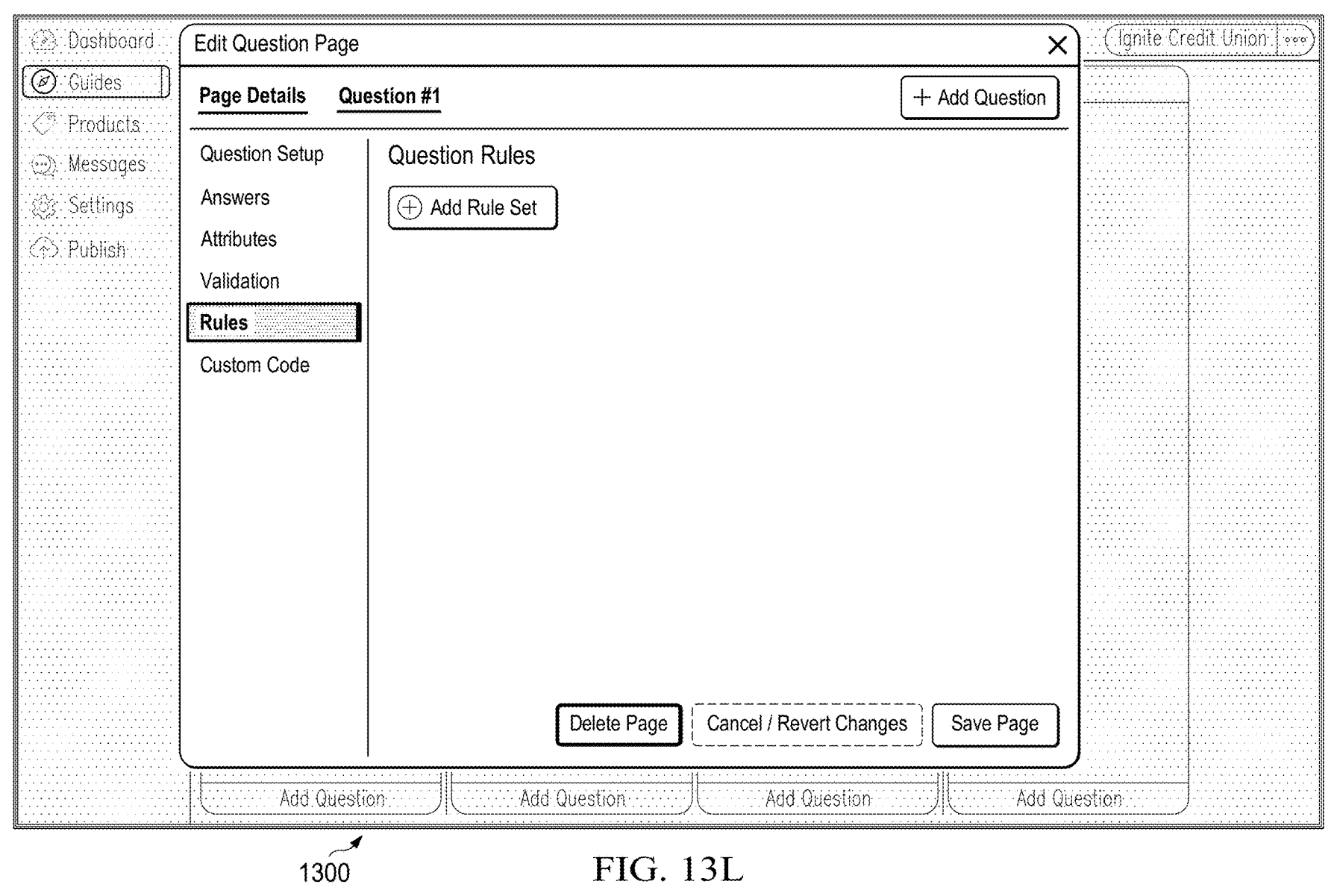
Figure 13M:
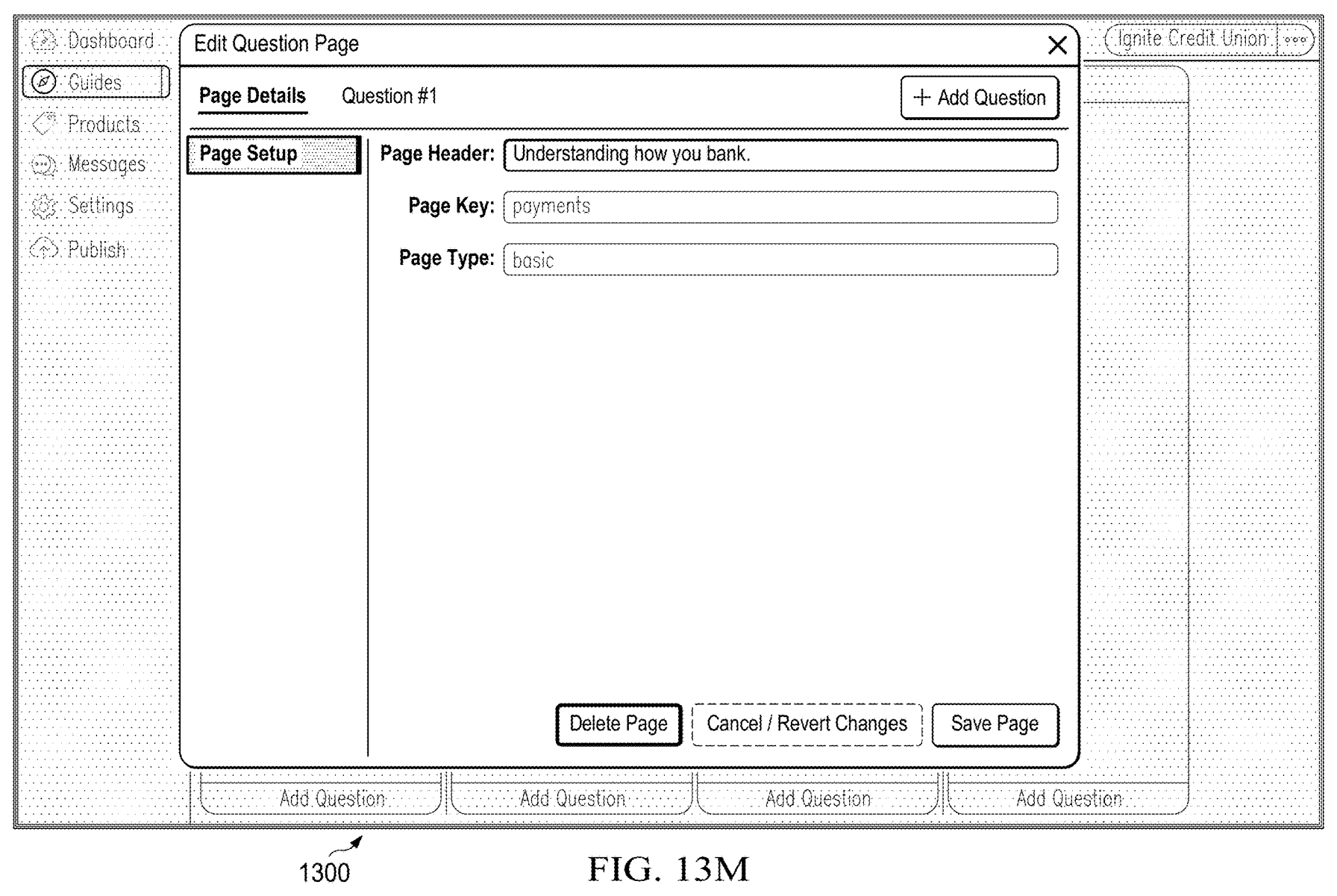
Figure 13O:
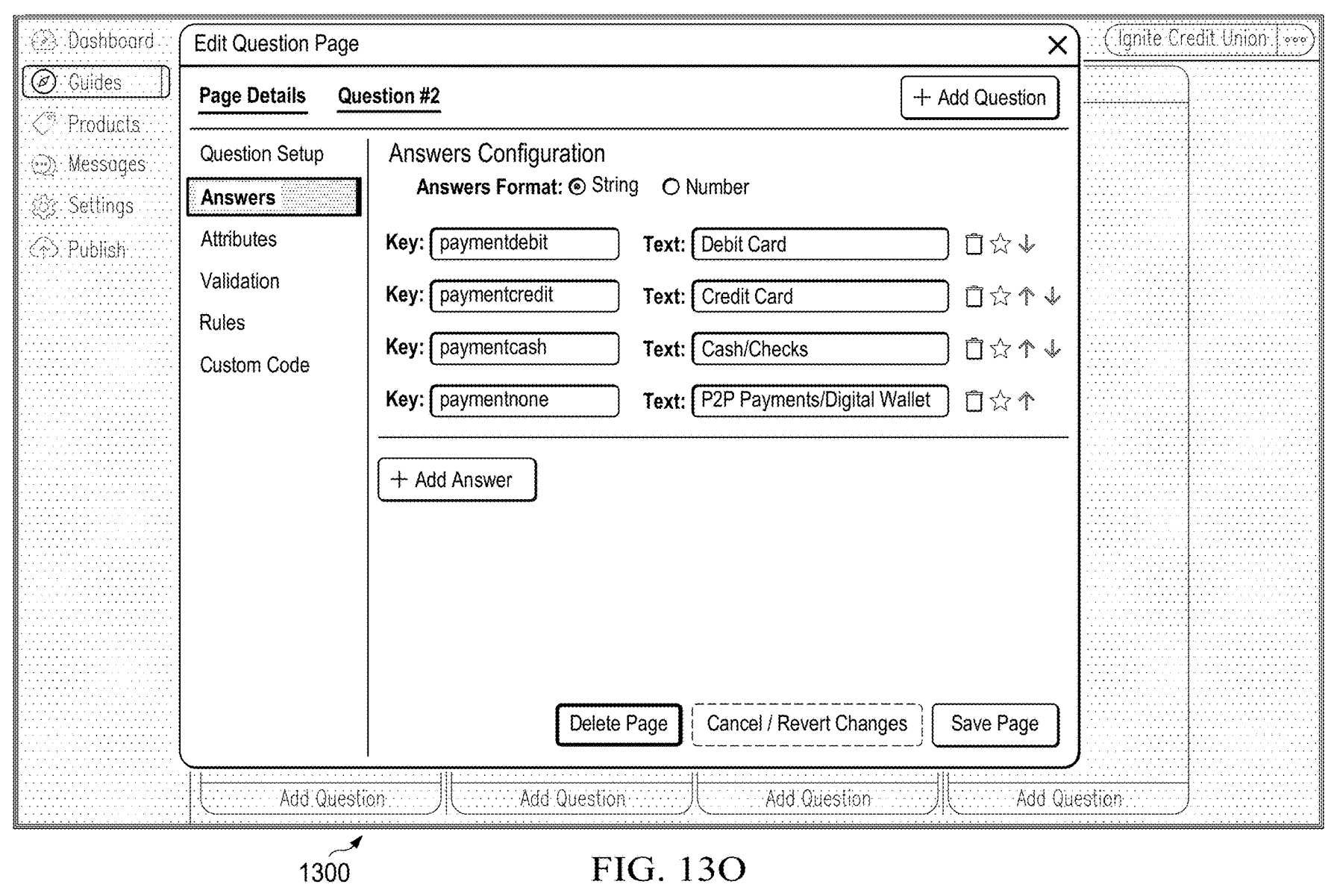
Figure 13P:
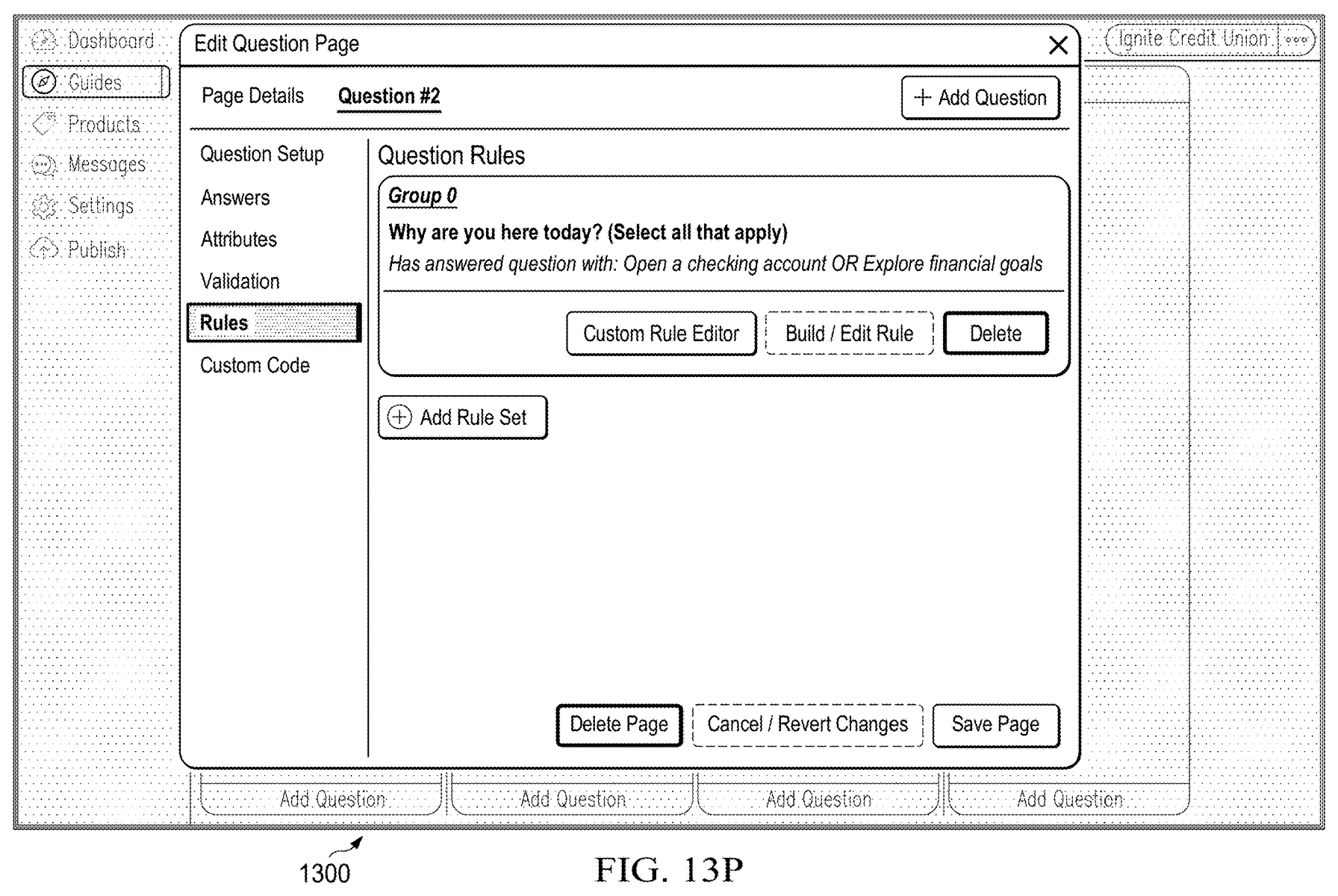
Figure 13R:
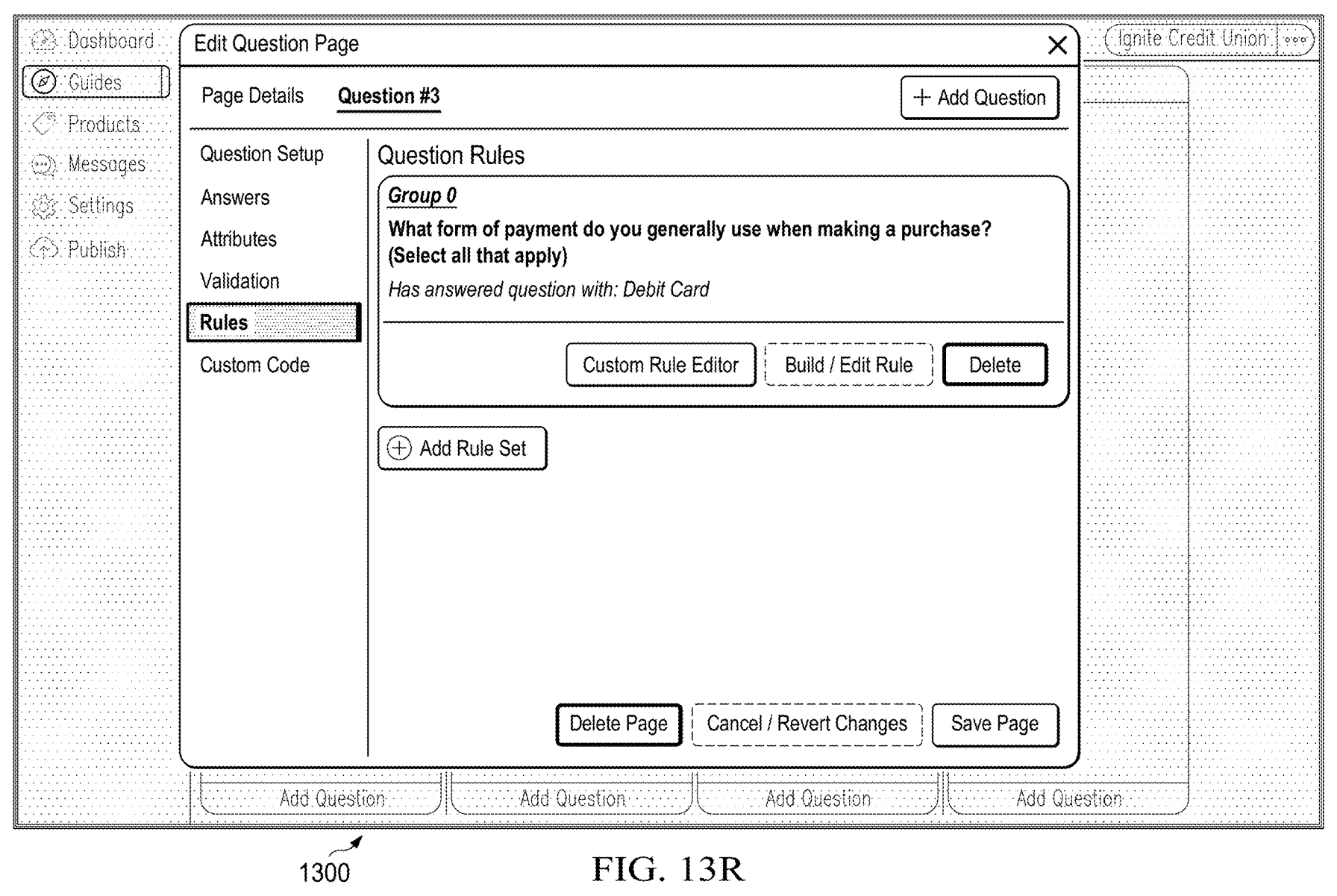
Figure 13T:
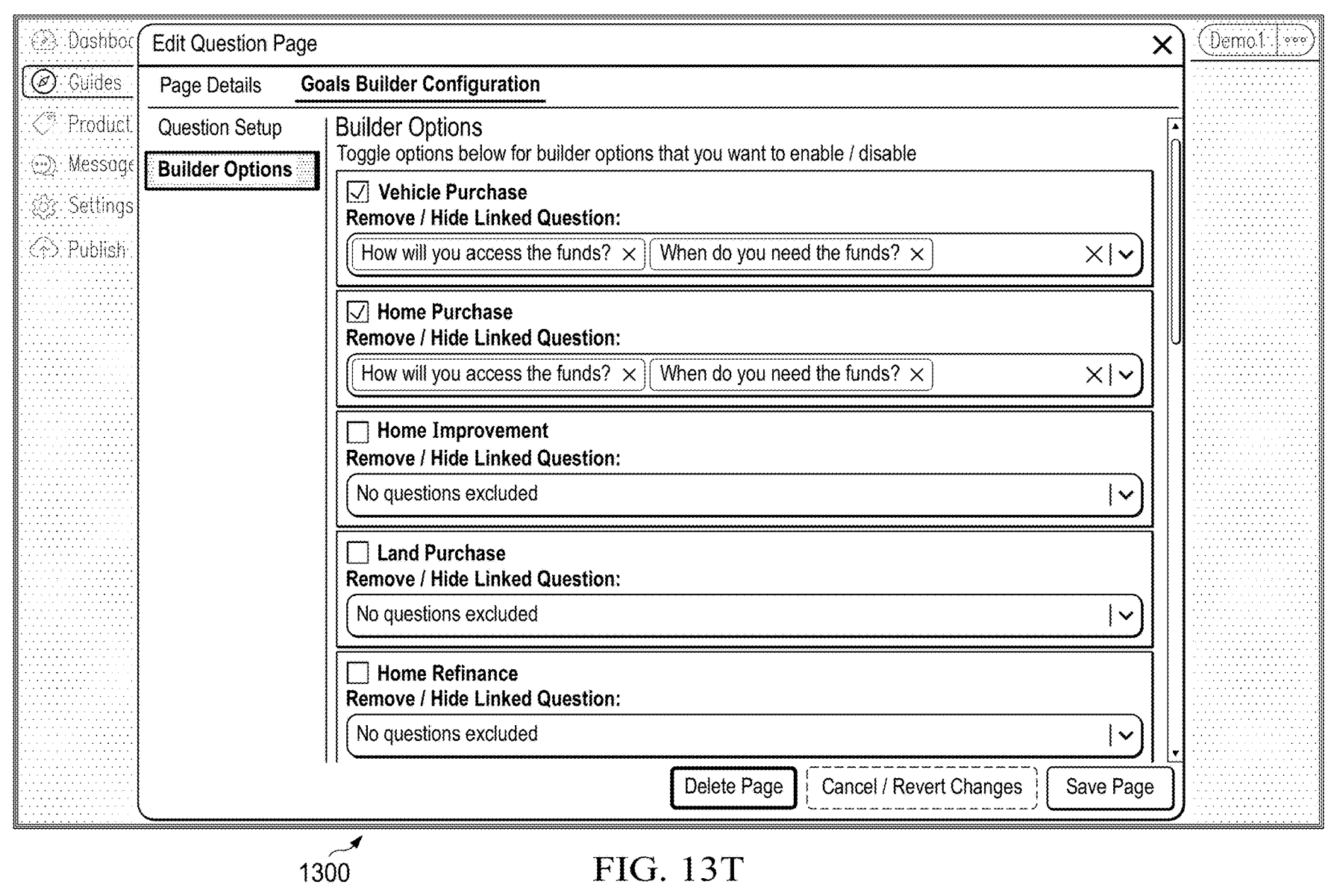
Figure 13W:
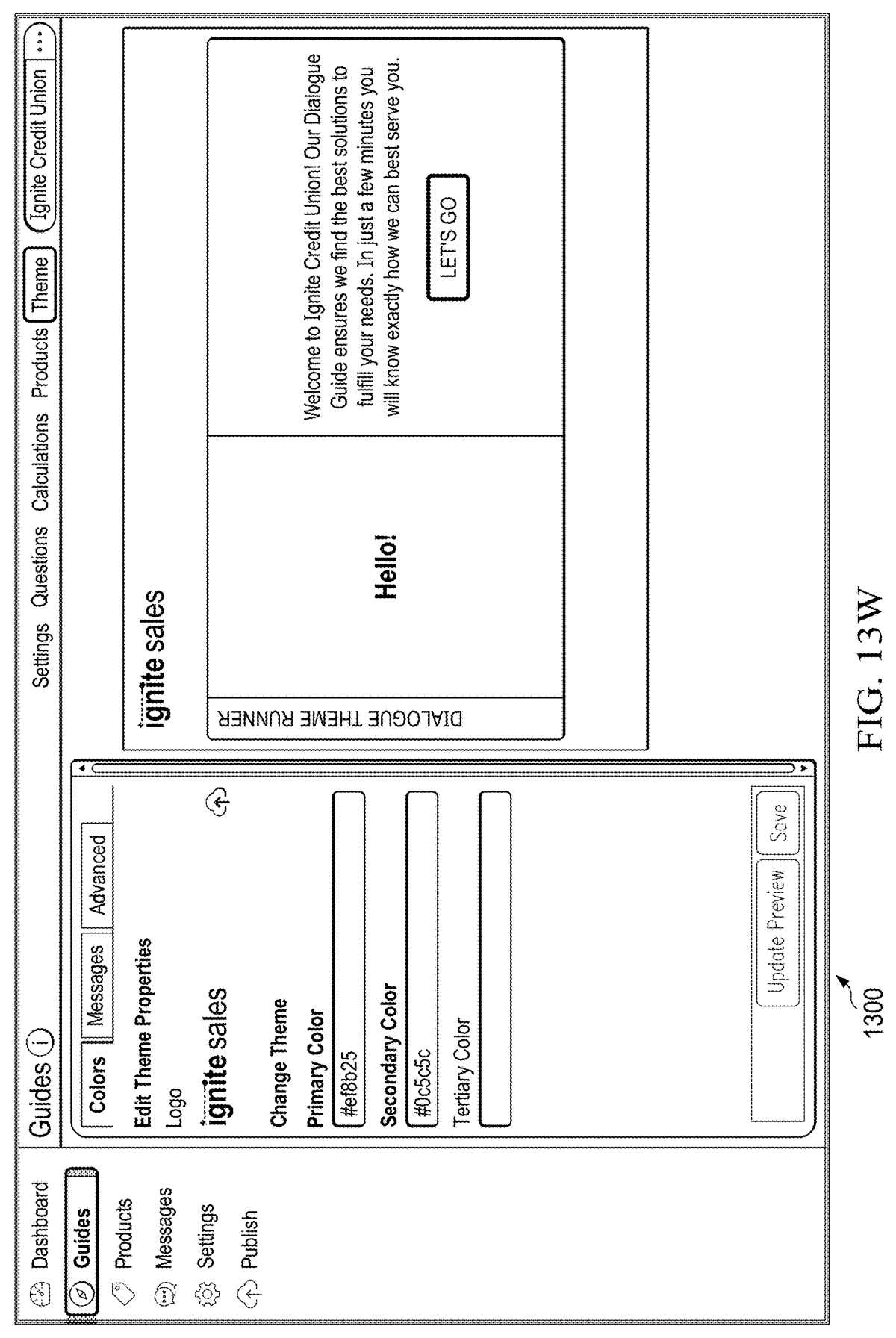

As shown in FIG. 13E, the "questions" tab displays, in a highly organized manner, the queries that make up the dialogue. These queries as shown in FIG. 13E can correspond to the programmed query base blocks described with respect to FIG. 11. Additionally, the queries can be organized according to their roles within the dialogue and/or products or services to which they pertain. For example, as shown in FIG. 13E, a series of queries can be associated with the start of the dialogue (the "entry" category) that serve to gather information about the user prior to presenting queries to the user regarding specific products or services. Queries relating to specific products or services can be categorized in the interface according to those products or services, such as shown in FIG. 13E in which a plurality of queries are associated with a "checking" product/service and another plurality of queries are associated with a "savings" product/service, and so on for all of the product types in an organization's portfolio of products. An "exit" category may also be used to present users with queries or messages that serve to conclude the dialogue with the user.

As described in this disclosure, in various embodiments, a machine learning model, such as the AI validation engine 706, can recommend changes to a created guide based on various detected factors such as if the guide includes a gap or dead-end based on the established queries and their associated rules or for optimization of the query flow, product presentment and/or profitability factors, etc., and any interactions between these factors. As also described in this disclosure, in various embodiments, guides can be also constructed via a chat-based interface with a machine learning model, such as the dialogue builder model 702 and/or the chat/voice model 704.

The interface 1300 allows for each of the displayed queries to be selected and modified as needed. For example, FIGS. 13F-13S illustrate various submenus within the interface for modifying a query. As shown in FIG. 13F, a query page setup interface allows for setting a page header, such as a message on the webpage on which the query is displayed. As shown in FIG. 13G, a question tab displays an Appkey for the query ("purpose" in this example) and the query text string. In various embodiments, an Appkey library can be retained and imported into guides during creation to provide for a number of preset queries and rules. A query may include more than one query. For example, as shown in FIG. 13E, there is shown a query block with two embedded queries: "Do you currently, or are you willing to, use Direct Deposit, Bill Pay, or external transfers when banking?" and "Are you interested in overdraft protection for your checking account?". Query blocks with a plurality of embedded queries can have different parameters and rules for each question, but can be linked together, such as requiring that each of the plurality of queries be presented to move forward in the dialogue, where each answer to each question may further define future queries. Selection or providing of different answers to queries can also affect how queries are later presented. For example, an answer to a question may prevent one or more subsequent questions or add one or more subsequent questions, or add one or more answers to a subsequent question.

As shown in FIG. 13H, a question setup area shows the Appkey, query text string and question type (e.g., checkbox, radio button, etc.). As shown in FIG. 13I, an answers area allows for setting each possible answer for the query, each answer having an answer key and answer text. As shown in FIG. 13J, an attribute area display various attributes for a query. In this example, the attribute listed causes choosing the answer of "explore financial goals" to toggle off all other answer selections, but it will be understood that various other attributes can be used. As shown in FIG. 13K, a validation area can include an option to toggle whether a query is required or not required to be presented and/or presented during a dialogue session. As also shown, a custom code area can be used to apply custom code to a query block to define further functionalities.

As shown in FIG. 13L, a rules area of the interface 1300 allows for rules to be established for particular query blocks. In some cases, such as shown in FIG. 13L, a query block may not have associated rules, such as if the query is an introductory query that starts a dialogue and is not triggered by a previous response. As shown in FIGS. 13M, 13N, 13O, and 13P, for example, rules can be created that trigger certain queries to be presented based on, for instance, an answer to a prior query. In this example, as shown in FIGS. 13M-13P, if a user answers the initial query of "Why are you here today?" by selecting "Open a checking account" or "explore financial goals" a rule as shown in FIG. 13P is triggered that causes the query or set of queries shown in FIG. 13N to be presented. As shown in FIG. 13O, this triggered query has its own set of possible questions that can satisfy other rules for other query blocks to trigger presentation of yet additional queries.

For example, as shown in FIGS. 13Q and 13R, if the user answers the question shown in FIGS. 13M-13P with the answer "debit card," the query shown in FIG. 13Q is triggered based on the rule established in FIG. 13R. As shown in these figures, the interface 1300 allows for rules to be added, deleted, modified, etc., and even allow for building custom rules. As shown in FIG. 13S, for example, when building a rule, various rules and subrules can be added to define when a query is triggered, such as triggering when a user answers anything on a question, has not answered specific options, answered with specific options, did not answer a question, etc.

Additionally, as shown in FIG. 13T, queries can also be built regarding specific product or service categories, and such queries can be triggered based on user qualification criteria and preferences. Rules can be established for when and/or how products/services are matched, selected, and presented to users, such that the system intelligently provides product/service recommendations based on user qualification criteria and preferences. As shown in FIG. 13U, products provided by an organization can be managed and organized into groups based on product category, based on synergies between products, and/or in other ways as desired by an organization. As shown in FIG. 13V, products or services can be created and managed when navigating to the products page via the product button. It will be understood that many types of products and any number of products can be created for an organization. In some embodiments, machine learning models such as those described in this disclosure can import the initial product set as well as default product recommendation rules using product disclosures, based on learning from previous dialogue results/outputs, etc.

As shown in FIG. 13W, the interface 1300 also allows for themes to be established for guided dialogues, including defining layout, graphical design, color selections, font selections, messages to be displayed, etc. In addition to the pre-defined themes, custom themes can be also imported and made available to specific clients/guides only.

Although FIGS. 13A-13W illustrate example portions of a dialogue builder user interface 1300, various changes may be made to FIG. 13. For example, various components and functions in FIG. 13 may be combined, further subdivided, replicated, or rearranged according to particular needs. Also, one or more additional components and functions may be included if needed or desired. It will be understood that the interface 1300 and the various guides, queries, rules, and other settings or parameters shown in FIGS. 13A-13W are examples, and guides, queries, rules, and other settings and parameters can be constructed in a wide variety of ways using the interface 1300 and the related systems, processes, and methods of this disclosure.

Figure 14A:
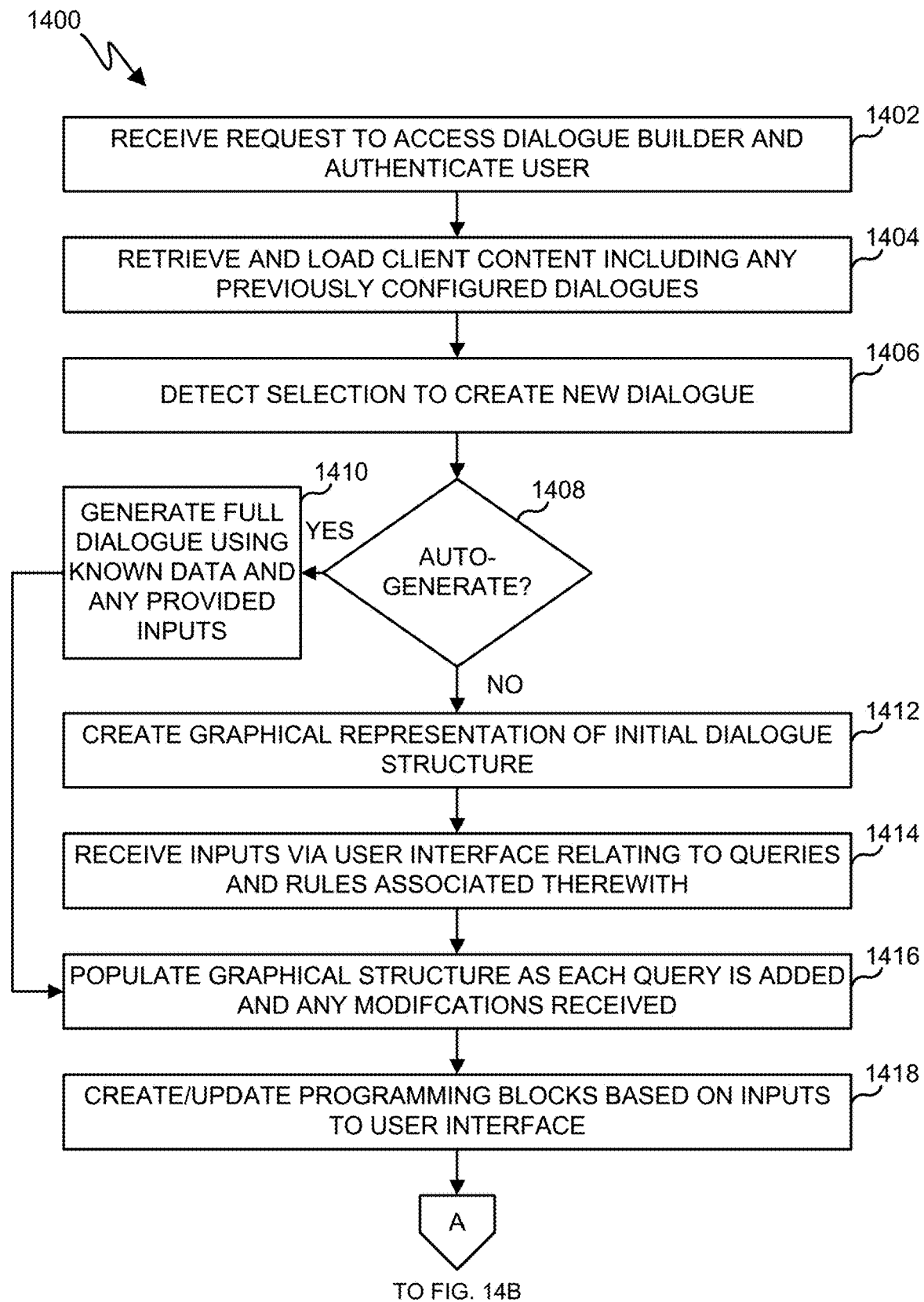
FIGS. 14A and 14B illustrate an example method for building a guided dialogue in accordance with this disclosure.
Figure 14B:
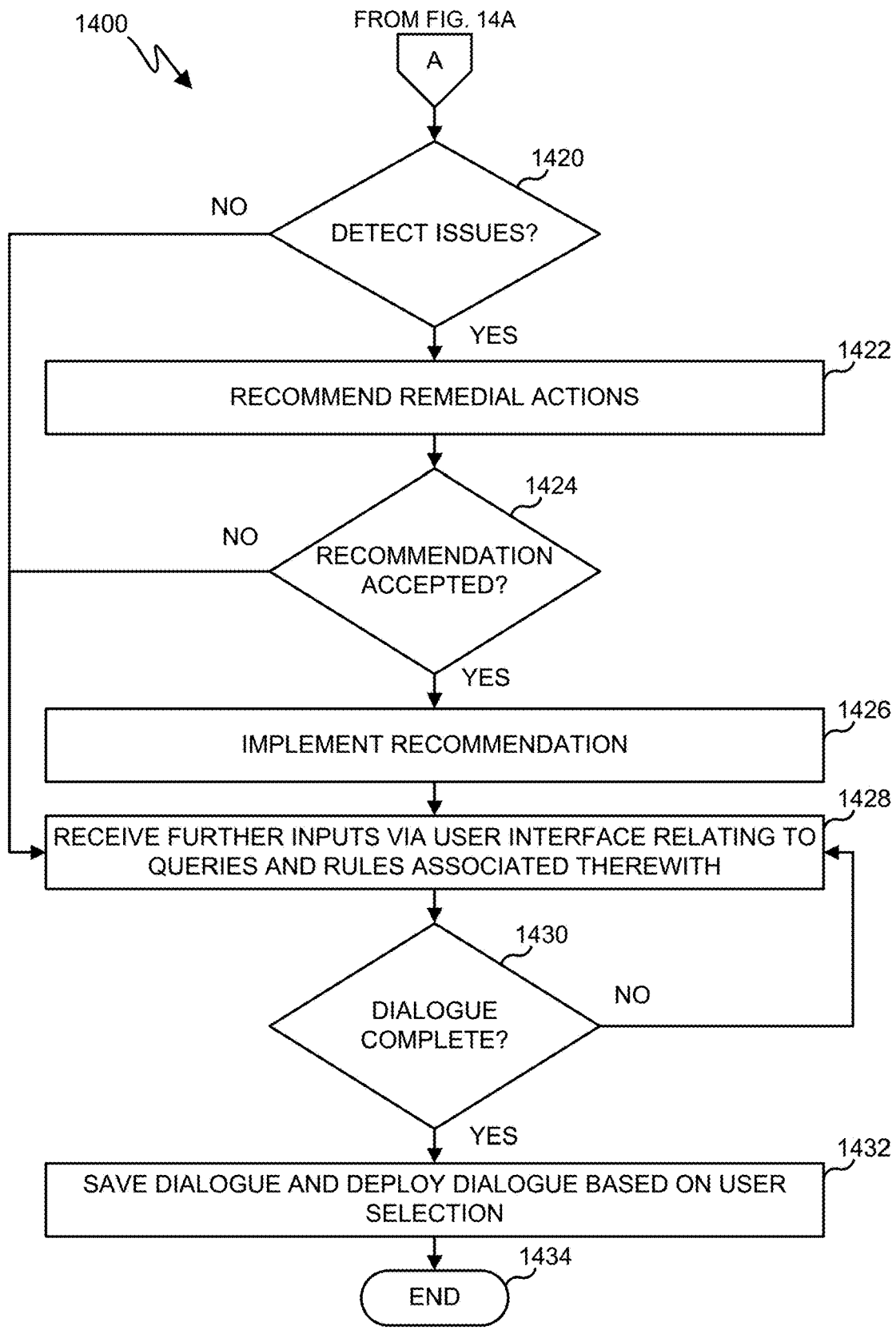

FIGS. 14A and 14B illustrate an example method 1400 for building a guided dialogue in accordance with this disclosure. For ease of explanation, the method 1400 shown in FIGS. 14A and 14B is described as being performed using at least one processor of the server 106 in the network configuration 100 of FIG. 1. However, the method 1400 may be used with any other suitable device(s) and in any other suitable system(s).

At block 1402, the processor receives a request to access a dialogue builder application, such as the dialogue application 306, and such as using an interface such as the user interface 1300. The user or device requesting to use the dialogue builder may be authenticated before access to, and use of, the dialogue builder is granted. At block 1404, the processor retrieves and loads client content pertaining to the client/user accessing the dialogue builder, such as any previously created/configured dialogues. At block 1406, the processor detects, such as via input to the user interface, a selection to create a new dialogue.

At decision block 1408, the processor determines whether to auto-generate a dialogue. For example, depending on certain known information concerning the user and/or certain initial inputs provided by the user, such as industry type, an input intent (e.g., auto-generate a dialogue, provide a guided dialogue creation process, etc.), products/services, etc., a machine learning model, such as the dialogue builder model 702, can construct a full dialogue for the user. If, at decision block 1408, the processor determines a dialogue should be automatically generated, such as if it is determined the machine learning model has all data it needs to generate the dialogue, and also if the user provides an indication that the user wishes for the dialogue to be automatically generated, the method 1400 moves to block 1410. At block 1410, the processor, using the machine learning model, generates a full dialogue based on the known data and any provided inputs. The method 1400 then moves to block 1416.

If, at decision block 1408, the processor determines that the dialogue is not to be automatically generated, such as based on the machine learning model not having enough data, or based on a user selection, the method 1400 moves to block 1412. At block 1412, the processor creates a graphical representation of an initial dialogue structure. For example, this can be a framework for the dialogue to be created that is displayed in a similar manner as in FIG. 13E, but with just entry and exit query categories and one intermediate category, and without yet any queries added to the categories. Queries can then be added using an "add question" button, for example.

At block 1414, the processor receives inputs via the user interface relating to queries, rules, and products associated therewith. For example, the user may add new queries and establish rules for triggering those queries using the dialogue builder interface, and the processor can create additional questions and answers based on the added products and rules. At block 1416, the processor populates the graphical structure as each query is added and updates them as any modifications are received. At block 1418, as queries and rules are created and modified, the processor creates or updates corresponding programming blocks, such as described with respect to FIG. 11, based on the user inputs.

At decision block 1420, the processor determines whether any issues are detected. For example, a machine learning model, such as the AI validation engine 706, may monitor creation of the dialogue for any issues, such as gaps or dead-ends in the dialogue flow or dead-ends (e.g., no recommendations) based on the queries and product qualification rules, and recommend changes or optimizations to the user to address the detected issues. If, at decision block 1420, issues are not detected, the method 1400 moves to block 1428. If issues are detected, at block 1422, the processor presents recommendations for remedial actions to address the issues to the user, such as via the user interface, or via a chat-based interface as described in this disclosure. At decision block 1424, the processor determines whether the recommendations for remedial actions are accepted, such as in response to a user input. If not, the method 1400 moves to block 1428. If so, at block 1426, the processor implements the recommendations by and updates the dialogue.

At block 1428, the processor receives further inputs via the user interface from the user relating to queries and rules associated therewith, as the user continues to build the dialogue. It will be understood that the graphical representation of the dialogue, as well as the programmed building blocks for the dialogue, are also updated in response to changes to the dialogue as it is built. At decision block 1430, the processor determines whether building of the dialogue is complete, such as if the user has selected an option to save the dialogue. If not, the method loops back to block 1428. If so, at block 1432, the processor causes the dialogue to be saved, and may also deploy the dialogue online if such an input related to such is received from the user via the user interface. The method ends at block 1434.

Although FIGS. 14A and 14B illustrate one example of a method 1400 for building a guided dialogue, various changes may be made to FIGS. 14A and 14B. For example, while shown as a series of steps, various steps in FIGS. 14A and 14B could overlap, occur in parallel, occur in a different order, or occur any number of times. As a particular example, detecting dialogue issues at decision block 1420 can occur at other points of the method 1400, such as after block 1428, and issues can be continually monitored during creation of the dialogue. Alternatively, decision block 1420 may not occur until after decision block 1430, that is, after the user has indicated the user has completed a dialogue.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
    creating, by at least one processor of at least one electronic device, a guided dialogue, wherein the guided dialogue includes programming blocks corresponding to queries and corresponding to rules associated with the queries, and wherein the programming blocks are structured to include one or more query base blocks having associated rule blocks; and
    deploying, by the at least one processor, the guided dialogue at an online-accessible location,
    wherein a request from another electronic device to access the deployed guided dialogue causes execution of the deployed guided dialogue in response to the request.

2. The method of claim 1, wherein, during the execution of the deployed guided dialogue, the deployed guided dialogue is programmed to access, via a backend dialogue application, one or more dialogue guide bundles stored in an object storage location.

3. The method of claim 2, wherein the one or more dialogue guide bundles include user interface theme element artifacts embedded in the one or more dialogue guide bundles.

4. The method of claim 1, further comprising providing a dashboard in a user interface that includes one or more user interface elements displaying analytics associated with execution of the guided dialogue.

5. The method of claim 4, further comprising adjusting the guided dialogue based on one or more parameters of the analytics being below a threshold.

6. The method of claim 1, wherein creating the guided dialogue includes:
    receiving, by the at least one processor, a request to access a dialog builder application;
    creating, by the at least one processor, a graphical representation of an initial dialogue structure for display in a user interface of the dialog builder application;
    receiving, by the at least one processor, inputs via the user interface relating to queries and rules associated with the queries for the guided dialogue;
    creating or updating, by the at least one processor, the programming blocks corresponding to the queries and corresponding to the rules associated with the queries;
    receiving, by the at least one processor, an input indicating that creation of the guided dialogue is complete; and
    outputting, by the at least one processor, the guided dialogue.

7. The method of claim 6, further comprising:
    displaying, via the user interface, categories of queries associated with the query base blocks in a window of the user interface; and
    displaying, via the user interface in response to a user input, a sub-window of the user interface for adding a rule in association with a query.

8. The method of claim 6, further comprising:
    displaying a plurality of query categories in the user interface each in association with a user interface element for toggling the query category on or off.

9. The method of claim 1, wherein creating the guided dialogue includes:
    receiving, by the at least one processor, a request to access a dialog builder application;
    retrieving and loading, by the at least one processor, content related to a user that initiated the request;
    detecting, by the at least one processor, an intent to create a new dialogue;
    creating, by the at least one processor, the new dialogue based on at least the content related to the user and the detected intent; and
    outputting, by the at least one processor, the new dialogue as the guided dialogue.

10. The method of claim 9, wherein creating the new dialogue includes:
    determining, by the at least one processor and using one or more machine learning models, to automatically generate the new dialogue;
    generating, by the at least one processor and using the one or more machine learning models, the new dialogue, including the programming blocks, the one or more query base blocks, and the associated rule blocks, based on at least the content related to the user, the detected intent and learned parameters of the one or more machine learning models; and
    populating, by the at least one processor, a graphical structure for a user interface of the dialog builder application as each programming block, each query base block, and each associated rule block is added by the one or more machine learning models.

11. The method of claim 10, further comprising training the one or more machine learning models using training data, based on outputs of the one or more machine learning models, using an error or loss determined using a loss function, including determining the outputs of the one or more machine learning models differ from training data ground truths and updating the one or more machine learning models based on the error or loss, wherein the loss function is a cross-entropy loss or a mean-squared error.

12. The method of claim 10, wherein creating the new dialogue further includes:
    receiving, by the at least one processor and using the one or more machine learning models, additional user inputs for use as additional parameters for the new dialogue; and
    updating, by the at least one processor, the programming blocks of the generated new dialogue according to the additional user inputs.

13. The method of claim 10, further comprising:
  detecting, by the at least one processor and using at least one machine learning model of the one or more machine learning models, at least one issue with the guided dialogue;
  determining, by the at least one processor and using the at least one machine learning model, at least one recommendation for at least one remedial action to correct the detected at least one issue with the guided dialogue; and
  implementing, by the at least one processor and using the at least one machine learning model, the at least one remedial action and updating the guided dialogue, wherein implementing the at least one remedial action is performed automatically.

14. The method of claim 13, wherein implementing the at least one remedial action is performed in response to receiving an input via the user interface in which the at least one recommendation is displayed.

15. The method of claim 13, wherein the detected at least one issue includes one or more of:
  a gap in a dialogue flow of the guided dialogue;
  a dead-end in the dialogue flow of the guided dialogue;
  a lack of recommendations based on the queries that correspond to the programming blocks and the rules associated with the queries that correspond to the programming blocks; or
  a lack of content in the guided dialogue related to services of the user.

16. A system comprising:
  at least one electronic device including:
    a communication interface;
    at least one processor; and
    memory storing instructions, wherein the instructions, when executed by the at least one processor, cause the at least one electronic device to:
      create a guided dialogue, wherein the guided dialogue includes programming blocks corresponding to queries and corresponding to rules associated with the queries, and wherein the programming blocks are structured to include one or more query base blocks having associated rule blocks; and
      deploy the guided dialogue at an online-accessible location,
      wherein a request from another electronic device to access the deployed guided dialogue causes execution of the deployed guided dialogue in response to the request.

17. The system of claim 16, wherein, during the execution of the deployed guided dialogue, the deployed guided dialogue is programmed to access, via a backend dialogue application, one or more dialogue guide bundles stored in an object storage location.

18. The system of claim 17, wherein the one or more dialogue guide bundles include user interface theme element artifacts embedded in the one or more dialogue guide bundles.

19. The system of claim 16, wherein the instructions, when executed by the at least one processor, further cause the at least one electronic device to provide a dashboard in a user interface that includes one or more user interface elements displaying analytics associated with execution of the guided dialogue.

20. The system of claim 19, wherein the instructions, when executed by the at least one processor, further cause the at least one electronic device to adjust the guided dialogue based on one or more parameters of the analytics being below a threshold.

21. The system of claim 16, wherein, to create the guided dialogue, the instructions, when executed by the at least one processor, further cause the at least one electronic device to:
  receive a request to access a dialog builder application;
  create a graphical representation of an initial dialogue structure for display in a user interface of the dialog builder application;
  receive inputs via the user interface relating to queries and rules associated with the queries for the guided dialogue;
  create or update the programming blocks corresponding to the queries and corresponding to the rules associated with the queries;
  receive an input indicating that creation of the guided dialogue is complete; and
  output the guided dialogue.

22. The system of claim 21, wherein the instructions, when executed by the at least one processor, further cause the at least one electronic device to:
  display, via the user interface, categories of queries associated with the query base blocks in a window of the user interface; and
  display, via the user interface in response to a user input, a sub-window of the user interface for adding a rule in association with a query.

23. The system of claim 21, wherein the instructions, when executed by the at least one processor, further cause the at least one electronic device to display a plurality of query categories in the user interface each in association with a user interface element for toggling the query category on or off.

24. The system of claim 16, wherein, to create the guided dialogue, the instructions, when executed by the at least one processor, further cause the at least one electronic device to:
  receive a request to access a dialog builder application;
  retrieve and load content related to a user that initiated the request;
  detect an intent to create a new dialogue;
  create the new dialogue based on at least the content related to the user and the detected intent; and
  output the new dialogue as the guided dialogue.

25. The system of claim 24, wherein, to create the new dialogue, the instructions, when executed by the at least one processor, further cause the at least one electronic device to:
  determine, using one or more machine learning models, to automatically generate the new dialogue;
  generate, using the one or more machine learning models, the new dialogue, including the programming blocks, the one or more query base blocks, and the associated rule blocks, based on at least the content related to the user, the detected intent and learned parameters of the one or more machine learning models; and
  populate a graphical structure for a user interface of the dialog builder application as each programming block, each query base block, and each associated rule block is added by the one or more machine learning models.

26. The system of claim 25, wherein the instructions, when executed by the at least one processor, further cause the at least one electronic device to train the one or more machine learning models using training data, based on outputs of the one or more machine learning models, using an error or loss determined using a loss function, including determining the outputs of the one or more machine learning models differ from training data ground truths and updating the one or more machine learning models based on the error or loss, wherein the loss function is a cross-entropy loss or a mean-squared error.

27. The system of claim 25, wherein, to create the new dialogue, the instructions, when executed by the at least one processor, further cause the at least one electronic device to:
receive, using the one or more machine learning models, additional user inputs for use as additional parameters for the new dialogue; and
update the programming blocks of the generated new dialogue according to the additional user inputs.

28. The system of claim 25, wherein the instructions, when executed by the at least one processor, further cause the at least one electronic device to:
detect, using at least one machine learning model of the one or more machine learning models, at least one issue with the guided dialogue;
determine, using the at least one machine learning model, at least one recommendation for at least one remedial action to correct the detected at least one issue with the guided dialogue; and
implement, using the at least one machine learning model, the at least one remedial action and updating the guided dialogue, wherein implementation of the at least one remedial action is performed automatically.

29. The system of claim 28, wherein implementation of the at least one remedial action is performed in response to receiving an input via the user interface in which the at least one recommendation is displayed.

30. The system of claim 28, wherein the detected at least one issue includes one or more of:
a gap in a dialogue flow of the guided dialogue;
a dead-end in the dialogue flow of the guided dialogue;
a lack of recommendations based on the queries that correspond to the programming blocks and the rules associated with the queries that correspond to the programming blocks; or
a lack of content in the guided dialogue related to services of the user.

* * * * *